(12) United States Patent
Jackson et al.

(10) Patent No.: US 12,339,886 B1
(45) Date of Patent: Jun. 24, 2025

(54) QUERYING DATA USING SPECIALIZED AND GENERALIZED ARTIFICIAL INTELLIGENCE MODELS

(71) Applicant: Citibank, N.A., New York, NY (US)

(72) Inventors: Julisia Jackson, Irving, TX (US); James Myers, New York, NY (US); Chamindra Desilva, London (GB); Shardul Malviya, London (GB); Wayne Liao, London (GB); Deepak Jain, London (GB); Samantha Cory, London (GB); Mariusz Saternus, Cracow (PL); Daniel Lewandowski, Cracow (PL); Biraj Krushna Rath, London (GB); Stuart Murray, London (GB); Philip Davies, London (GB); Payal Jain, London (GB); Tariq Husayn Maonah, London (GB); Vishal Mysore, Mississauga (CA); Ramkumar Ayyadurai, Jersey City, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/061,848

(22) Filed: Feb. 24, 2025

Related U.S. Application Data

(63) Continuation-in-part of application No. 18/983,342, filed on Dec. 17, 2024, and a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, which is a continuation-in-part of application No. 18/633,293, filed on Apr. 11, 2024, now Pat. No. 12,147,513.

(51) Int. Cl.
*G06F 16/338* (2019.01)
*G06F 16/383* (2019.01)

(52) U.S. Cl.
CPC .......... *G06F 16/338* (2019.01); *G06F 16/383* (2019.01)

(58) Field of Classification Search
CPC .................................................. G06F 16/338
See application file for complete search history.

(56) References Cited

U.S. PATENT DOCUMENTS

2012/0161940 A1* 6/2012 Taylor .................. G06F 16/367
340/10.3

* cited by examiner

*Primary Examiner* — Van H Oberly
(74) *Attorney, Agent, or Firm* — Perkins Coie LLP

(57) ABSTRACT

The systems and methods disclosed herein relate to querying data using artificial intelligence models. A generalized model receives an output generation request and partitions it into segments mapped to specific domains, where each domain indicates associated databases and guidelines. The segments are routed to domain-specific models trained on domain-specific data, which generate query fragments by comparing performance metrics and system resource usage metrics. The query fragments are aggregated into an overall query that satisfies guidelines across domains. The systems and methods can include a feedback loop to adjust the domain-specific models using user interactions and performance metrics to dynamically adapt to a skill level or experience of the user.

20 Claims, 23 Drawing Sheets

| Performance Metric 1102 | Usage Value 1104 | Maximum Value 1106 | Threshold Metric Value 1108 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

FIG. 11

| Hardware Configuration 1410 | | Software Configuration 1430 | | Communication Configuration 1450 | |
|---|---|---|---|---|---|
| CPU Arch. | x86 | Operating System | OpSys A | Wireless Network Interface | 802.11 b 2.4GHz |
| GPU Arch. | SIMD | OS Version | 2.4.5 | Wireless Network Type | WPA2 |
| Storage Type | SSD | Home Path | '/home' | Wireless Network Encryption | AES |
| Storage Space | 1 TB | Display Identifier | '/disp' | Wireless Network Ports | 80 and 443 |
| Memory Space | 16 GB | Language | 'en_GB.UTF-8' | Ethernet Input | IEEE 802.3 |
| | | | | Ethernet Cable | IEEE 802.3 |
| | | | | Ethernet Connector | RJ45 |
| | | | | Ethernet Ports | 80 and 443 |

QUERYING DATA USING SPECIALIZED AND GENERALIZED ARTIFICIAL INTELLIGENCE MODELS

CROSS-REFERENCE TO RELATED APPLICATION(S)

This application is a continuation-in-part of U.S. patent application Ser. No. 18/983,342 entitled "VALIDATING AUTONOMOUS ARTIFICIAL INTELLIGENCE (AI) AGENTS USING GENERATIVE AI" and filed Dec. 17, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" and filed May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in their entirety.

This application is further a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

BACKGROUND

Data querying enables users to retrieve specific information from databases or data storage systems through structured requests (e.g., queries, command sets, inputs). In particular, data querying enables programmatic access to stored data through database management systems that process these requests and return relevant results. For example, query languages like structured query language (SQL) enable users to specify data retrieval parameters in the structured request, such as data selection, filtering, and aggregation operations across database tables and structures. Modern computing environments frequently involve multiple databases and data sources that are queried to aggregate data stored across departmental databases, data lakes, and/or other storage systems.

Query execution paths can vary significantly in their resource consumption even when retrieving identical datasets. There are multiple possible strategies for accessing and processing the same data, each with different resource implications. For example, a query can use table scans versus index lookups or execute different join algorithms and execution orders, leading to varying demands on system resources like CPU, memory, and I/O operations. The resource variations become particularly significant when dealing with complex queries that access data across multiple domains and databases, where different execution strategies can result in substantially different resource utilization patterns despite returning the same result set. Thus, organizations using multiple storage systems struggle to generate a structured request that retrieves the desired data while maintaining an acceptable level resource usage and complying with organizational guidelines.

BRIEF DESCRIPTION OF THE DRAWINGS

FIG. 11 shows a schematic of a data structure illustrating a system state and associated threshold metric values.

FIG. 14 shows a data structure depicting a virtual machine configuration.

Figure 1:
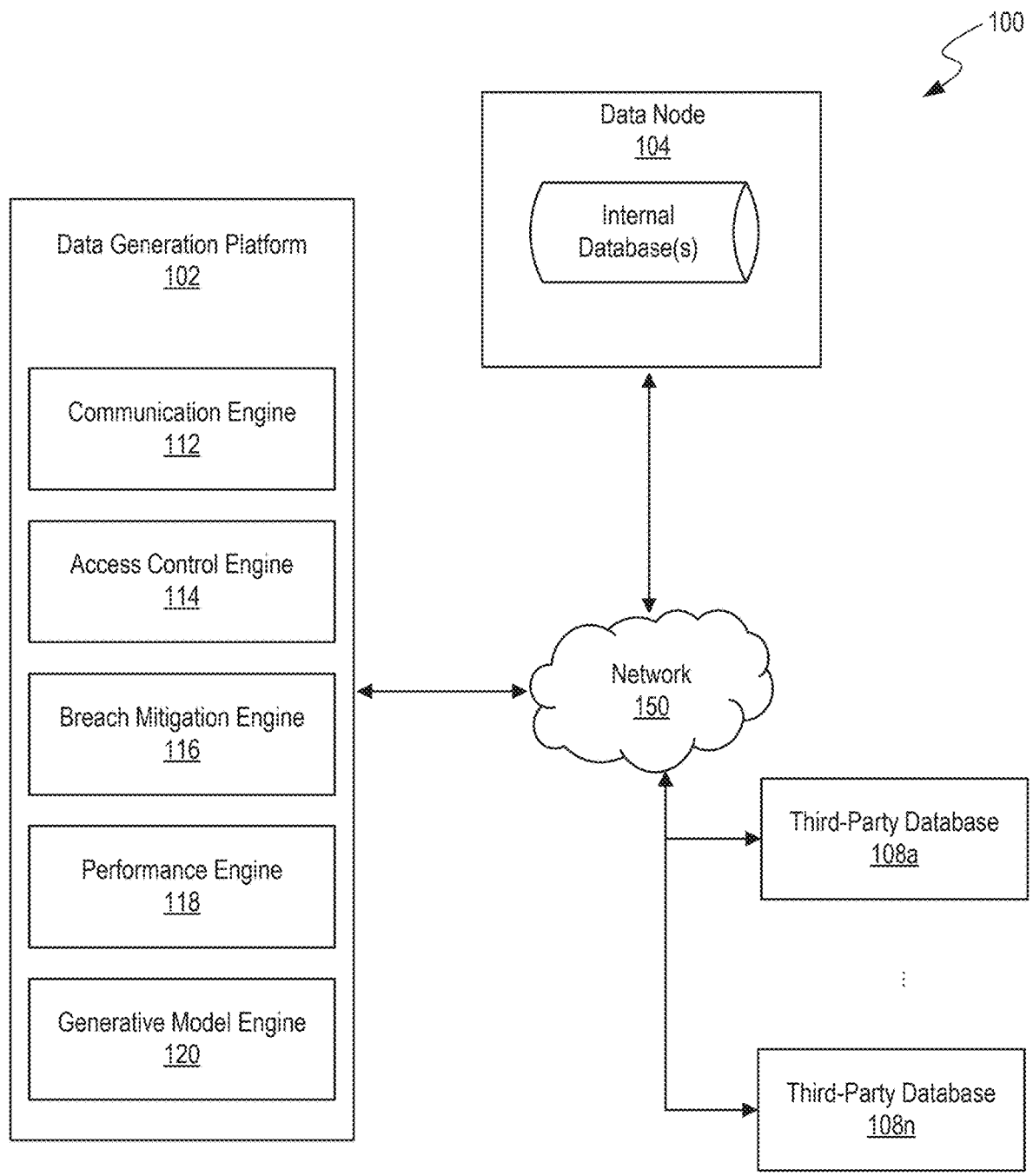
FIG. 1 shows an illustrative environment for evaluating language model prompts and outputs for model selection and validation, in accordance with some implementations of the present technology.

The technologies described herein will become more apparent to those skilled in the art from studying the Detailed Description in conjunction with the drawings.

Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Data querying enables users to retrieve specific information from databases and data storage systems through structured requests. Query languages like SQL allow users to specify data retrieval parameters, such as data selection, filtering, and aggregation operations across database tables and structures. Modern computing environments frequently involve multiple databases and data sources that must be queried to aggregate data stored across departmental databases, data lakes, and other storage systems. A significant technical challenge exists in query execution paths, which can vary substantially in their resource consumption even when retrieving identical datasets. Multiple possible strategies exist for accessing and processing the same data, each with different resource implications. For example, a query can use table scans versus index lookups or execute different join algorithms and execution orders, leading to varying demands on system resources like CPU, memory, and I/O operations. The resource variations become particularly significant when dealing with complex queries that access data across multiple domains and databases. Different execution strategies can result in substantially different resource utilization patterns despite returning the same result set. Organizations using multiple storage systems face technical difficulties in generating structured requests that retrieve desired data while maintaining acceptable resource usage levels and complying with organizational guidelines.

Further complicating this landscape is the variation in user preferences and skill levels when interacting with query systems. Conventional data query systems often rely on explicitly defined roles within prompts and are unable to dynamically adjust to a user's actual skill level or preferences inferred from their interactions. Users may have varying needs regarding autonomy in query execution. For example, some users may continuously deny automatic query execution while others prefer more automated approaches. Additionally, users exhibit different levels of experience and focus areas, requiring different levels of intervention and support in query generation and execution.

Attempting to create a system for distributed data querying across multiple domains created significant technical challenges. Creating such a system required addressing several limitations in conventional approaches to data retrieval, such as the difficulty in optimizing queries that span multiple databases and domains. Unlike traditional database systems that operate within single domains, modern computing environments frequently involve multiple databases and data sources that must be queried to aggregate data across departmental databases, data lakes, and other storage systems. Conventional query methods, which often rely on static execution strategies, are inadequate for managing the dynamic and unpredictable resource demands of distributed queries. Static approaches may fail to account for the wide range of execution paths and resource implications that queries may encounter across different domains. As a result, conventional methods often lead to inefficient resource utilization and compliance issues when accessing data across multiple domains.

To address these technical challenges, multiple design approaches were evaluated. For example, testing included using generalized models to process queries across all domains without specialization. These models could be configured to handle various data types and access patterns across different databases. Further, testing explored using strictly domain-specific models that were highly specialized for particular data types and access patterns. Each query could be processed by models specifically trained for the relevant domain's data structures and compliance requirements.

However, both the generalized and strictly domain-specific approaches proved to have significant limitations. The generalized approach, while flexible in handling different types of data, often resulted in suboptimal performance and resource utilization when confronted with particular portions of the query that contained domain-specific requirements. The lack of specialization led to inefficient query processing and difficulty in maintaining compliance with domain-specific guidelines. Conversely, the strictly domain-specific approach lacked the required coordination between different domain-specific models and struggled to handle queries that spanned multiple domains. The isolated nature of domain-specific systems made it difficult to optimize queries that required accessing data across different departments or data sources.

The disclosed system (hereinafter "data generation platform") herein enables dynamic model selection for processing inputs to generate associated outputs across distributed data sources. The data generation platform uses a generalized model to partition query requests into segments and route the segments to domain-specific models that are specialized for particular domains through training on domain-specific data. The domain-specific models generate query fragments by comparing performance metrics and system resource usage metrics. The query fragments can be aggregated into an overall query that satisfies guidelines across the domains. The data generation platform can, in some implementations, maintain a feedback loop that adjusts domain-specific models based on user interactions and performance metrics. When processing queries, the data generation platform measures performance metrics including compound values based on factors such as compliance, computation speed, resource usage, number of tokens, and accuracy. The data generation platform can consider specific user features learned over time, such as explicit user requests, inferred autonomy preferences, and skill level. Thus, the data generation platform is enabled to dynamically adapt to different users' needs, reducing intervention for experienced users while providing additional support and automated workflows for less experienced users. Additionally, the data generation platform can provide context-specific recommendations based on detected user focus areas, such as suggesting related queries when users consistently work with particular types of data.

Further, users or services of pre-existing software development systems (e.g., data pipelines for data processing and model or application development) do not have intuitive, consistent, or reliable ways to select particular models (e.g., domain-specific models) and/or design associated prompts in order to solve a given problem (e.g., to generate a desired query associated with a particular software application). As such, pre-existing systems risk selection of sub-optimal (e.g., relatively inefficient and/or insecure) generative machine learning models. Moreover, pre-existing development pipelines do not validate outputs of the models for security breaches in a context-dependent and flexible manner. Code generated through a model can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks.

The data generation platform disclosed herein further enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model.

The selected model(s) (e.g., domain-specific models) encounter further challenges as AI applications increasingly adopt AI agentic frameworks. AI agentic frameworks enable computing (e.g., software, software and hardware, and so forth) agents to operate autonomously, making decisions and performing actions based on their programming, learned behavior, or suggestions from AI models, or a combination of all three. While AI agentic frameworks offer substantial benefits in automating complex tasks, one major concern is the potential for agents to become rogue and make unauthorized or harmful decisions autonomously. The potential high risk associated with particular applications, databases, and systems creates significant challenges in managing agentic frameworks because the components often handle sensitive data. Conventional approaches to controlling rogue agent actions are predominantly reactive, often addressing issues only after they have occurred, which can be too late to prevent significant damage.

As such, the data generation platform disclosed herein further continuously monitors and evaluates the actions of autonomous agents (e.g., domain-specific models) in near real time. The disclosed system receives a set of alphanumeric characters (e.g., boundaries, regulations, guidelines, and so forth) defining constraints and operational data for a set of agents. Each agent (AI-based or not AI-based) uses predefined objectives to generate proposed actions. The system can identify gaps, or deficiencies in the agent's proposed actions, by comparing expected actions with proposed actions. AI model(s) (same or different) can use the identified gaps to modify the proposed actions by adding, altering, or removing actions.

Non-compliance of AI applications is further complicated as guidelines (e.g., regulations, standards) increasingly become more complex (e.g., protections against bias, harmful language, intellectual property (IP) rights). For example, guidelines can include requirements that require AI applications to produce outputs that are free from bias, harmful language, and/or IP rights violations to uphold ethical standards and protect users. Traditional approaches to regulatory compliance often involve manual interpretation of regulatory texts, followed by ad hoc efforts to align AI systems with compliance requirements. However, the manual process is subjective, lacks scalability, and is error-prone, which makes the approach increasingly unsustainable in the face of growing guidelines and the rapidly increasing prevalence of AI applications.

As such, the data generation platform disclosed herein further assesses and ensures adherence to guidelines (e.g., preventing bias, harmful language, IP violations). The data generation platform uses a meta-model that consists of one or more models to analyze different aspects of AI-generated content. For example, one of the models can be trained to identify certain patterns (e.g., patterns indicative of bias) within the content by evaluating demographic attributes and characteristics present in the content. In some implementations, the system can incorporate a correction module to adjust the parameters of the AI model and/or updates training data based on the findings of the detection models to ensure that non-compliant content is promptly addressed and mitigated.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Using manual processes heavily depends on individual knowledge and thus poses a significant risk for potential bias. This subjectivity can result in inconsistent mappings, as different individuals may understand and apply operative standards such as regulatory requirements in varied ways.

As such, the data generation platform disclosed herein further uses generative AI (e.g., GAI, GenAI, generative artificial intelligence) models, such as an LLM in the above-described data generation platform, to map gaps in controls to corresponding operative standards. The data generation platform can determine a set of vector representations of alphanumeric characters represented by one or more operative standards, which contain a first set of actions adhering to constraints in the set of vector representations. The data generation platform uses a received output generation request to construct a set of prompts for each gap to compare the corresponding gap against the first set of actions of the operative standards or the set of vector representations. For each gap, the system maps the gap to one or more operative standards of the set of vector representations.

Further, in cases where non-compliance is detected, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time.

As such, the data generation platform disclosed herein further identifies actionable items from guidelines. The data generation platform partitions guidelines into multiple subsets based on predetermined criteria, such as the length or complexity of each text subset. Using the partitioned guidelines, the data generation platform constructs a set of prompts for each text subset. Each text subset can be mapped to one or more actions in the first set of actions. Unlike conventional linear processes that result in an overwhelming number of redundant actionable items, by heuristically analyzing guidelines, the system can identify common actionable items without parsing through the guideline documents word by word.

While the current description provides examples related to Large Language Models (LLMs), one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108a-108n via a network 150. The data generation platform 102 can include software, hardware, or a combination of both and can reside on a physical server or a virtual server (e.g., as described in FIG. 6) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108a-108n directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 102 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases 108a-108n and can transmit data to such nodes. Additionally or alternatively, the access control engine 114 can receive data from and/or send data to the communication engine 112, the breach mitigation engine 116, the performance engine 118, and/or the generative model engine 120.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases 108a-108n).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the performance engine 118, the generative model engine 120, and/or other components associated with the network 150 (e.g., the data node 104 and/or the third-party databases 108a-108n).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases 108a-108n).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Figure 2:
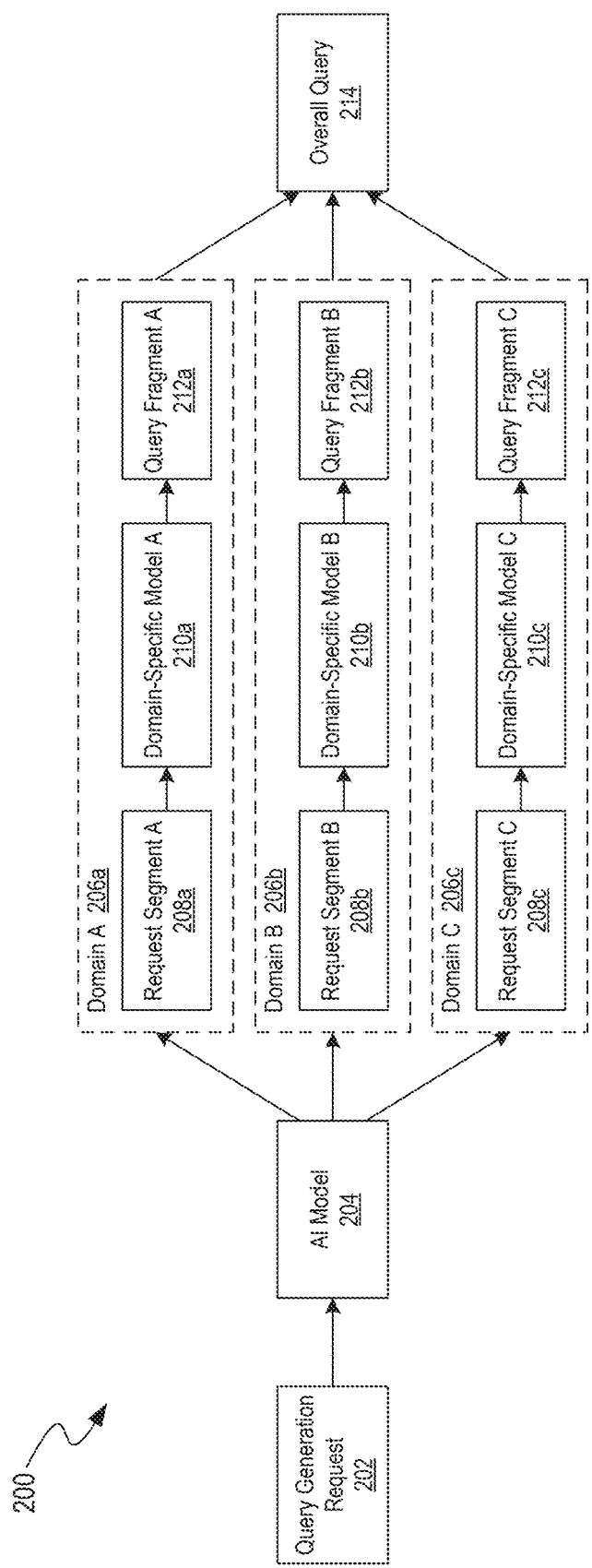
FIG. 2 is a block diagram illustrating an example environment for generating a distributed data query.

Dynamically Selecting Models for Distributed Data Queries Using the Data Generation Platform FIG. 2 is a block diagram illustrating an example environment 200 for generating a distributed data query. The example environment 200 includes a query generation request 202, an AI model 204, domains 206, request segments 208, domain specific models 210, query fragments 212, and overall query 214. The AI model 204 and the domain-specific models 210 are the same as or similar to AI model 1000, illustrated and described in more detail with reference to FIG. 10. The AI model 204 and the domain-specific models 210 can be implemented using components of example devices 500 and client computing devices 602 illustrated and described in more detail with reference to FIG. 5 and FIG. 6, respectively. Implementations of example environment 200 can include different and/or additional components or can be connected in different ways.

The environment 200 includes a query generation request 202 that is received by an AI model 204. The query generation request 202 can include a structured instruction for generation of an output (e.g., a generated query) using a large language model (LLM) or other artificial intelligence model (i.e., AI model 204). For example, the query generation request 202 can be a request to retrieve stored information within certain parameters (e.g., a certain time frame, a certain monetary amount, and so forth), such as "Show me all customer transactions over $10,000 from the last quarter." The AI model 204 partitions the query generation request 202 into one or more request segments 208 (such as a first request segment 208*a*, a second request segment 208*b*, a third request segment 208*c*, and so forth) by mapping them to corresponding domains 206 (such as a first domain 206*a*, a second domain 206*b*, a third domain 206*c*, and so forth). The request segments 208 can be portions of the query generation request 202 that share common domain characteristics. For example, if a query includes retrieving both financial data and customer information, the data generation platform 102 can be segmented into separate components-one segment for the financial domain and another for the customer data domain. Methods of partitioning the query generation request 202 into one or more request segments 208 are discussed with reference to process 400 in FIG. 4.

A domain 206 can indicate a specific data context, such as different departments or areas within an organization, and each can have their own specialized data requirements and compliance rules. For example, domains 206 can include areas like compliance, finance, and customer data management. Each domain can maintain its own set of databases containing structured and/or unstructured data and operate under specific guidelines (e.g., regulatory requirements, operational constraints, data governance policies) that govern data access and/or processing within that domain. For each domain, there can be a corresponding domain-specific model (such as a first domain-specific model 210*a*, a second domain-specific model 210*b*, a third domain-specific model 210*c*, and so forth).

A domain-specific model 210 can be a specialized model that has been trained using domain-specific data and can be optimized to process queries within its particular domain. Domain-specific models 210 can include small language models and/or specialized language models that are trained on domain-specific data such as compliance requirements, financial data, customer information, and so forth. Each domain-specific model generates query fragments 212 (such as a first query fragment 212*a*, a second query fragment 212*b*, a third query fragment 212*c*, and so forth) for its respective domain.

Each domain-specific model 210 can be a single model or a suite of models. For example, within each domain-specific model 210, there can be a set of further specialized models tailored to handle specific tasks or data types. For instance, in the banking sector, specialized models can include particular models trained on different subsets of banking data and optimized for different functions (e.g., fraud detection). The specialized models can work together in an end-to-end workflow, where the output of one model serves as the input for the next. Alternatively, a domain-specific model 210 can include a group of models that operate via majority decision and/or average, where multiple models evaluate the same data, and their outputs are aggregated to determine the final result of the domain-specific model 210. For example, in a risk assessment domain, several models (same or different) can independently evaluate the risk of a transaction, and the final risk score can be determined based on the majority decision or average of these models.

Query fragments 212 can include software-related information configured to operate as input in database management systems to retrieve domain-specific data in accordance with domain-specific guidelines. Methods of generating the query fragments 212 are discussed with further reference to FIG. 4. The AI model 204 can aggregate the individual query fragments 212 into an overall query 214. The overall query 214 can satisfy the guidelines associated with each database across all domains while maintaining compliance with regulatory and organizational standards.

For example, if a query generation request 202 includes instructions to query customer transaction data across multiple departments, such as "show me all customer transactions over $10,000 from the last quarter with associated risk scores," the AI model 204 can partition the request 202 into three distinct segments: one for the banking domain 206*a* (to access transaction data), one for the risk assessment domain 206*b* (to retrieve risk scores), and one for the compliance domain 206*c* (to ensure regulatory requirements are met). Each domain's specialized model can then individually and separately process the segment. For example, the banking domain-specific model 210*a* can generate a query fragment 212*a* to retrieve the transaction records, the risk assessment domain-specific model 210*b* can generate a fragment 212*b* to calculate risk scores, and the compliance domain-specific model 210*c* can generate a fragment 212*c* to validate regulatory requirements like anti-money laundering checks. The AI model 204 can combine the fragments into an overall query 214 that retrieves the complete dataset specified by the query generation request 202 while efficiently using system resources and maintaining compliance with each domain's guidelines.

Figure 3:
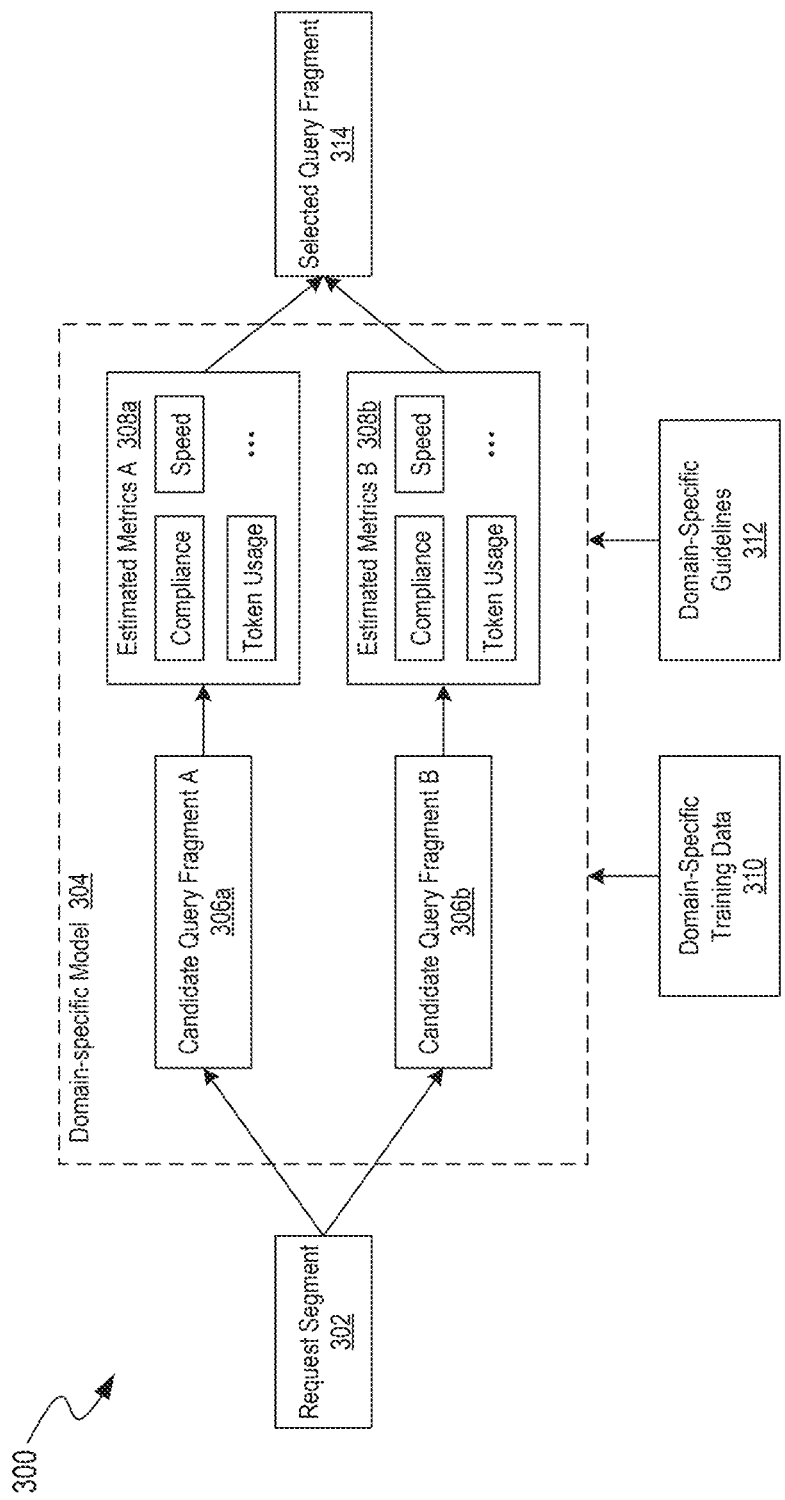
FIG. 3 is a block diagram illustrating an example environment of a domain-specific model used for distributed data queries.

FIG. 3 is a block diagram illustrating an example environment 300 of a domain-specific model 304 (e.g., domain-specific models 210) used for distributed data queries. The example environment 300 includes a request segment 302, the domain-specific model 304, candidate query fragments 306, estimated metrics 308, domain-specific training data 310, domain-specific guidelines 312, and selected query fragment 314. The domain-specific model 304 is the same as or similar to AI model 1000, illustrated and described in more detail with reference to FIG. 10. The domain-specific model 304 can be implemented using components of example devices 500 and client computing devices 602 illustrated and described in more detail with reference to FIG. 5 and FIG. 6, respectively. Implementations of example environment 300 can include different and/or additional components or can be connected in different ways.

The request segment 302 (e.g., the first request segment 208*a*, the second request segment 208*b*, the third request segment 208*c*) can be transmitted to its respective domain-specific model 304 through a synchronous communication channel. The domain-specific model 304 can be trained using domain-specific training data 310. Domain-specific training data 310 can include data within the domain of the domain-specific model 304. Domain-specific model 304 can include models such as credit scoring models, fraud detection algorithms, risk assessment systems, and so forth. The training data enables the domain-specific model 304 to learn patterns and characteristics associated with compliant and non-compliant behavior within its specific domain. For example, a particular domain-specific model can learn that specific queried information must be anonymized prior to presenting the retrieved information to the user.

Upon receiving a request segment 302, the domain-specific model 304 generates one or more candidate query fragments 306 (shown as candidate query fragment A 306*a* and candidate query fragment B 306*b*). Each candidate query fragment can include software-related information configured to operate as input in database management systems to retrieve domain-specific data. For each candidate query fragment, the domain-specific model 304 can calculate estimated metrics 308 (shown as estimated metrics A 308*a* and estimated metrics B 308*b*). The estimated metrics can include, for example, compliance measurements against domain-specific guidelines 312, computation speed for query execution, token usage for processing requirements, resource usage for data retrieval, and so forth.

Domain-specific guidelines 312 can include regulatory requirements and operational constraints that govern data access and processing within the specific domain. The guidelines establish the rules, procedures, and/or standards that are followed when handling data within that domain's context. Domain-specific guidelines 312 can include, for example, data privacy requirements, access controls, encryption standards, breach notification protocols, data retention policies, authentication procedures, audit requirements, user permission protocols, cybersecurity measures, data governance policies, compliance validation criteria, risk management procedures, transparency requirements, human oversight protocols, and so forth. The guidelines can be derived from external regulatory sources and/or internal organizational policies, serving as benchmarks against which compliance of the query is measured and validated.

Based on the estimated metrics 308 and compliance with domain-specific guidelines 312, the domain-specific model 304 can select a query fragment 314 from the candidate query fragments 306. For example, when processing a financial data query, the domain-specific model 304 can generate multiple candidate query fragments 306 with different approaches to accessing and joining financial tables. The domain-specific model 304 can evaluate each candidate's estimated resource usage, processing speed, and compliance with financial regulations before selecting the selected query fragment 314 that balances performance with regulatory requirements.

Figure 4:
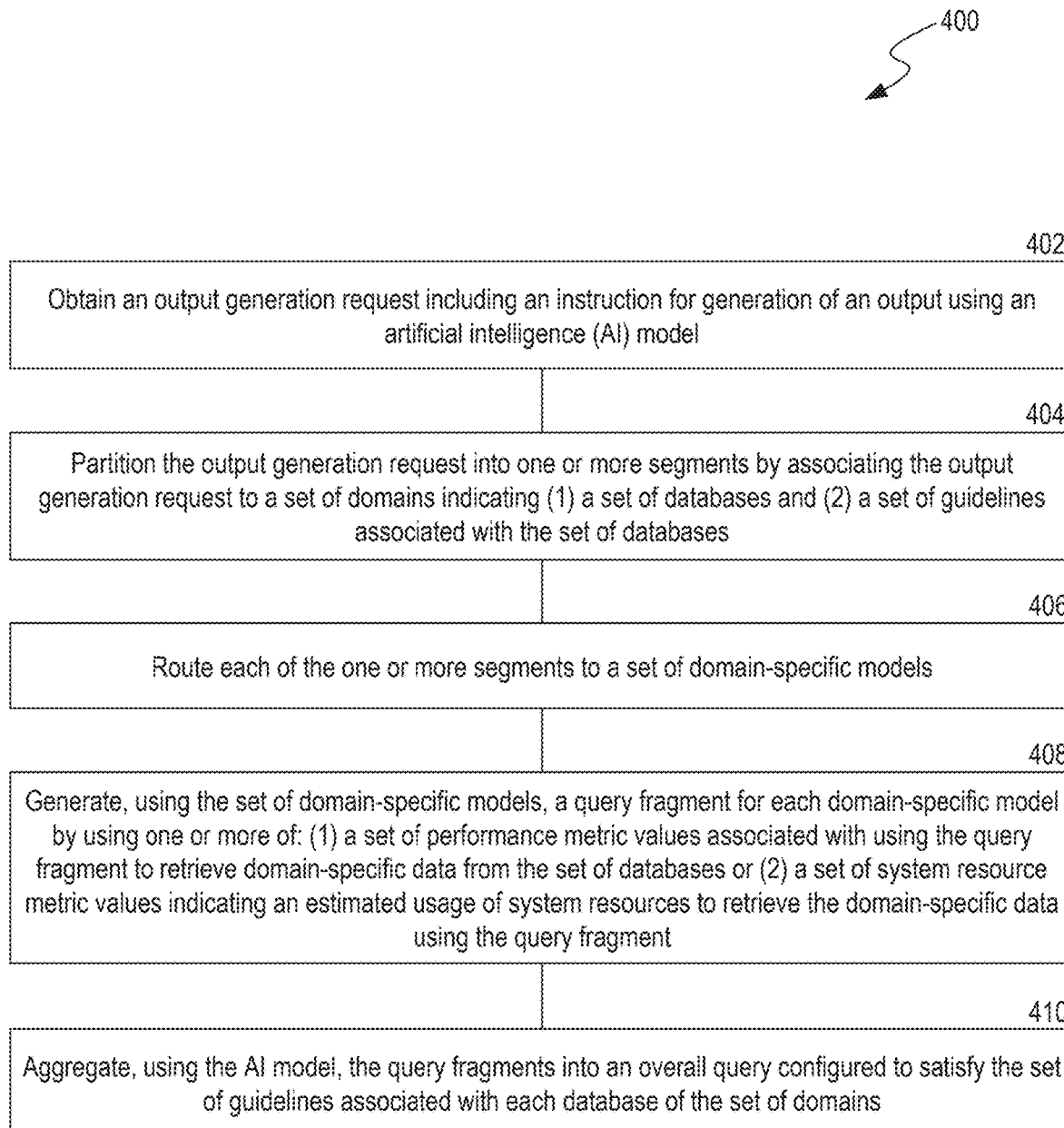
FIG. 4 is a flow diagram illustrating an example process of dynamically selecting models for distributed data queries.

FIG. 4 is a flow diagram illustrating an example process of dynamically selecting models for distributed data queries. In some implementations, the example process 400 is performed by a system including components of the example environment 200 illustrated and described in more detail with reference to FIG. 2. The system can be implemented on a terminal device, on a server, or on a telecommunications network core. Implementations can include different and/or additional operations or can perform the operations in different orders.

In operation 402, the data generation platform 102 can obtain an output generation request (e.g., the query generation request 202 in FIG. 2) including an instruction for generation of an output using an AI model (e.g., an LLM). Examples of output generation requests are discussed in further detail with reference to output generation request 202 in FIG. 2. For instance, an output generation request can be received via a user interface where users input their queries or instructions directly. The interface can be a web-based application, a mobile app, or a command-line interface, and the output generation request can be in natural language or structured query language. The data generation platform 102 can, in some implementations, obtain output generation requests through API calls from other systems or applications. External systems can programmatically send requests to the data generation platform 102. Additionally, output generation requests can be triggered by scheduled tasks or events. For example, the data generation platform 102 can be configured to automatically generate reports or perform data analysis at specific intervals, such as daily, weekly, or monthly. Event-driven requests can be set up, where certain conditions or triggers within the system initiate the generation of an output. For instance, a significant change in market data or a detected anomaly in transaction patterns can prompt the data generation platform 102 to retrieve certain data.

In operation 404, the data generation platform 102 can partition, using an AI model, the output generation request into one or more segments by associating the output generation request to a set of domains indicating (1) a set of databases and (2) a set of guidelines associated with the set of databases. The components of each segment of the output generation request can share a common domain. The AI model (discussed in further detail with reference to FIG. 2) can include, but is not limited to, LLMs, SVMs, k-nearest neighbor algorithms, decision-making algorithms, linear regression, random forest, naïve Bayes, logistic regression algorithms, or other suitable computational models.

The data generation platform 102 can generate vector representations of the output generation request. The data generation platform 102 can use one or more vector encoding models with transformer architectures, neural network architectures, or other architectures to generate vectors within a vector space representing semantic meaning of request components. The vector representations can be stored in one or more vector databases as numerical arrays capturing semantic relationships.

The data generation platform 102 can map vector representations to domains through one or more techniques, such as vector similarity calculations, pattern recognition across data structures, analysis of data dependencies, evaluation of compliance requirements, assessment of resource patterns, and so forth. For example, K-means or hierarchical clustering can be used to identify patterns and group the data into clusters that represent different domains. Clusters with frequent occurrences of the same terms can be mapped to corresponding domains. Further, the data generation platform 102 can compare vector representations by calculating the cosine of the angle between vectors to determine their directional similarity. For comparing textual elements, the data generation platform 102 can measure the intersection over the union of word sets in the expected (e.g., within a domain) and case-specific (e.g., within the output generation request) representations. The data generation platform 102 can identify specific patterns, keywords, or formats indicative of domain-specific information. In some implementations, the data generation platform 102 can use graph databases to represent relationships between vectors as nodes and edges to model interdependencies between domains.

In operation 406, the data generation platform 102 can route each of the one or more segments to a set of domain-specific models (e.g., SLMs). Each domain-specific model can share the same domain as corresponding routed segments. Further, each domain-specific model can be trained using training data associated with the domain of the domain-specific model. The data generation platform 102 can transmit each segment to its respective domain-specific model through a synchronous communication channel. The data generation platform 102 can use various communication protocols, such as HTTP, gRPC, or WebSockets to establish this channel, depending on the system architecture and requirements. In some implementations, the data generation platform 102 can use different communication channels depending on different domains. For example, different domains may have different guidelines (e.g., encryption standards).

In operation 408, the data generation platform 102 can generate, using the set of domain-specific models, a query fragment for each domain-specific model by using (e.g., by comparing) (1) a set of performance metric values associated with using the query fragment to retrieve domain-specific data from the set of databases and/or (2) a set of system resource metric values indicating an estimated usage of system resources (e.g., hardware resources, software resources, network resources, and so forth) to retrieve the domain-specific data using the query fragment. The query fragment can operate as an input in the set of databases to retrieve the domain-specific data in accordance with the set of guidelines of the domain. In some implementations, the data generation platform 102 can generate the query fragment by retrieving the domain-specific data from departmental databases, data lakes, and/or storage systems via, for example, a set of API calls and/or a set of direct database queries. The data generation platform 102 can generate the query fragments by measuring performance metrics including a compound value based on, for example, compliance, computation speed, resource usage, number of tokens, computation speed associated with query execution, resource allocation associated with data retrieval, compliance validation results, and/or accuracy.

Further, the data generation platform 102 can measure specific user features such as explicit user requests, inferred autonomy preferences, and/or skill level. The data generation platform 102 can modify at least one domain-specific model based on the performance metrics and specific user features. For example, the data generation platform 102 can track how users interact with the system, the types of queries they submit, and the complexity of their requests. By observing these interactions, the data generation platform 102 can infer whether a user is highly experienced or relatively new to the system. For more experienced users, the data generation platform 102 can adopt a less intrusive approach, providing them with the flexibility to explore and execute queries independently. These users may prefer minimal guidance and more control over the data retrieval process. The data generation platform 102 can adjust the domain-specific models to offer more customizable options or parameters in the generated query. Conversely, for less experienced users, the data generation platform 102 can take a more supportive role by automatically executing programmatic workflows and/or providing step-by-step guidance. For instance, if a user frequently submits basic queries or requests assistance, the data generation platform 102 can infer that the user may benefit from additional support and can simplify the query process, offer more predefined templates, and/or automate routine tasks.

In operation 410, the data generation platform 102 can aggregate, using the AI model, the query fragments into an overall query configured to satisfy the set of guidelines associated with each database of the set of domains. To resolve interdependencies between the fragments, the data generation platform 102 can map out the dependencies between the query fragments, identifying which fragments rely on data from other fragments and determining the order in which the fragments should be executed. For example, if a fragment retrieving customer details is required before retrieving transaction data, the data generation platform 102 can ensure that the customer details fragment is executed first. The data generation platform 102 can resolve conflicts that arise during the aggregation process (e.g., when fragments have overlapping data or when there are discrepancies between the data retrieved by different fragments). The data generation platform 102 can use predefined rules and guidelines to address these conflicts. For example, if two fragments retrieve different versions of the same data, the data generation platform 102 can use the most recent version.

The data generation platform 102 can validate that each query fragment adheres to the set of guidelines of the domain (which can be predetermined) before aggregating the query fragments. The data generation platform 102 can perform a set of compliance checks to validate that the overall query satisfies the set of guidelines. In some implementations, the data generation platform 102 can present the overall query to a user via a user interface configured to receive a user input indicating an acceptance or a denial of the overall query. The data generation platform 102 can associate each query fragment with compliance validation data indicating a degree of compliance of the query fragment with the set of guidelines and transmit each query fragment to the AI model through a communication channel. The data generation platform 102 can integrate the query fragments into the overall query based on interdependencies between the query fragments. In some implementations, the data generation platform 102 can detect a set of interdependencies between the query fragments and validate the overall query against the set of interdependencies.

In some implementations, the data generation platform 102 can input, into a computer program, the overall query to receive a set of requested data in accordance with the instruction of the output generation request. For example, the data generation platform 102 can input the overall query into computer programs through API calls to domain-specific services, direct database queries using structured query language (SQL), or interfaces with storage systems using defined protocols.

The data generation platform 102 can obtain a user-requested query. When processing user-requested queries, the platform can establish authority scores by evaluating historical actions, analyzing transaction amounts, and assessing hardware system interactions. Resource differences can be calculated by comparing computation speed, resource allocation requirements, and compliance validation results. The data generation platform 102 can establish a first score quantifying an authority of the user-requested query and establish a second score quantifying resource differences between the user-requested query and the overall query. The data generation platform 102 can select either the overall query or the user-requested query based on the first score and the second score. In some implementations, the data generation platform 102 can detect a set of conflicts between a user request and the overall query associated with a resource usage difference. In some implementations, the data generation platform 102 can automatically execute one or more actions (e.g., programmatic workflows) based on the resource usage difference exceeding a predefined threshold. The data generation platform 102 can notify a validation agent in response to a conflict between a user-requested query and the overall query.

The data generation platform 102 can detect a focus area of a user based on historical queries and generate context-specific recommendations based on the focus area. In some implementations, the data generation platform 102 can detect a set of data patterns across multiple data warehouses and generate a set of query recommendations based on the detected set of data patterns. In some implementations, the data generation platform 102 can automatically execute a set of programmatic workflows based on a degree of user experience. For instance, for a user that generates daily reports, the data generation platform 102 can automate this workflow by scheduling the report generation at the end of each day, automatically retrieving the relevant data, and sending the report to the user's email. This reduces the user's workload and ensures that they receive timely and accurate information without having to manually execute the queries.

Suitable Computing Environments of the Data Generation Platform

Figure 5:
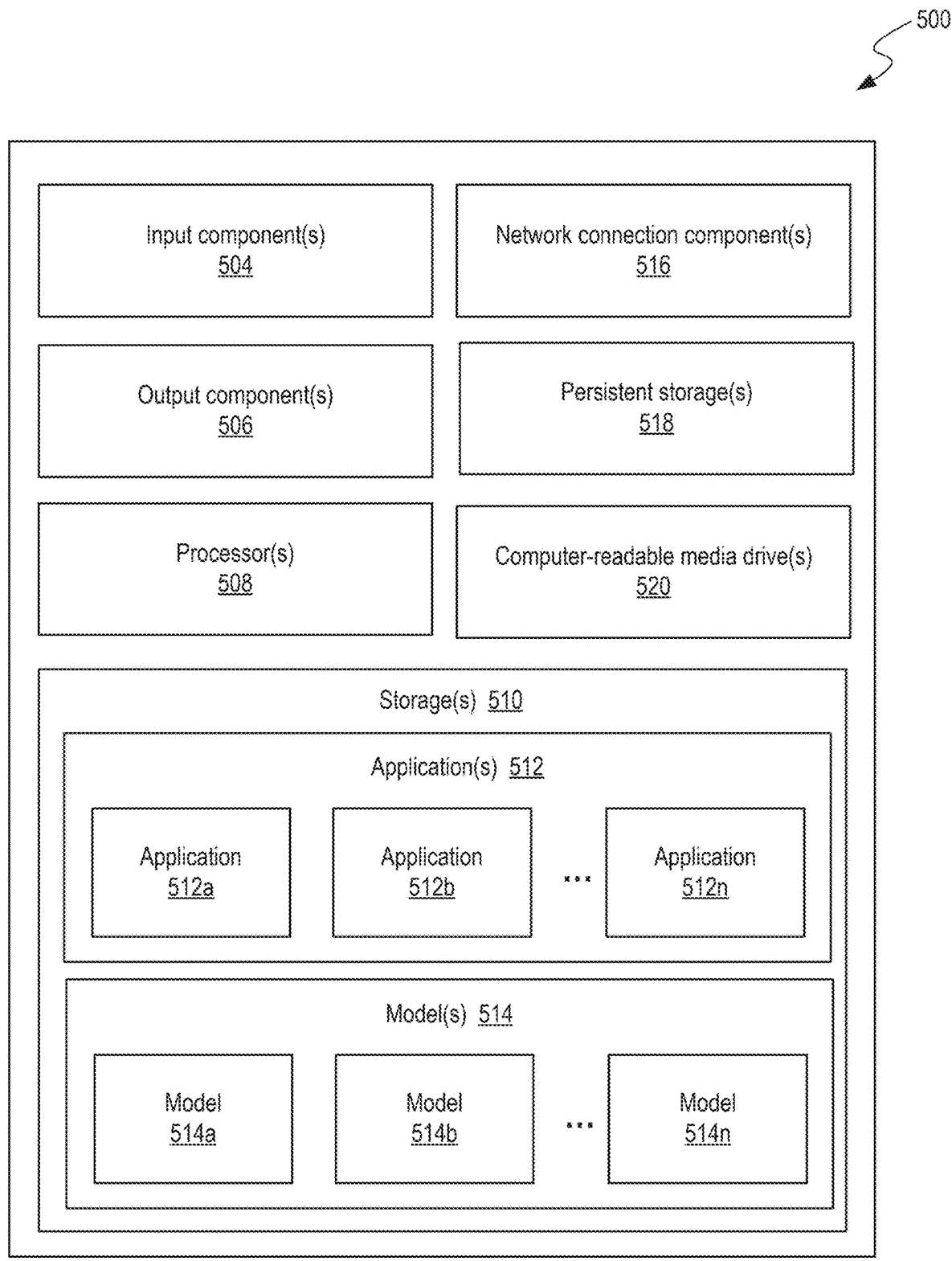
FIG. 5 shows a block diagram showing some of the components typically incorporated in at least some of the computer systems and other devices on which the disclosed system operates.

FIG. 5 shows a block diagram showing some of the components typically incorporated in at least some of the computer systems and other devices 500 on which the disclosed system (e.g., the data generation platform 102) operates in accordance with some implementations of the present technology. In various implementations, these computer systems and other device(s) 500 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 504, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 506, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 508, including a CPU for executing computer programs, a GPU for executing computer graphic programs and handling computing graphical elements; storage(s) 510, including at least one computer memory for storing programs (e.g., application(s) 512, model(s) 514, and other programs) and data while they are being used, including the facility and associated data, an operating system including a kernel, and device drivers; a network connection component(s) 516 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 518, such as a hard drive or flash drive for persistently storing programs and data; and computer-readable media drives 520 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 6:
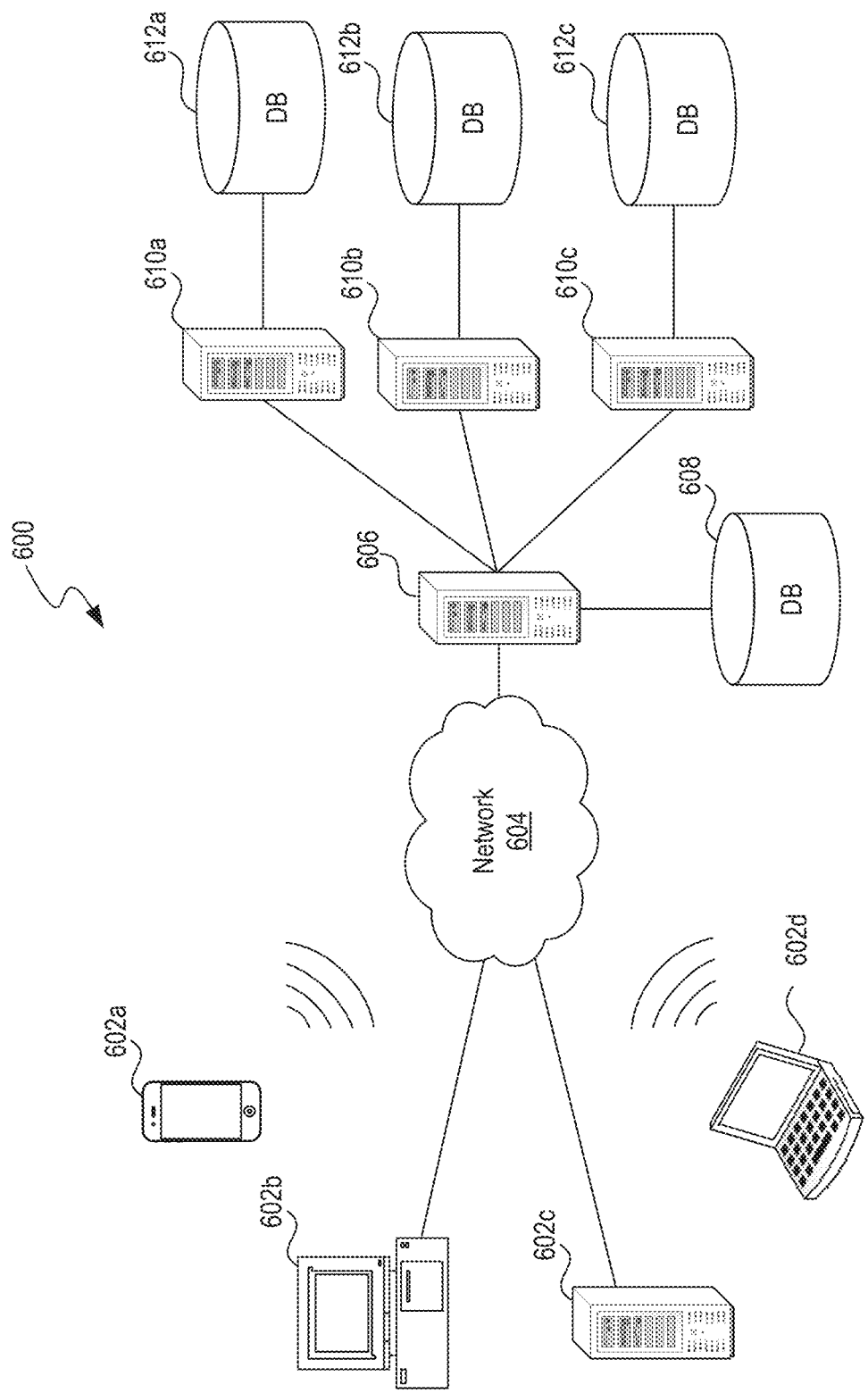
FIG. 6 is a system diagram illustrating an example of a computing environment in which the disclosed system operates.

FIG. 6 is a system diagram illustrating an example of a computing environment 600 in which the disclosed system operates in some implementations of the present technology. In some implementations, environment 600 includes one or more client computing devices 602a-602d, examples of which can host graphical user interfaces associated with client devices. For example, one or more of the client computing devices 602a-602d includes user devices and/or devices associated with services requesting responses to queries from LLMs. Client computing devices 602 operate in a networked environment using logical connections through network 604 (e.g., the network 150) to one or more remote computers, such as a server computing device (e.g., a server system housing the data generation platform 102 of FIG. 1). In some implementations, client computing devices 602 can correspond to device 500 (FIG. 5).

In some implementations, server computing device 606 is an edge server that receives client requests and coordinates fulfillment of those requests through other servers, such as server computing devices 610a-610c. In some implementations, server computing devices 606 and 610 comprise computing systems. Though each server computing device 606 and 610 is displayed logically as a single server, server computing devices can each be a distributed computing environment encompassing multiple computing devices located at the same or at geographically disparate physical locations. In some implementations, each server computing device 610 corresponds to a group of servers.

Client computing devices 602 and server computing devices 606 and 610 can each act as a server or client to other server or client devices. In some implementations, server computing devices (606, 610a-610c) connect to a corresponding database (608, 612a-612c). For example, the corresponding database includes a database stored within the data node 104 (e.g., a sensitive token database, an event database, or another suitable database). As discussed above, each server computing device 610 can correspond to a group of servers, and each of these servers can share a database or can have its own database (and/or interface with external databases, such as third-party databases 108a-108n). In addition to information described concerning the data node 104 of FIG. 1, databases 608 and 612 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 608 and 612 are displayed logically as single units, databases 608 and 612 can each be a distributed computing environment encompassing multiple computing devices, can be located within their corresponding server, or can be located at the same or at geographically disparate physical locations.

Network 604 (e.g., corresponding to the network 150) can be a local area network (LAN) or a wide area network (WAN) but can also be other wired or wireless networks. In some implementations, network 604 is the Internet or some other public or private network. Client computing devices 602 are connected to network 604 through a network interface, such as by wired or wireless communication. While the connections between server computing device 606 and server computing device 610 are shown as separate connections, these connections can be any kind of LAN, WAN, wired network, or wireless network, including network 604 or a separate public or private network.

Example Implementations of the Data Generation Platform

Figure 7:
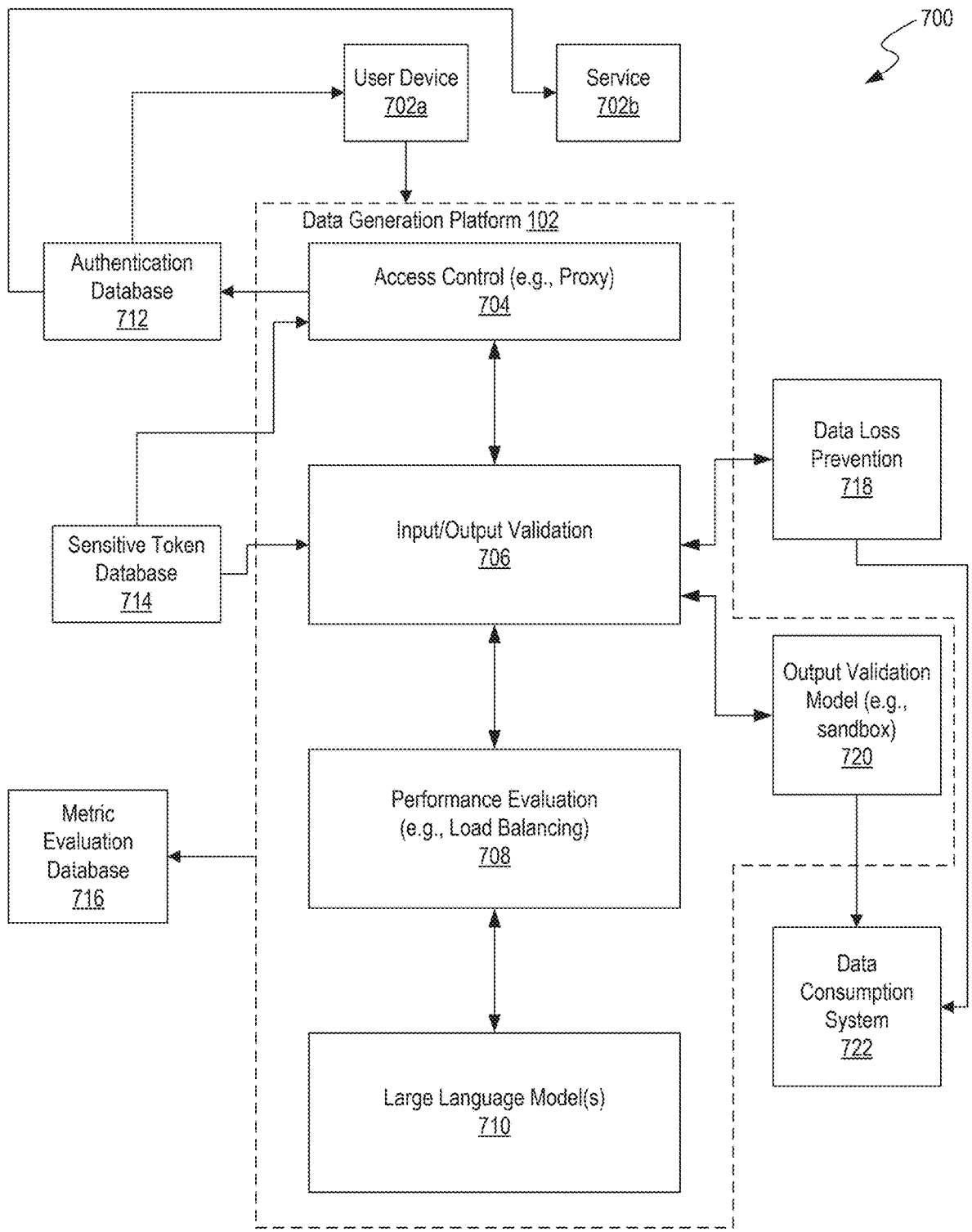
FIG. 7 is a schematic illustrating a process for validating model inputs and outputs.

FIG. 7 is a schematic illustrating a process 700 for validating model inputs and outputs, in accordance with some implementations of the present technology. For example, a user device 702a or a service 702b provides an output generation request (e.g., including an input, such as a prompt, and an authentication token) to the data generation platform 102 (e.g., to the access control engine 114 for access control 704 via the communication engine 112 of FIG. 1). The access control engine 114 can authenticate the user device 702a or service 702b by identifying stored tokens within an authentication database 712 that match the provided authentication token. The access control engine 114 can communicate the prompt to the breach mitigation engine 116 for input/output validation 706. The breach mitigation engine 116 can communicate with a sensitive token database 714 and/or a data-loss prevention engine 718, and/or an output validation model 720 for validation of prompts and/or LLM outputs. Following input validation, the performance engine 118 can evaluate the performance of LLMs to route the prompt to an appropriate LLM (e.g., large language model(s) 710). The data generation platform 102 can transmit the generated output to the output validation model 720 for testing and validation of the output (e.g., to prevent security breaches). The output validation model 720 can transmit the validated output to a data consumption system 722, for exposure of the output to the user device 702a and/or the service 702b. In some implementations, the data generation platform 102 can transmit metric values, records, or events associated with the data generation platform 102 to a metric evaluation database 716 (e.g., an event database) for monitoring, tracking, and evaluation of the data generation platform 102.

A user device (e.g., the user device 702a) and/or a module, component, or service of a development pipeline (e.g., a service 702b) can generate and transmit an output generation request to the data generation platform 102 (e.g., via the communication engine 112 of FIG. 1). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from an LLM). The prompt can include a natural language question or command (e.g., in English). For example, the prompt includes a request for an LLM to generate code (e.g., within a specified programming language) that executes a particular operation. Additionally or alternatively, a prompt includes a data processing request, such as a request to extract or process information of a database (e.g., associated with one or more of the third-party databases 108a-108n). The output generation request can be transmitted to the data generation platform 102 using an API call to an API associated with the data generation platform 102 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the data generation platform disclosed herein enable inputs of various formats or combinations thereof.

Figure 8:
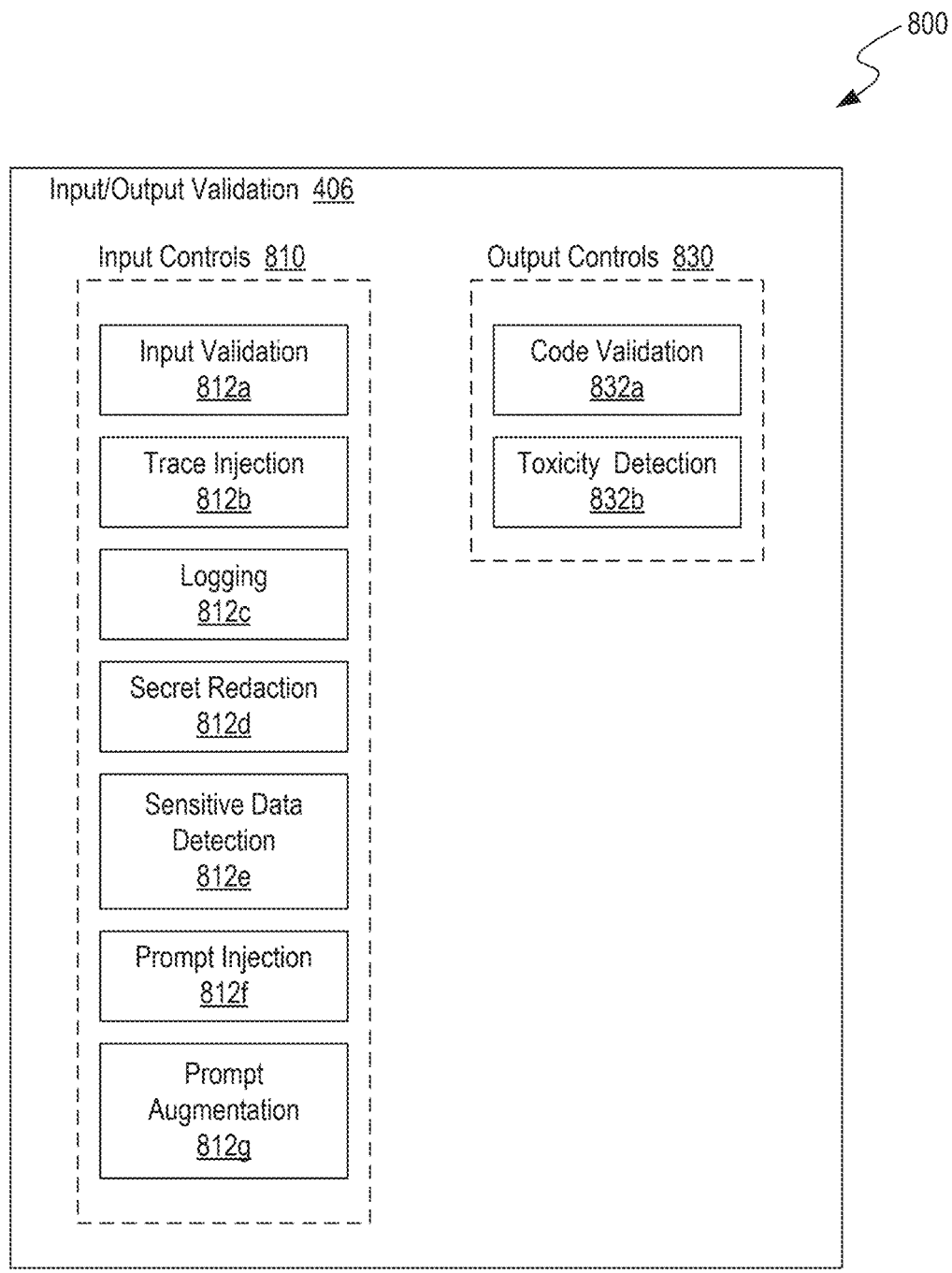
FIG. 8 shows a schematic illustrating components of input/output validation.

FIG. 8 shows a schematic 800 illustrating components of input/output validation, in accordance with some implementations of the present technology. For example, input/output validation 706 (e.g., through breach mitigation engine 116) includes input controls 810 (e.g., associated with prompt validation) that include one or more prompt validation models. The input/output validation 706 can additionally or alternatively include output controls 830, as discussed below. Modules, components, or models associated with the input/output validation 706 can be updated, modified, added, removed, activated, or deactivated (e.g., according to attributes of the output generation request, a classification of the user, or other suitable factors). Thus the breach mitigation engine 116 (and the data generation platform 102) are flexible, modular, and configurable in an application-specific manner.

A prompt (e.g., input) validation model can include a module (e.g., a software component), model, algorithm, or process for validating, authenticating, modifying, and/or controlling inputs (e.g., to LLMs). For example, a prompt validation model includes one or more input controls 810, as shown in FIG. 8. Additionally or alternatively, the input controls 810 can include one or more prompt validation models capable of executing operations including input validation 812a, trace injection 812b, logging 812c, secret redaction 812d, sensitive data detection 812e, prompt injection 812f, and/or prompt augmentation 812g. A prompt validation model can generate a validation indicator. The validation indicator can indicate a validation status (e.g., a binary indicator specifying whether the prompt is suitable for provision to the associated LLM). Additionally or alternatively, the validation indicator can indicate or specify aspects of the prompt that are validated and/or invalid, thereby enabling further modification to cure any associated deficiencies in the prompt.

Figure 9:
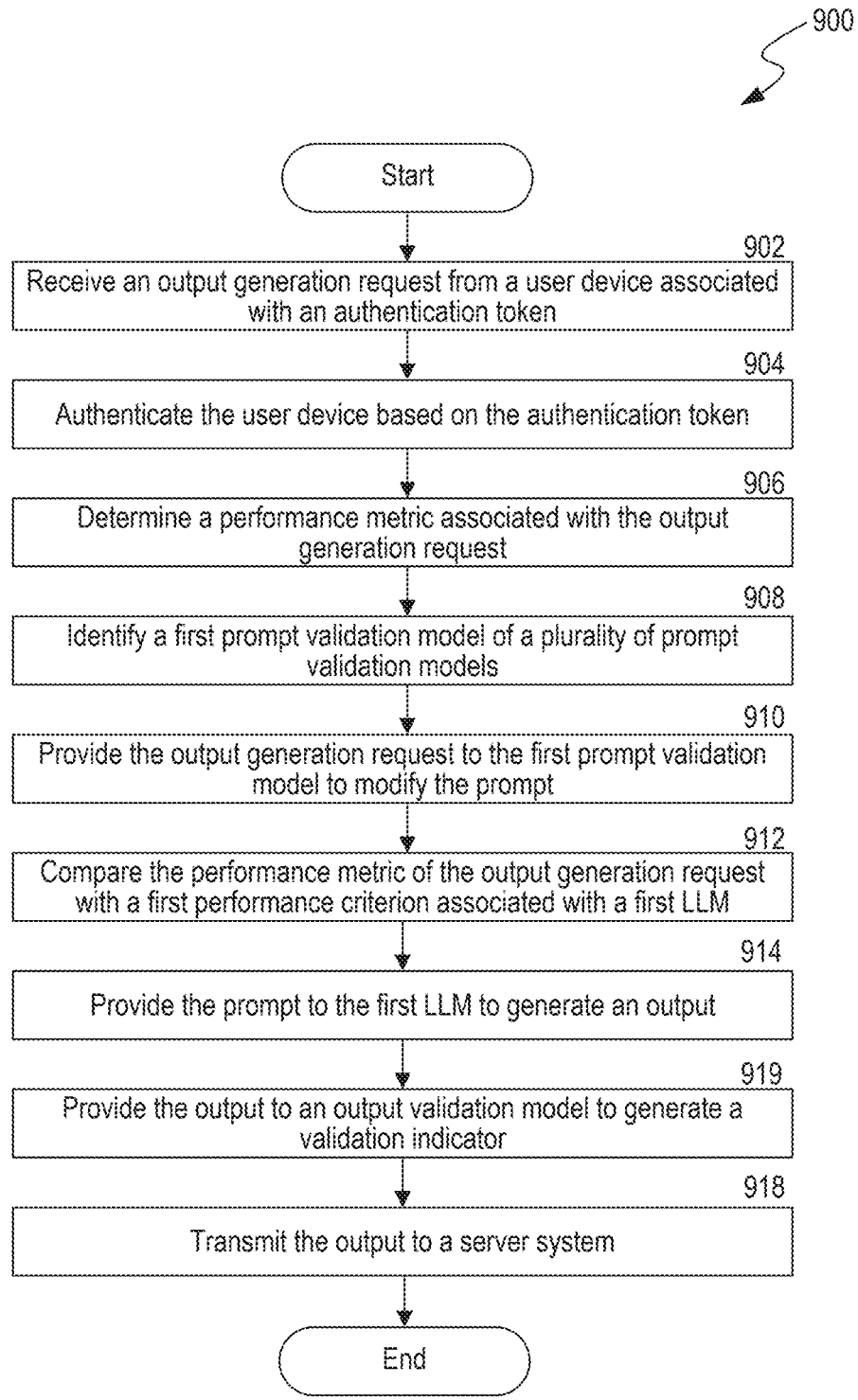
FIG. 9 shows a flow diagram illustrating a process for evaluating natural language prompts for model selection and for validating generated responses.

Process for Validating LLM Inputs and Outputs Using the Data Generation Platform FIG. 9 shows a flow diagram illustrating a process 900 for the dynamic evaluation of large-language model prompts and validation of the resulting outputs, in accordance with some implementations of the present technology. For example, the process 900 is used to generate data and/or code for in the context of data processing or software development pipelines.

At act 902, process 900 can receive an output generation request from a user device (e.g., where the user device is associated with an authentication token). For example, the data generation platform 102 receives an output generation request from a user device, where the user device is associated with an authentication token, and where the output generation request includes a prompt for generation of a text-based output using a first large-language model (LLM). As an illustrative example, the data generation platform 102 receives a request from a user, through a computing device, indicating a query to request the generation of code for a software application. The request can include a user identifier, such as a username, as well as a specification of a particular requested LLM architecture. By receiving such a request, the data generation platform 102 can evaluate the prompt and generate a resulting output in an efficient, secure manner.

In some implementations, process 900 can generate an event record that describes the output generation request. For example, the data generation platform 102 generates, based on the output generation request, an event record including the performance metric value, a user identifier associated with the user device, and the prompt. The data generation platform 102 can transmit, to the server system, the event record for storage in an event database. As an illustrative example, the data generation platform 102 can generate a log of requests from users for generation of outputs (e.g., including the user identifier and associated timestamp). By doing so, the data generation platform 102 can track, monitor, and evaluate the use of system resources, such as LLMs, thereby conferring improved control to system administrators to improve the effectiveness of troubleshooting and system resource orchestration.

At act 904, process 900 can authenticate the user. For example, the data generation platform 102 authenticates the user device based on the authentication token (e.g., credentials associated with the output generation request). As an illustrative example, the data generation platform 102 can identify the user associated with the output generation request and determine whether the user is allowed to submit a request (e.g., and/or whether the user is allowed to select an associated LLM). By evaluating the authentication status of the user, the data generation platform 102 can protect the associated software development pipeline from malicious or unauthorized use.

In some implementations, process 900 can compare the authentication token with a token stored within an authentication database in order to authenticate the user. For example, the data generation platform 102 determines a user identifier associated with the user device. The data generation platform 102 can determine, from a token database, a stored token associated with the user identifier. The data generation platform 102 can compare the stored token and the authentication token associated with the output generation request. In response to determining that the stored token and the authentication token associated with the output generation request match, the data generation platform 102 can authenticate the user device. As an illustrative example, the data generation platform 102 can compare a first one-time password assigned to a user (e.g., as stored within an authentication database) with a second one-time password provided along with the authentication request. By confirming that the first and second passwords match, the data generation platform 102 can ensure that the user submitting the output generation request is authorized to interact to use the requested LLMs.

At act 906, process 900 can determine a performance metric value associated with the output generation request. For example, the data generation platform 102 determines a performance metric value associated with the output generation request, where the performance metric value indicates an estimated resource requirement for the output generation request. As an illustrative example, the data generation platform 102 can determine an estimated memory usage associated with the output generation request (e.g., an estimated memory size needed by the associated LLM to generate the requested output based on the input prompt). By doing so, the data generation platform 102 can determine the load or burden on the system associated with the user's request, thereby enabling the data generation platform 102 to evaluate and suggest resource use optimization strategies to improve the efficiency of the associated development pipeline.

At act 908, process 900 can identify a prompt validation model, for validation of the output generation request, based on an attribute of the request. For example, the data generation platform 102 identifies, based on an attribute of the output generation request, a first prompt validation model of a plurality of prompt validation models (e.g., of a set of input controls). As an illustrative example, the data generation platform 102 can determine a technical application or type of requested output associated with the prompt. The attribute can include an indication that the prompt is requesting code (e.g., for software development purposes). Based on this attribute, the data generation platform 102 can determine a prompt validation model (e.g., an input control) that is suitable for the given prompt or output generation request. By doing so, the data generation platform 102 enables tailored, flexible, and modular controls or safety checks on prompts provided by users, thereby improving the efficiency of the system will targeting possible vulnerabilities in a prompt-specific manner.

At act 910, process 900 can provide the output generation request to the identified model for modification of the prompt. For example, the data generation platform 102 provides the output generation request to the first prompt validation model to modify the prompt. As an illustrative example, the data generation platform 102 can execute one or more input controls to evaluate the prompt, including trace injection, prompt injection, logging, secret redaction, sensitive data detection, prompt augmentation, or input validation. By doing so, the data generation platform 102 can improve the accuracy, security, and stability of prompts that are subsequently provided to LLMs, thereby preventing unintended data leakage (e.g., of sensitive information), malicious prompt manipulation, or other adverse effects.

In some implementations, process 900 can replace or hide sensitive data within the user's prompt. For example, the data generation platform 102 determines that the prompt includes a first alphanumeric token. The data generation platform 102 can determine that one or more records in a sensitive token database include a representation of the first alphanumeric token. The data generation platform 102 can modify the prompt to include a second alphanumeric token in lieu of the first alphanumeric token, where the sensitive token database does not include a record representing the second alphanumeric token. As an illustrative example, the data generation platform 102 can detect that the prompt includes sensitive information (e.g., PII), such as users' personal names, social security numbers, or birthdays. By masking such information, the data generation platform 102 can ensure that such sensitive information is not leaked to or provided to external systems (e.g., via an API request to an externally-housed LLM), thereby mitigating security breaches associated with LLM use.

In some implementations, process 900 can remove forbidden tokens from the user's prompt. For example, the data generation platform 102 determines that the prompt includes a forbidden token. The data generation platform 102 can generate the modified prompt by omitting the forbidden token. As an illustrative example, the data generation platform 102 can determine whether the user's prompt includes inappropriate or impermissible tokens, such as words, phrases, or sentences that are associated with swear words. The data generation platform 102 can mask or replace such inappropriate tokens, thereby improving the quality of inputs to the target LLM and preventing unintended or undesirable outputs as a result.

In some implementations, process 900 can inject a trace token into the user's prompt to improve model evaluation and tracking capabilities. For example, the data generation platform 102 can generate a trace token comprising a traceable alphanumeric token. The data generation platform 102 can generate the modified prompt to include the trace token. As an illustrative example, the data generation platform 102 can inject (e.g., by modifying the prompt to include) tokens, such as characters, words, or phrases, that are designed to enable tracking, evaluation, or monitoring of the prompt any resulting outputs. By doing so, the data generation platform 102 enables evaluation and troubleshooting with respect to LLM outputs (e.g., to detect or prevent prompt manipulation or interception of the prompt or output by malicious actors).

At act 912, process 900 can compare the performance metric value with a performance criterion (e.g., a threshold metric value) that is related to the LLM associated with the output generation request. For example, the data generation platform 102 compares the performance metric value of the output generation request with a first performance criterion associated with the first LLM of a plurality of LLMs. As an illustrative example, the data generation platform 102 can compare a requirement of system resources for execution of the LLM using the given prompt with a threshold value (e.g., as associated with the LLM, the user, and/or the attribute of the output generation request). For example, the data generation platform 102 can compare an estimated system memory usage for use of the LLM with an available system memory availability to determine whether the LLM can be used without adversely affecting the associated computing system. By doing so, the data generation platform 102 can prevent unintended system-wide issues regarding resource use.

In some implementations, process 900 can generate a cost metric value and determine whether the cost metric value satisfies a threshold cost (e.g., a threshold associated with the performance criterion). For example, the data generation platform 102 generates a cost metric value associated with the estimated resource requirement for the output generation request. The data generation platform 102 can determine a threshold cost associated with the first LLM. The data generation platform 102 can determine that the cost metric value satisfies the threshold cost. As an illustrative example, the data generation platform 102 can determine a monetary cost associated with running the LLM with the requested prompt. Based on determining that the cost is greater than a threshold cost (e.g., a remaining budget within the user's allotment), the data generation platform 102 can determine not to provide the prompt to the LLM. Additionally or alternatively, the data generation platform 102 can determine that the cost is less than the threshold cost and, in response to this determination, proceed to provide the prompt to the LLM. By doing so, the data generation platform 102 provides improved flexibility and/or control over the use of system resources (including memory, computational, and/or financial resources), enabling optimization of the associated development pipeline.

At act 914, process 900 can provide the prompt (e.g., as modified by suitable prompt validation models) to the LLM generate the requested output. For example, in response to determining that the performance metric satisfies the first performance criterion, the data generation platform 102 provides the prompt to the first LLM to generate an output. As an illustrative example, the data generation platform 102 can generate a vector representation of the prompt (e.g., using a vectorization system and/or the vector database) and provide the vector representation to a transformer model and/or a neural network associated with an LLM (e.g., through an API call). By doing so, the data generation platform 102 can generate a resulting output (e.g., generated code or natural language data) in response to a query submitted by the user within the prompt.

At act 916, process 900 can validate the output from the LLM. For example, the data generation platform 102 provides the output to an output validation model to generate a validation indicator associated with the output. As an illustrative example, the data generation platform 102 can validate the output of the LLM to prevent security breaches or unintended behavior. For example, the data generation platform 102 can review output text using a toxicity detection model and determine an indication of whether the output is valid or invalid. In some implementations, the data generation platform 102 can determine a sentiment associated with the output and modify the output (e.g., by resubmitting the output to the LLM) to modify the sentiment associated with the output. By doing so, the data generation platform 102 can ensure the accuracy, utility, and reliability of generated data.

In some implementations, process 900 can validate the output by generating and testing an executable program compiled on the basis of the output. For example, the data generation platform 102 extracts a code sample from the output, where the code sample includes code for a software routine. The data generation platform 102 can compile, within a virtual machine of the system, the code sample to generate an executable program associated with the software routine. The data generation platform 102 can execute, within the virtual machine, the software routine using the executable program. The data generation platform 102 can detect an anomaly in the execution of the software routine. In response to detecting the anomaly in the execution of the software routine, the data generation platform 102 can generate the validation indicator to include an indication of the anomaly. As an illustrative example, the data generation platform 102 can generate a validation indicator based on determining that the output contains code and testing the code (and/or the compiled version of the code) in an isolated environment for potential adverse effects, viruses, or bugs. By doing so, the data generation platform 102 can ensure the safety and security of generated code, thereby protecting the software development pipeline from security breaches or unintended behavior.

At act 918, process 900 can enable access to the output by the user. For example, in response to generating the validation indicator, the data generation platform 102 transmits the output to a server system enabling access to the output by the user device. As an illustrative example, the data generation platform 102 can provide the output to a server that enables users to access the output data (e.g., through login credentials) for consumption of the data and/or use in other downstream applications. As such, the data generation platform 102 provides a robust, flexible, and modular way to validate LLM-generated content.

Figure 10:
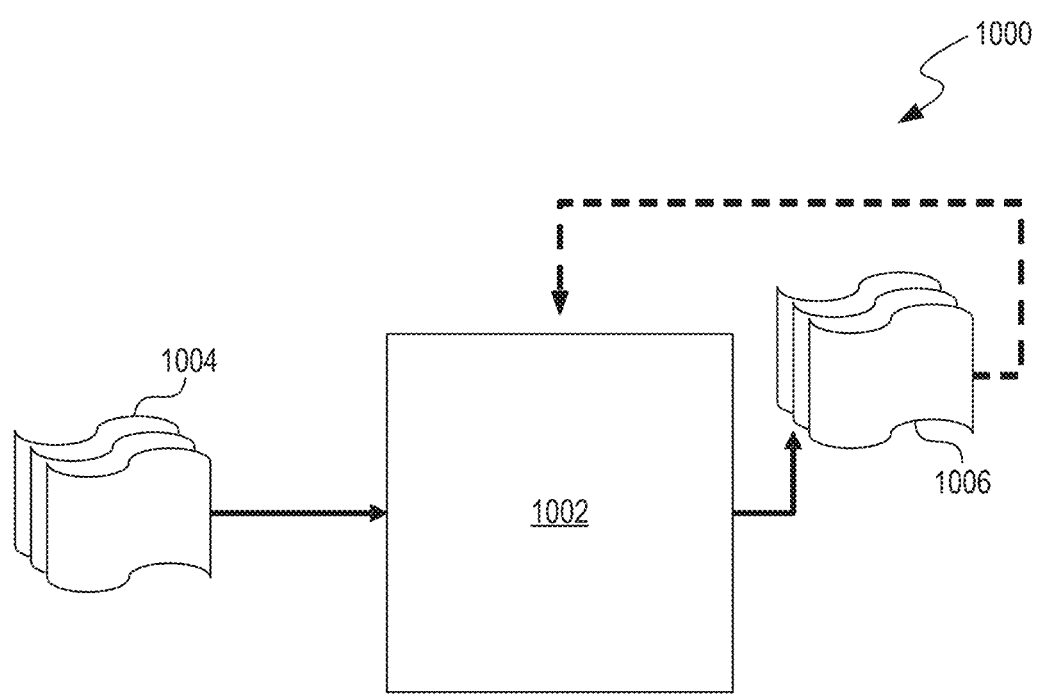
FIG. 10 shows a diagram of an artificial intelligence (AI) model.

FIG. 10 shows a diagram of an AI model, in accordance with some implementations of the present technology. AI model 1000 is shown. In some implementations, AI model 1000 can be any AI model. In some implementations, AI model 1000 can be part of, or work in conjunction with, server computing device 606 (FIG. 6). For example, server computing device 606 can store a computer program that can use information obtained from AI model 1000, provide information to AI model 1000, or communicate with AI model 1000. In other implementations, AI model 1000 can be stored in database 608 and can be retrieved by server computing device 606 to execute/process information related to AI model 1000, in accordance with some implementations of the present technology.

In some implementations, AI model 1000 can be a machine learning model 1002. Machine learning model 1002 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 10, machine learning model 1002 can take inputs 1004 and provide outputs 1006. In one use case, outputs 1006 can be fed back to machine learning model 1002 as input to train machine learning model 1002 (e.g., alone or in conjunction with user indications of the accuracy of outputs 1006, labels associated with the inputs, or other reference feedback information). In another use case, machine learning model 1002 can update its configurations (e.g., weights, biases, or other parameters) based on its assessment of its prediction (e.g., outputs 1006) and reference feedback information (e.g., user indication of accuracy, reference labels, or other information). In another use case, where machine learning model 1002 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1002 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Model Selection Using the Data Generation Platform

The data generation platform disclosed herein enables dynamic model selection for processing inputs (e.g., prompts) to generate associated outputs (e.g., responses to the prompts). For example, the data generation platform can redirect a prompt to a second LLM (e.g., distinct from the first LLM selected by the user within the output generation request). Additionally or alternatively, the data generation platform operates with other suitable machine learning model algorithms, inputs (e.g., including images, multimedia, or other suitable data), and outputs (e.g., including images, video, or audio). By doing so, the data generation platform 102 can mitigate adverse system performance (e.g., excessive incurred costs or overloaded memory devices or processors) by estimating system effects associated with the output generation request (e.g., the prompt) and generating an output using an appropriate model.

FIG. 11 shows a schematic of a data structure 1100 illustrating a system state and associated threshold metric values, in accordance with some implementations of the present technology. For example, the data structure 1100 includes usage values 1104 and maximum values 1106 for performance metrics 1102. The data generation platform 102 can determine threshold metric values based on data associated with system performance (e.g., at the time of receipt of the output generation request). By doing so, the data generation platform 102 enables dynamic evaluation of requests for output generation, as well as dynamic selection of suitable models with which to process such requests.

As discussed in relation to FIG. 7 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 1102, such as CPU usage, memory usage, hard disk space usage, a number of input tokens (e.g., system-wide, across one or more models associated with the data generation platform 102), and/or cost incurred. The data structure 1100 corresponding to the system state can include usage values 1104 and maximum values 1106 associated with the respective performance metrics 1102.

In some implementations, the data generation platform 102 determines a threshold metric value (e.g., of the threshold metric values 1108 of FIG. 11) based on a usage value and maximum value for a corresponding performance metric (e.g., of performance metrics 1102). For example, the data generation platform 102 determines a cost incurred up to a given point of time or within a predetermined time period associated with machine learning models of the data generation platform 102. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the data generation platform 102 can determine a threshold metric value associated with generating an output using the selected model based on the prompt.

For example, the data generation platform 102 determines the threshold metric value based on a difference between the usage value and the maximum value. The data generation platform 102 can determine a threshold metric value associated with a cost allowance for processing a prompt based on a difference between a maximum value (e.g., a maximum budget) and a usage value (e.g., a cost incurred). As such, the data generation platform 102 can handle situations where the system's performance metric changes over time.

In some implementations, the data generation platform 102 can determine or predict a threshold metric value based on providing the output generation request and the system state to a threshold evaluation model. For example, the data generation platform 102 can provide the input, the indication of a selected model, and information of the system state to the threshold evaluation model to predict a threshold metric value. To illustrate, the data generation platform 102 can predict a future system state (e.g., a time-series of performance metric values associated with the system) based on the output generation request, the current system state, and the selected model. The data generation platform 102 can estimate an elapsed time for the generation of output using the requested model; based on this elapsed time, the data generation platform 102 can determine a predicted system state throughout the output generation, thereby enabling more accurate estimation of the threshold metric value. The threshold evaluation model can be trained on historical system usage (e.g., performance metric value) information associated with previous output generation requests. As such, the data generation platform 102 enables the determination of threshold metric values on a dynamic, pre-emptive basis, thereby improving the ability of the data generation platform 102 to predict and handle future performance issues.

In some implementations, the system state is generated with respect to a particular user and/or group of users. For example, the data generation platform 102 determines a system state associated with a subset of resources assigned to a given user or group of users. To illustrate, the data generation platform 102 can determine a maximum cost value associated with output generation for a given user or subset of users of the data generation platform 102. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using LLMs by users of the group). As such, the data generation platform 102 can determine an associated threshold metric value that is specific to the particular associated users. By doing so, data generation platform 102 enables flexible, configurable requirements and limits to system resource usage based on the identity of users submitting prompts.

In some implementations, the data generation platform 102 determines an estimated performance metric value, as discussed in relation to FIG. 7. For example, the data generation platform 102 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., LLMs). For example, the performance metric evaluation model can generate an estimated cost value for processing a prompt using the first LLM to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the data generation platform 102 evaluates the suitability of a prompt for a given model based on comparing a composite metric value with a threshold composite value. For example, the data generation platform 102 generates a composite performance metric value based on a combination of performance metrics (e.g., the performance metrics 1102 as shown in FIG. 11). To illustrate, the data generation platform 102 can generate a composite performance metric based on multiple performance metrics of the computing system associated with the machine learning models. Based on the metric, the data generation platform 102 can generate an estimated composite metric value corresponding to the composite metric (e.g., by calculating a product of values associated with the respective performance metrics) and compare the estimated composite metric value with an associated threshold metric value. As such, data generation platform 102 enables a more holistic evaluation of the effect of a given output generation request on system resources, thereby improving the accuracy and efficiency of the data generation platform 102 in selecting a suitable model. In some implementations, the data generation platform 102 can assign particular performance metrics a respective weight and calculate a value for the composite metric accordingly. Accordingly, the data generation platform 102 enables the prioritization of relevant performance metrics (e.g., cost) over other metrics (e.g., memory usage) according to system requirements.

Figure 12:
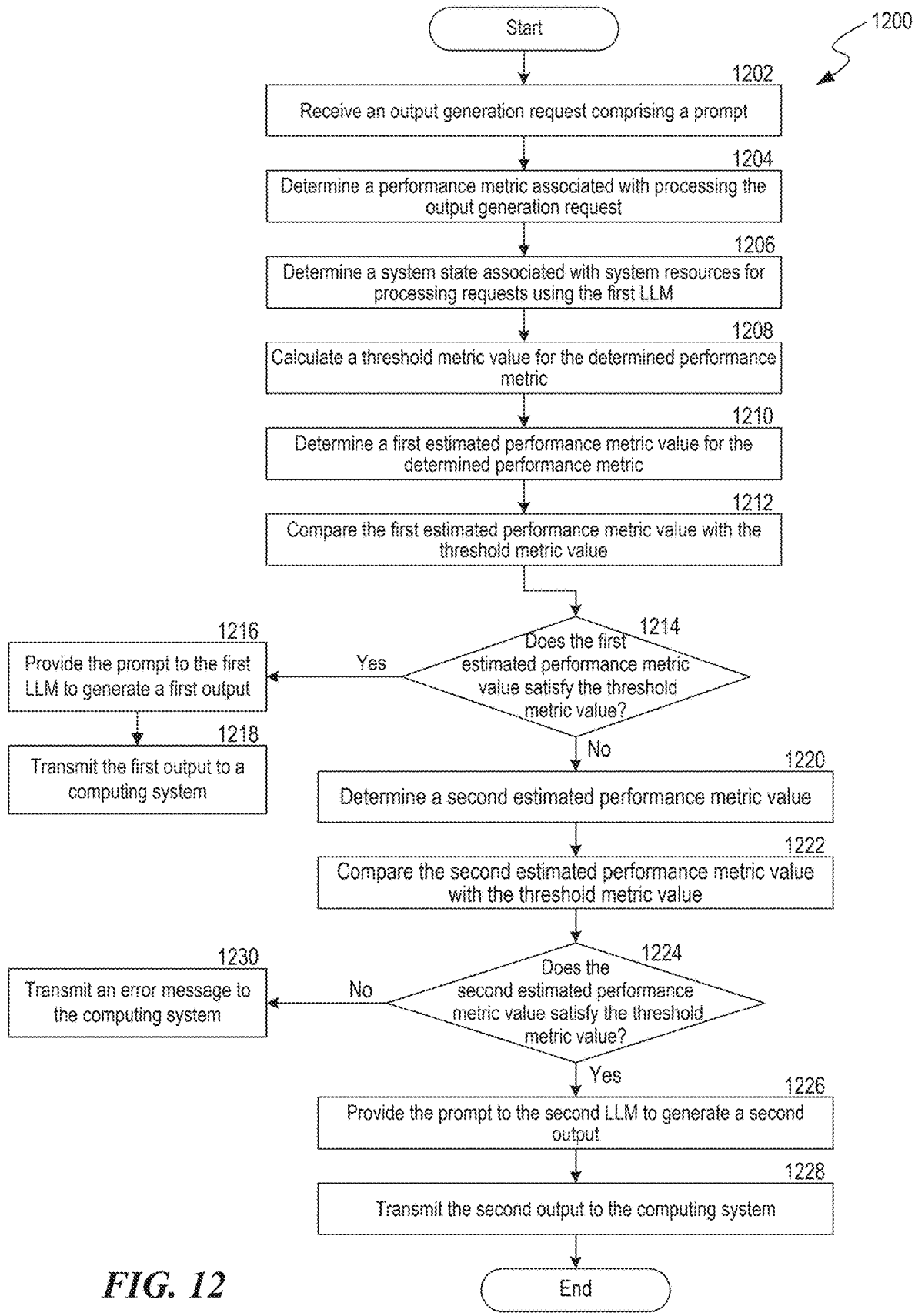
FIG. 12 shows a flow diagram illustrating a process for dynamic selection of models based on evaluation of user prompts.

FIG. 12 shows a flow diagram illustrating a process 1200 for dynamic selection of models based on evaluation of user inputs (e.g., prompts), in accordance with some implementations of the present technology. For example, the process 1200 enables selection of an LLM for generation of an output (e.g., software-related code samples) based on an input (e.g., a text-based prompt) to prevent overuse of system resources (e.g., to ensure that sufficient system resources are available to process the request).

At act 1202, the process 1200 can receive an input for generation of an output using a model. For example, the process 1200 receives, from a user device, an output generation request comprising an input (e.g., prompt) for generation of an output using a first model (e.g., an LLM) of a plurality of models. As an illustrative example, the data generation platform 102 (e.g., through the communication engine 112) receives a prompt indicating a desired output, such as a text-based instruction for the generation of software-related code samples (e.g., associated with a particular function). The output generation request can include an indication of a selected model (e.g., LLM) for processing the prompt. As such, the data generation platform 102 can evaluate the effect of generating an output using the selected model based on the prompt (e.g., or other suitable inputs) on the basis of the content or nature of the request (e.g., based on a user identifier associated with the request).

At act 1204, the process 1200 can determine a performance metric associated with processing the output generation request. For example, the process 1200 determines a performance metric associated with processing the output generation request. As an illustrative example, the data generation platform 102 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with LLMs. In some implementations, the data generation platform 102 (e.g., through the performance engine 118) determines multiple performance metrics (e.g., associated with the system state) for evaluation of the effects (e.g., of generating an output based on the prompt) on the system.

At act 1206, the process 1200 can determine a system state associated with system resources. For example, the process 1200 determines a system state associated with system resources for processing requests using the first model of the plurality of models. As an illustrative example, the performance engine 118 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the data generation platform 102, through communication engine 112 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the data generation platform 102 can evaluate the received prompt to determine whether the selected model is suitable for generating an associated output.

At act 1208, the process 1200 can calculate a threshold metric value (e.g., associated with the output generation request). For example, the process 1200 calculate, based on the system state, a threshold metric value for the determined performance metric. As an illustrative example, the data generation platform 102 (e.g., through the performance engine 118) determines an indication of computational or monetary resources available for processing the input or prompt (e.g., to generate an associated output). The data generation platform 102 can determine an available budget (e.g., a threshold cost metric) and/or available memory space (e.g., remaining space within a memory device of the system) for processing the request. By doing so, the data generation platform 102 can evaluate the effect of generating an output based on the prompt using the specified model (e.g., LLM) with respect to system requirements or constraints.

In some implementations, the data generation platform 102 (e.g., through performance engine 118) can determine the threshold metric value to include the allowance value. For example, the performance engine 118 determines that the performance metric corresponds to a cost metric. The performance engine 118 can determine a maximum cost value associated with output generation associated with the system. The performance engine 118 can determine, based on the system state, a sum of cost metric values for previous output generation requests associated with the system. The performance engine 118 can determine, based on the maximum cost value and the sum, an allowance value corresponding to the threshold metric value. The performance engine 118 can determine the threshold metric value comprising the allowance value. As an illustrative example, the performance engine 118 determines a remaining budget associated with LLM model operations. By doing so, the performance engine 118 can mitigate cost overruns associated with output text generation, thereby improving the efficiency of the data generation platform 102.

In some implementations, the data generation platform 102 (e.g., through the performance engine 118) can determine the threshold metric value based on a user identifier and corresponding group associated with the output generation request. For example, the data generation platform 102 determines, based on the output generation request, a user identifier associated with a user of the user device. The performance engine 118 can determine, using the user identifier, a first group of users, wherein the first group comprises the use. The performance engine 118 can determine the allowance value associated with the first group of users. As an illustrative example, the performance engine 118 determines an allowance value (e.g., a budget) that is specific to a group of users associated with the user identifier (e.g., a username) of the output generation request. As such, the data generation platform 102 enables tracking of resources assigned or allocated to particular groups of users (e.g., teams), thereby improving the flexibility of allocation of system resources.

In some implementations, the data generation platform 102 (e.g., through the performance engine 118) can determine the threshold metric value based on a usage value for a computational resource. For example, the data generation platform 102 determines that the performance metric corresponds to a usage metric for a computational resource. The performance engine 118 can determine an estimated usage value for the computational resource based on the indication of an estimated computational resource usage by the first model (e.g., LLM) when processing the input (e.g., prompt) with the first model. The performance engine 118 can determine a maximum usage value for the computational resource. The performance engine 118 can determine, based on the system state, a current resource usage value for the computational resource. The performance engine 118 can determine, based on the maximum usage value and the current resource usage value, an allowance value corresponding to the threshold metric value. The performance engine 118 can determine the threshold metric value comprising the allowance value. As an illustrative example, the performance engine 118 can determine a threshold metric value based on a remaining available set of resources that are idle (e.g., processors that are not being used or free memory). As such, the data generation platform 102 enables dynamic evaluation of the state of the system for determination of whether sufficient resources are available for processing the output.

At act 1210, the process 1200 can determine an estimated performance metric value associated with processing the output generation request. For example, the process 1200 determines a first estimated performance metric value for the determined performance metric based on an indication of an estimated resource usage by the first model when processing the input included in the output generation request. As an illustrative example, the data generation platform 102 determines a prediction for resource usage for generating an output using the indicated model (e.g., an LLM associated with the determined performance metric). The data generation platform 102 (e.g., through the performance engine 118) can determine a number of input tokens within the input or prompt and predict a cost and/or a memory usage associated with processing the prompt using the selected model. By doing so, the data generation platform 102 can evaluate the effects of processing the input on system resources for evaluation of the suitability of the model for generating the requested output.

In some implementations, the data generation platform 102 generates a composite performance metric value based on more than one performance metric. For example, the performance engine 118 determines that the performance metric includes a composite metric associated with a plurality of system metrics. The performance engine 118 can determine, based on the system state, a threshold composite metric value. The performance engine 118 can determine a plurality of estimated metric values corresponding to the plurality of system metrics. Each estimated metric value of the plurality of estimated metric values can indicate a respective estimated resource usage associated with processing the output generation request with the first model. The performance engine 118 can determine, using the plurality of estimated metric values, a composite metric value associated with processing the output generation request with the first model. The performance engine 118 can determine the first estimated performance metric value comprising the composite metric value. As an illustrative example, the data generation platform 102 can generate a geometric mean of estimated values associated with various performance metrics (e.g., estimated memory usage, CPU utilization, and/or cost) and determine an associated metric. In some implementations, the data generation platform 102 can generate a weighted geometric mean based on weightings assigned to respective values of the performance metric. By doing so, the data generation platform 102 enables flexible, targeted evaluation of system behavior associated with generating outputs using LLMs.

In some implementations, the data generation platform 102 generates a performance metric value corresponding to a number of input or output tokens. For example, the first estimated performance metric value corresponds to a number of input or output tokens, and wherein the threshold metric value corresponds to a maximum number of tokens. As an illustrative example, the data generation platform 102 determines a number of input tokens (e.g., words or characters) associated with the input or prompt. Additionally or alternatively, the data generation platform 102 determines (e.g., predicts or estimates) a number of output tokens associated with the output in response to the prompt. For example, the data generation platform 102 can estimate a number of output tokens by identifying instructions or words associated with prompt length within the prompt (e.g., an instruction to keep the generated output within a particular limit). By doing so, the data generation platform 102 can compare the number of tokens associated with processing the prompt with an associated threshold number of tokens to determine whether the selected model is suitable for the generation task. As such, the data generation platform 102 can limit wordy or excessive output generation requests, thereby conserving system resources.

In some implementations, the data generation platform 102 generates the estimated performance metric value based on providing the prompt to an evaluation model. For example, the data generation platform 102 provides the input (e.g., the prompt) and an indication of the first model (e.g., LLM) to a performance metric evaluation model to generate the first estimated performance metric value. To illustrate, the data generation platform 102 can provide the input to a machine learning model (e.g., an artificial neural network) to generate an estimate of resources used (e.g., an estimated memory usage or cost) based on historical data associated with output generation. By doing so, the data generation platform 102 improves the accuracy of estimated performance metric value determination, thereby mitigating overuse of system resources.

In some implementations, the data generation platform 102 trains the evaluation model based on previous inputs (e.g., prompts) and associated performance metric values. For example, the data generation platform 102 obtains, from a first database, a plurality of training prompts and respective performance metric values associated with providing respective training prompts to the first LLM. The data generation platform 102 can provide the plurality of training prompts and respective performance metric values to the performance metric evaluation model to train the performance metric evaluation model to generate estimated performance metric values based on prompts. For example, the data generation platform 102 can retrieve previous prompts submitted by users, as well as previous system states when the prompts are submitted to the associated model (e.g., LLM). Based on these previous prompts and system states, the data generation platform 102 can train the performance metric evaluation model to generate estimated performance metrics based on inputs.

At act 1212, the process 1200 can compare the first estimated performance metric value with the threshold metric value. As an illustrative example, the data generation platform 102 can determine whether the first estimated performance metric value is greater than, equal to, and/or less than the threshold metric value. At act 1214, the process 1200 can determine whether the first estimated performance metric value satisfies the threshold metric value. (e.g., by determining that the estimated resource usage value is less than or equal to a threshold metric value). For example, the data generation platform 102 can determine whether an estimated cost value associated with processing the prompt using the first model is less than or equal to an allowance value (e.g., a remaining balance within a budget). By doing so, the data generation platform 102 can ensure that the prompt is processed when suitable system resources are available.

At act 1216, the process 1200 can provide the input (e.g., prompt) to the first model in response to determining that the first estimated performance metric value satisfies the threshold metric value. For example, in response to determining that the first estimated performance metric value satisfies the threshold metric value, the process 1200 provides the prompt to the first model to generate a first output by processing the input (e.g., prompt) included in the output generation request. As an illustrative example, the data generation platform 102 can transmit the prompt (e.g., through the communication engine 112 and/or via an associated API) to the first LLM for generation of an associated output. To illustrate, the data generation platform 102 can generate a vector representation of the prompt (e.g., through word2vec or another suitable algorithm) and generate a vector representation of the output via the first LLM. By doing so, the data generation platform 102 can process the user's output generation request with available system resources (e.g., monetary resources or computational resources).

At act 1218, the process 1200 can generate the output for display on a device associated with the user. For example, the process 1200 transmits the first output to a computing system enabling access to the first output by the user device. As an illustrative example, the data generation platform 102 (e.g., through the communication engine 112) can transmit the output from the first LLM to a computing system (e.g., a server) from which the user can access the generated output (e.g., through an API call and/or via a user interface). By doing so, the data generation platform 102 enables generation of outputs (e.g., natural language outputs) using models specified by the user when system resources are available to process associated prompts.

At act 1220, the process 1200 can determine a second estimated performance metric value associated with a second model (e.g., LLM) in response to determining that the first estimated performance metric value does not satisfy the threshold metric value. For example, in response to determining that the first estimated performance metric value does not satisfy the threshold metric value, the process 1200 determines a second estimated performance metric value for the determined performance metric based on an indication of an estimated resource usage by a second model of the plurality of models when processing the prompt included in the output generation request. As an illustrative example, the data generation platform 102 can determine a second estimate for a cost associated with processing the output with the second model and determine whether this cost estimate is consistent with the threshold cost value (e.g., determine whether the cost is less than the budget available to the user for the output generation request).

At act 1222, the process 1200 can compare the second estimated performance metric value with the threshold metric value. For example, at act 1224, the process 1200 can determine whether the second estimated performance metric value satisfies the threshold metric value. As an illustrative example, the data generation platform 102 can determine whether the cost metric value associated with processing the input (e.g., prompt) with the second model is greater than, less than, and/or equal to the threshold metric value (e.g., associated with an allowance or budget). By doing so, the data generation platform 102 can ensure that sufficient system resources are available for processing the prompt using the second model, thereby enabling redirection of output generation requests to an appropriate model when the selected model is unsuitable due to insufficient resource availability.

At act 1226, the process 1200 can generate a second output by providing the prompt to the second model in response to determining that the second estimated performance metric value satisfies the threshold metric value. For example, the process 1200 provides the prompt to the second model to generate a second output by processing the input (e.g., prompt) included in the output generation request. As an illustrative example, the data generation platform 102 (e.g., through the communication engine 112) can generate vector representations of the prompt and transmit these (e.g., via an API call) to a device associated with the second model for generation of the associated output. By doing so, the data generation platform 102 enables processing of the output generation request using a model (e.g., the second LLM) that satisfies system resource limitations or constraints, thereby improving the resilience and efficiency of the data generation platform 102.

In some implementations, the process 1200 can determine the second model based on a selection of the model by the user. For example, in response to determining that the first estimated performance metric value does not satisfy the threshold metric value, the data generation platform 102 transmits a model (e.g., LLM) selection request to the user device. In response to transmitting the model selection request, the data generation platform 102 obtains, from the user device, a selection of the second model. The data generation platform 102 can provide the input (e.g., prompt) to the second model associated with the selection. As an illustrative example, the data generation platform 102 can generate a message for the user requesting selection of another LLM for generation of an output in response to the prompt. In response to the message, the data generation platform 102 can receive instructions from the user (e.g., via a command or function) for redirection of the prompt to another suitable model that satisfies performance requirements for the system.

In some implementations, the process 1200 can determine the second model based on a selection of the model on a GUI (e.g., from a list of models with performance metrics that satisfy the performance requirements). For example, the data generation platform 102, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the prompt to the second model. To illustrate, the data generation platform 102 can generate indications of one or more recommended LLMs with estimated performance metric values (e.g., estimated cost values) that are compatible with the associated threshold performance metric (e.g., a threshold cost metric). By doing so, the data generation platform 102 can present options for LLMs (e.g., that satisfy system performance constraints) for processing the user's prompt, conferring the user with increased control over output generation.

At act 1228, the process 1200 can generate the output for display on a device associated with the user. For example, the process 1200 transmits the second output to the computing system enabling access to the second output by the user device. As an illustrative example, the data generation platform 102 (e.g., through communication engine 112) transmits the second output to a computing system that enables access to the output by the user (e.g., through an associated API or GUI).

At act 1230, the process 1200 can transmit an error message to the computing system in response to determining that the second estimated performance metric value does not satisfy the threshold metric value. As an illustrative example, the data generation platform 102 (e.g., through the communication engine 112) can generate a message that indicates that the input (e.g., prompt) is unsuitable for provision the second model due to insufficient resources. Additionally or alternatively, the data generation platform 102 can determine a third model (e.g., LLM) with satisfactory performance characteristics (e.g., with a third estimated performance metric value that satisfies the threshold metric value). By doing so, the data generation platform 102 enables generation of an output based on the prompt via an LLM such that system resources are conserved or controlled.

In some implementations, the process 1200 generates a recommendation for an LLM by providing the output generation request (e.g., the associated prompt) to a selection model. For example, in response to determining that the first estimated performance metric value does not satisfy the threshold metric value, the data generation platform 102 generates, for display on a user interface of the user device, a request for user instructions. The request for user instructions can include a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the input (e.g., prompt) to the second model. As an illustrative example, the data generation platform 102 can evaluate the prompt for selection of a model that is compatible with resource requirements and/or a task associated with the output generation request. For example, the data generation platform 102 can determine an attribute associated with the prompt (e.g., that the prompt is requesting the generation of a code sample) and reroute the prompt to a model that is configured to generate software-related outputs. By doing so, the data generation platform 102 can recommend models that are well-suited to the user's requested task, thereby improving the utility of the disclosed data generation platform.

Dynamic Output Validation Using the Data Generation Platform

Figure 13:
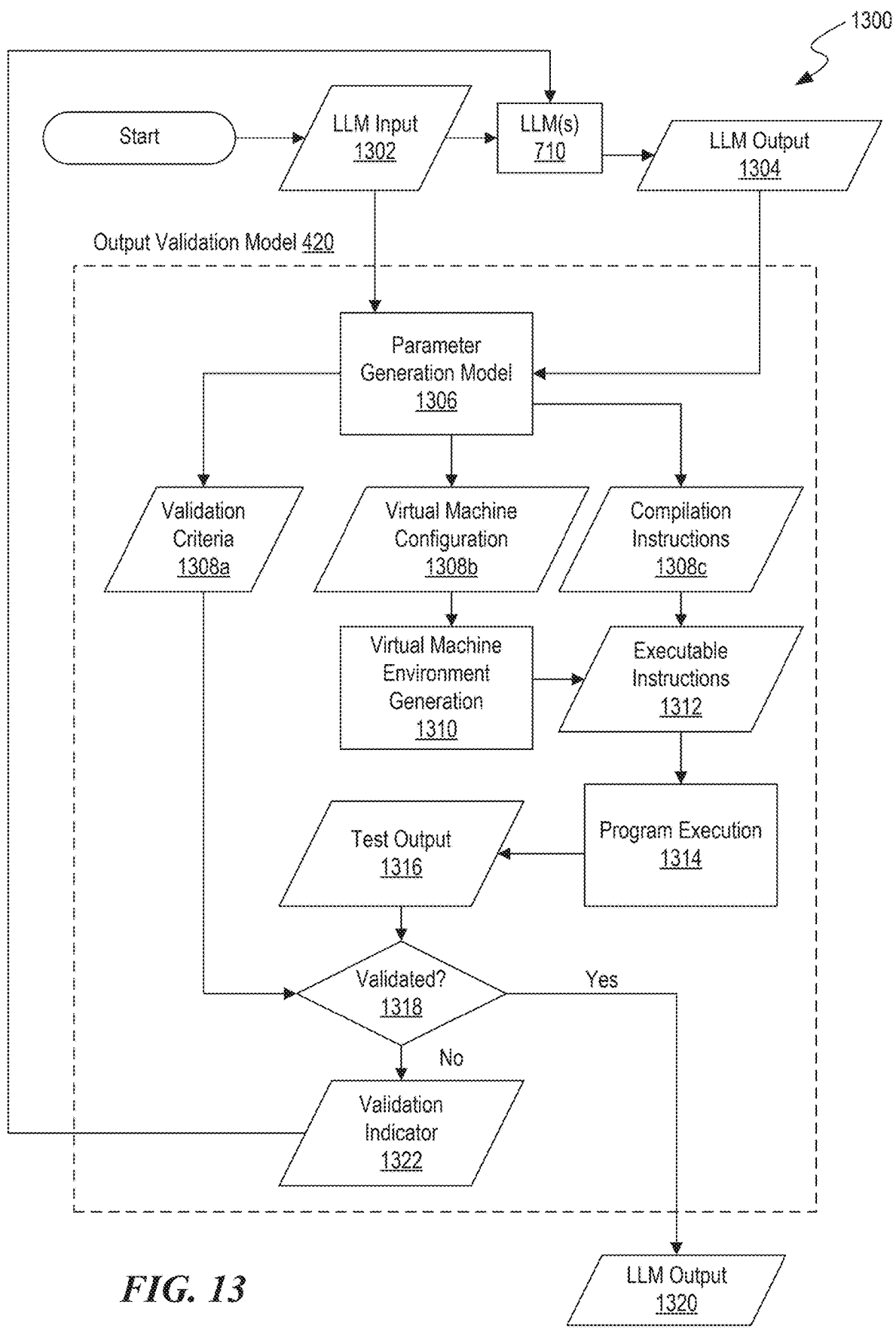
FIG. 13 shows a schematic illustrating a process for validating model outputs in an isolated environment.

FIG. 13 shows a schematic illustrating a process 1300 for validating model outputs in an isolated environment, in accordance with some implementations of the present technology. The process 1300 enables the data generation platform 102 to evaluate and/or validate outputs from one or more machine learning models associated with the platform. For example, the data generation platform 102 can evaluate the safety, accuracy, and/or effects of code samples generated by an LLM in response to a user's prompt.

For example, the data generation platform 102 can receive (e.g., through the communication engine 112) an input (e.g., a prompt for an LLM, such as the LLM input 1302) for generation of software-related information by an associated machine learning model. For example, the input includes a prompt for generation of a code sample using the LLM(s) 710 of FIG. 7. In some implementations, the input includes suitable data, including an image, video, text string, or audio recording (e.g., a voice recording). By providing the prompt (or other suitable input) to a model (e.g., one or more of LLM(s) 710, or another suitable machine learning model), the generative model engine 120 can generate an associated output, such as LLM output 1304 shown in FIG. 13, in response to the user's output generation request.

The output from a machine learning model can include a code sample. In some implementations, a code sample includes software-related information, such as character strings indicating code snippets in one or more specified programming languages. The code sample can be embedded within the model output including other text (e.g., comments, explanations, or other such information). For example, a user associated with the output generation request can request generation of code samples for use in a particular application and/or for deployment on a specified system. To illustrate, the code sample generated by a model of the data generation platform 102 can include a portion of code in a particular language that adds a functionality to an existing application (e.g., for modification of the existing application's source code to include the generated code). The code sample can include one or more function definitions, variable definitions, algorithms, processes, or other suitable information. Additionally or alternatively, the code sample includes binary/executable files and/or other software-related information or data. By generating code sample, the data generation platform 102 enables improvements to software development efficiency by reducing the need for manual writing of code. For example, the data generation platform 102 generates application code, system-level code, pseudocode, coding instructions, and/or guidance for a model (e.g., an LLM) to generate, enhance, or modify existing code.

The output validation model 720, as shown in FIG. 7, can validate the output generated by one or more machine learning models (e.g., the LLM output 1304). For example, the output validation model 720 receives the LLM output 1304 and the associated input (e.g., the LLM input 1302) and provides such data to a parameter generation model 1306 for generation of parameters associated with output validation. Such parameters can include validation criteria 1308a, a virtual machine configuration 1308b, and/or compilation instructions 1308c.

A parameter generation model can include a model configured to generate parameters (e.g., for a validation test). The parameter generation model 1306 can include a machine learning model (e.g., as described previously) configured to receive an input (e.g., the LLM input 1302 and/or other information associated with the output generation request, such as a user identifier), and/or a model output (e.g., the LLM output 1304 and/or other information generated by machine learning models). For example, the parameter generation model 1306 receives a representation of the user's request to generate code associated with deployment of a software application, as well as the code sample generated by an LLM in response to the user's request. Based on such information, the data generation platform 102 can generate validation test parameters that enable validation of the generated code sample (e.g., within an isolated environment corresponding to a virtual machine). The validation test parameters can include one or more of validation criteria 1308a, a virtual machine configuration 1308b, and/or compilation instructions 1308c.

The validation test parameters can include a virtual machine configuration. FIG. 14 shows a data structure 1400 depicting a virtual machine configuration (e.g., the virtual machine configuration 1308b), in accordance with some implementations of the present technology. The virtual machine configuration can include a characterization of an isolated testing environment for compiling, executing, and/or evaluating generated code samples. For example, the parameter generation model 1306 can generate a virtual machine configuration, including an indication of a hardware configuration 1410, a software configuration 1430, and/or a communication configuration 1450 for the testing environment (e.g., a virtual machine environment).

The hardware configuration 1410 can include a characterization of hardware components (e.g., as associated with a virtual machine and/or a run-time environment). For example, a hardware configuration includes an indication of a system architecture, such as a CPU architecture (e.g., x86 and/or ARM) or a GPU architecture (e.g., Single Instruction Single Data (SISD), Single Instruction Multiple Data (SIMD), Multiple Instruction Single Data (MISD), and/or other suitable architectures), an indication of a storage type (e.g., an SSD and/or an HDD), an indication of a storage space (e.g., a size associated with the storage in bytes), and/or an indication of a memory type and/or space (e.g., associated with run-time or random-access memory). In some implementations, the hardware configuration includes the specification of peripherals and/or other devices associated with a computing device. The parameter generation model can generate the hardware configuration depending on the LLM input 1302 and/or the LLM output 1304 (e.g., the user's prompt and/or the generated code sample) based on a determination of hardware requirements associated with execution of the associated application. For example, the parameter generation model 1306 can determine that the code sample includes a request to transmit information to a physical display and can generate the hardware configuration to include an indication of a suitable display peripheral. By generating an indication of a hardware configuration associated with a validation test, the data generation platform 102 enables the specification of properties of a simulated computing device for testing generated code, thereby improving the accuracy and sensitivity of code validation.

The software configuration 1430 can include a characterization of software components (e.g., applications, operating systems, and/or other such components) associated with a virtual machine and/or run-time environment. For example, as shown in FIG. 14, the software configuration 1430 includes an indication of an operating system and/or version, and definition of environment variables (e.g., including a characterization of a home directory path, a display identifier, and/or a system language/locale). In some implementations, the software configuration 1430 includes an indication of libraries to be linked to the compiled executable instructions and/or other dependencies, such as other applications. The parameter generation model can generate the software configuration depending on the LLM input 1302 and/or the LLM output 1304 (e.g., the user's prompt and/or the generated code sample) based on a determination of software requirements associated with execution of the associated application. For example, the parameter generation model 1306 can determine that the code sample includes an indication of a particular software library and can generate the software configuration to include the software library. By specifying a software configuration for the validation test, the data generation platform 102 enables testing of generated code samples in an environment that includes any associated requirements for execution of the associated software application.

The communication configuration 1450 can include a characterization of communication links. For example, the communication configuration 1450 includes information relating to communication interfaces, peripherals, associated protocols, port configurations, data transmission rates, and/or security settings. To illustrate, the communication configuration 1450, as shown in FIG. 14, can include information relating to a standard associated with communication interfaces (e.g., wired or wireless network interfaces and/or interfaces with peripheral devices, such as computer mice, keyboards, and/or displays). The communication configuration 1450 can include an indication of a wireless network type and/or associated security standards, such as encryption standards. Additionally or alternatively, the communication configuration 1450 includes an indication of ports available for transmission of data (e.g., including information relating to associated communication protocols, including Hypertext Transfer Protocol (HTTP), Transmission Control Protocol/Internet Protocol (TCP/IP), and/or File Transfer Protocol (FTP) information). For example, the parameter generation model 1306 can determine that the code sample includes a network request (e.g., to download information via HTTP), and can generate the communication configuration to include a mechanism for accessing the internet. By generating information relating to communication configurations associated with a testing environment for generated code samples, the data generation platform 102 can accurately simulate execution of the associated application.

The data generation platform 102, at the operation 1310 shown in FIG. 13, can generate a virtual machine environment that is consistent with the generated virtual machine configuration 1308*b*. A virtual machine environment can include a subsystem associated with an environment (e.g., a virtual environment) in which computer programs can run, such as a run-time environment. The virtual machine environment can reside on one or more devices (e.g., in a cloud architecture) and can include containerized and/or non-containerized applications. For example, the environment can specify, define, and/or characterize memory management, environment variables, mechanisms for passing parameters between procedures, interfaces with an operating system, and/or other suitable conditions for computer program execution. For example, the virtual machine environment includes a virtual machine (e.g., an emulation or virtualization of a computer system) based on a particular computer architecture (e.g., as defined by the generated software and/or hardware configurations and/or associated communication configuration).

In some implementations, the parameter generation model 1306 can generate validation test parameters can include compilation instructions (e.g., associated with the code sample). The compilation instructions 1308*c* can include information, commands, and/or other suitable data associated with code compilation. For example, compilation instructions 1308*c* include information relating to how to generate an executable program based on a given code sample. In some implementations, the compilation instructions include an indication of a scripting language (e.g., a computer programming language) associated with the code sample. By generating such information, the parameter generation model 1306 provides information to aid in generation of an executable program (e.g., an executable binary and/or instructions) based on human-readable code. For example, the data generation platform 102 can retrieve, from a database of compilers, a compilation routine (e.g., a compiler) associated with a particular scripting language. In some implementations, the compilation instructions 1308*c* can include an identifier and/or address associated with a compiler for the given code sample (e.g., as associated with the corresponding scripting language). Furthermore, the compilation instructions 1308*c* can include flags, markers, and/or other customizations relating to the associated virtual machine configuration (e.g., as described below). For example, the compilation instructions 1308*c* include indications of compiler flags consistent with the virtual machine configuration generated by the parameter generation model 1306.

Additionally or alternatively, the compilation instructions 1308*c* includes an indication of a source code for the suitable application for which the user requests modification. For example, based on the prompt provided to the LLM by the user (e.g., LLM input 1302), the data generation platform 102 determines a target application and/or associated source code associated with the output generation request. Accordingly, the parameter generation model can generate an indication of how to modify the source code using the generated code sample, as well as instructions to compile the modified source code. As such, by generating compilation instructions, the data generation platform 102 enables flexible, modular modification and/or deployment of applications based on model-generated code samples.

Based on the compilation instructions and the code sample, the data generation platform 102 can generate an executable program within the configured virtual machine environment. For example, the executable program (e.g., the executable instructions 1312 for a software routine) includes a binary file and/or machine-readable instructions enabling execution of a given application or software routine. The data generation platform 102 can generate the executable program within the generated virtual machine environment (e.g., associated with a computing device). To illustrate, the data generation platform 102 can retrieve an address associated with a compilation routine (e.g., via a compiler database associated with the virtual machine environment). For example, the compiler database can include an index of compiler addresses associated with corresponding programming languages. The data generation platform 102 can provide the code sample and/or associated source code to a program associated with the compilation routine to generate the executable instructions (e.g., a binary file), thereby program execution at operation 1314 of FIG. 13. In some implementations, the data generation platform 102 can execute the program associated with code (e.g., a code sample or associated source code for an application) without compiling the code, as in the case of an interpreted scripting language. For example, the compilation instructions can indicate an interpreter address for execution of the code associated with the scripting language.

Figure 15:
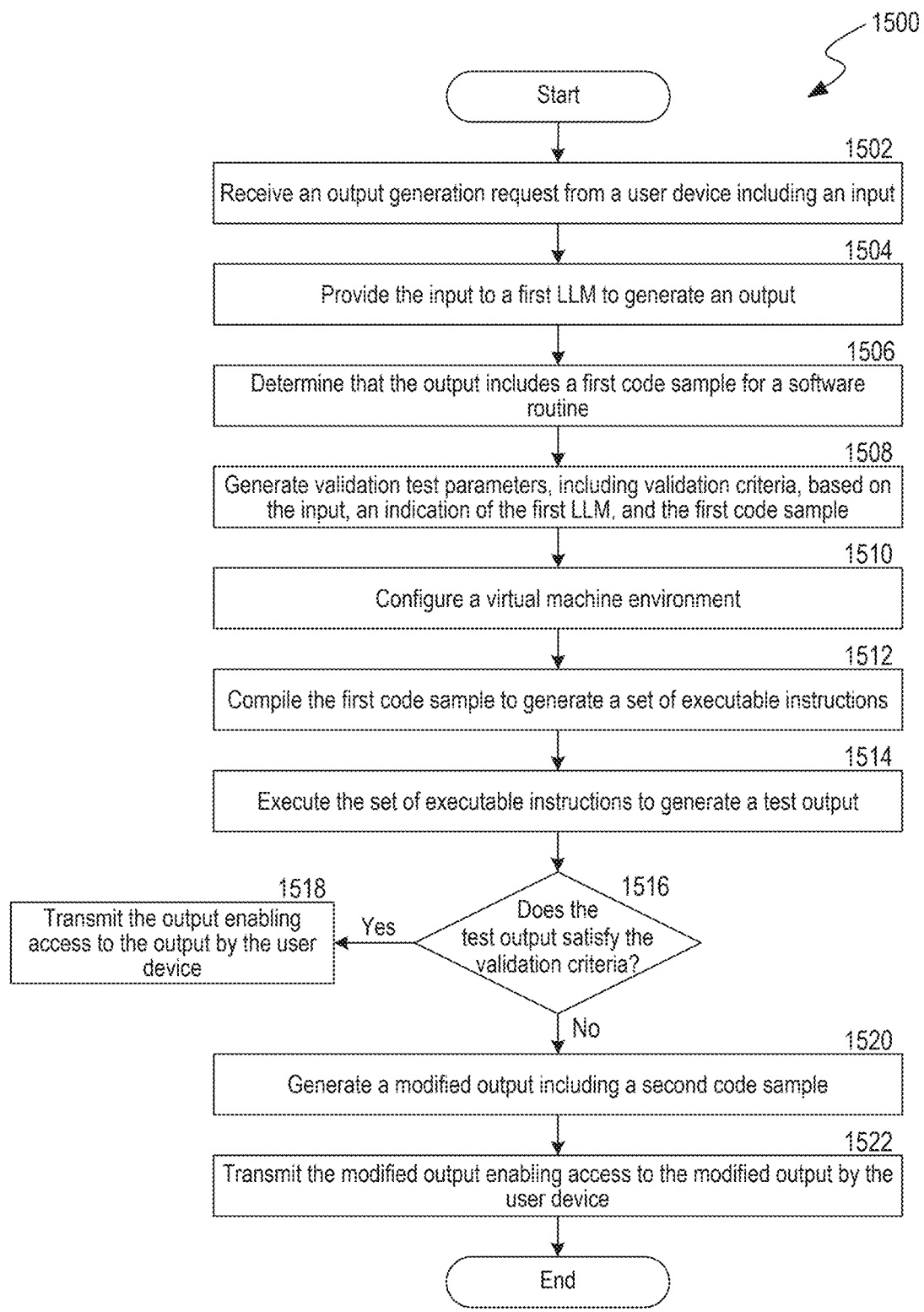
FIG. 15 shows a flow diagram illustrating a process for dynamic evaluation of machine model outputs in an isolated environment.

Validating Model Outputs in a Virtual Environment Using the Data Generation Platform FIG. 15 shows a flow diagram illustrating a process 1500 for dynamic evaluation of machine model outputs in an isolated environment, in accordance with some implementations of the present technology. For example, the process 1500 enables evaluation of software-related code samples (e.g., code snippets) generated by LLMs for security breaches, intended system behavior, or software bugs/errors based on input-dependent validation tests within an isolated environment.

At act 1502, process 1500 can receive an output generation request that includes an input (e.g., a prompt for generation of text-based output). For example, the data generation platform 102 receives, from a user device, an output generation request including an input for generation of an output using a first large-language model (LLM). As an illustrative example, the data generation platform 102 can receive a text-based prompt indicating generation of a code snippet with a specified functionality and in a particular programming language (e.g., including a function for performing a particular calculation). As such, the data generation platform 102 enables the generation of software-related information, including textual code, according to user specifications.

At act 1504, process 1500 can provide the output to the requested model for generation of an output (e.g., a text-based output). For example, the data generation platform 102 provides the input to the first model to generate the output. As an illustrative example, the data generation platform 102 can provide the user prompt to an LLM that is configured to generate software-related code samples (e.g., one or more portions of source code) in response to user inputs. In some implementations, the output includes portions that are software code and other portions that are descriptions, comments, or other non-code data. Thus, the data generation platform 102 can obtain a model output that includes output (e.g., including a code sample) in response to the output generation request.

At act 1506, process 1500 can determine that the output includes software-related data, such as code. For example, the data generation platform 102 determines that the output includes a first code sample for a software routine. As an illustrative example, the data generation platform 102 can identify one or more portions of output generated from an LLM that correspond to code or other software-related information. For example, the data generation platform 102 extracts data from the LLM that corresponds to code. By doing so, the data generation platform 102 can further evaluate, test, and/or validate the functioning, security, and privacy associated with the execution of the code, as described below.

At act 1508, process 1500 can generate validation test parameters that characterize a test for validating the generated code sample. For example, in response to determining that the output includes the first code sample, the data generation platform 102 provides the input, an indication of the first model, and the first code sample to a parameter generation model to generate validation test parameters. The validation test parameters can include compilation instructions, a virtual machine configuration, and validation criteria. As an illustrative example, the data generation platform 102 can generate test parameters that characterize the nature, strictness, and/or criteria associated with testing the generated code samples for security, privacy and/or errors. For example, the data generation platform 102 determines the nature of the isolated environment (e.g., the virtual machine) in which to generate or compile an executable program associated with the code sample, based on the nature of the code sample and/or the associated output generation request. Additionally or alternatively, the data generation platform 102 identifies a procedure for compiling the code sample (e.g., by updating associated source code and executing a compilation routine). As such, the data generation platform 102 can generate flexible output testing parameters in a prompt-specific and/or application-specific manner.

At act 1510, process 1500 can configure a virtual machine environment according to the generated virtual machine configuration. For example, the data generation platform 102 configures, based on the virtual machine configuration, a virtual machine environment. As an illustrative example, the data generation platform 102 can identify and/or generate a virtual machine with an environment that includes parameters and/or properties as defined within the virtual machine configuration. For example, the data generation platform 102 can generate the virtual machine to simulate any network connections, hardware configurations, or software features as specified within the validation test parameters. By doing so, the data generation platform 102 can prepare an environment (e.g., an isolated environment) in which to test generated code in a safe, flexible manner.

In some implementations, the data generation platform 102 configures the virtual machine environment according to a communication configuration. For example, the data generation platform 102 determines that the virtual machine configuration includes an indication of a communication configuration indicating one or more communication interfaces. The data generation platform 102 can generate the virtual machine environment including a simulation of the one or more communication interfaces. As an illustrative example, the data generation platform 102 configures the virtual machine environment to include simulations of connections, such as WAN, LAN, and/or peripheral connections. By doing so, the data generation platform 102 can test any attempted transmissions associated with the generated code, thereby enabling the mitigation of security breaches or the unintended exposure of private information.

In some implementations, the data generation platform 102 configures the virtual machine environment according to a hardware configuration. For example, the data generation platform 102 determines that the virtual machine configuration includes an indication of a hardware configuration indicating a system architecture. The data generation platform 102 can generate the virtual machine environment including a simulation of the system architecture. As an illustrative example, the data generation platform 102 can simulate a hardware architecture (e.g., including emulation of central processing units (CPUs), graphics processing units (GPUs), and/or other associated hardware devices) within the virtual machine environment, thereby enabling comprehensive testing of system behavior due to the execution of generated code.

At act 1512, process 1500 can compile the first code sample to generate executable instructions for further testing. For example, the data generation platform 102 compiles, within the virtual machine environment and using the compilation instructions, the first code sample to generate a set of executable instructions for the software routine. As an illustrative example, the data generation platform 102 generate an executable version of a software routine associated with the code sample (e.g., an executable binary file) using the compilation instructions associated with the generated validation test parameters. For example, the data generation platform 102, using the compilation instructions, configures the executable binary file to be compatible with the simulated hardware architecture and/or software consistent with the virtual machine configuration. By doing so, the data generation platform 102 can prepare the generated code to be tested within the isolated environment (e.g., the virtual machine).

In some implementations, the data generation platform 102 configures a compilation routine based on identification of an associated scripting language. For example, the data generation platform 102 determines that the compilation instructions include an identifier of a scripting language. The data generation platform 102 can determine, from a compiler database, a compilation routine associated with the scripting language. The data generation platform 102 can configure, based on the virtual machine configuration, the compilation routine for operability within the virtual machine environment. The data generation platform 102 can generate, within the virtual machine environment and using the configured compilation routine, the set of executable instructions for the software routine. As an illustrative example, the data generation platform 102 can identify a programming language associated with the generated code and search for or identify an associated compiler. For example, the data generation platform 102 extracts an address associated with the compiler within a compiler database to determine a compiler (e.g., or an associated compilation routine) that is compatible with the compilation instructions, thereby enabling compilation of the code sample and generation of the associated executable instructions.

At act 1514, process 1500 can execute the executable instructions to generate a test output. For example, the data generation platform 102 executes, within the virtual machine environment, the set of executable instructions for the software routine to generate a test output. As an illustrative example, the data generation platform 102 can run, execute, or process the compiled instructions. In some implementations, the data generation platform 102, via the virtual machine configuration, can log (e.g., monitor) actions or effects of the running software routine. For example, the data generation platform 102 can detect communications associated with the simulated communication interfaces of the virtual machine, and/or determine run-times associated with the program. As such, the data generation platform 102 enables evaluation of the system behavior in relation to the code sample generated by the model in response to the output generation request.

At act 1516, process 1500 can determine whether the test output satisfies the validation criteria. For example, the data generation platform 102 determines a validation indicator specifying whether the test output satisfies the validation criteria. As an illustrative example, the data generation platform 102 can extract one or more criteria associated with the generated validation criteria of the validation test parameters. For example, the data generation platform 102 can extract a criterion specifying that memory usage is to remain within a particular range of values. The data generation platform 102 can monitor the test output (e.g., including readings of memory usage over time) to determine whether the criterion is satisfied throughout the execution of the executable program instructions. By doing so, the data generation platform 102 enables validation of the code generated via the associated models by evaluating the associated system behavior.

In some implementations, the data generation platform 102 validates communications associated with the virtual machine environment for anomalies. For example, the data generation platform 102 determines that the validation criteria includes an anomaly criterion indicating that an anomalous communication is forbidden. The data generation platform 102 can evaluate the test output including communications associated with the one or more communication interfaces. Based on determining that the communications include the anomalous communication, the data generation platform 102 can determine that the test output does not satisfy the validation criteria. The data generation platform 102 can generate the validation indicator including an indication that the test output does not satisfy the validation criteria. As an illustrative example, the data generation platform 102 can determine an attempt to initiate an unexpected connection (e.g., a WAN connection when only a LAN connection is allowed, according to validation criteria). By doing so, the data generation platform 102 can ensure that, following software deployment, sensitive information is not shared with unauthorized devices (e.g., beyond a particular LAN), thereby improving system security.

In some implementations, the data generation platform 102 determines a measure of similarity between the test output and an expected output to determine whether the test output satisfies the validation criteria. For example, the data generation platform 102 determines, based on the validation criteria, an expected test output for the software routine. The data generation platform 102 can generate a first vector representation for the expected test output and a second vector representation for the test output. The data generation platform 102 can generate a similarity metric value including a measure of a similarity metric between the first vector representation and the second vector representation. The data generation platform 102 can determine, based on the output generation request, a threshold value associated with the similarity metric. The data generation platform 102 can comparing the similarity metric value with the threshold value. Based on determining that the similarity metric value satisfies the threshold value, the data generation platform 102 can determine that the test output satisfies the validation criteria. The data generation platform 102 can generate the validation indicator specifying that the test output satisfies the validation criteria. As an illustrative example, the data generation platform 102 can determine an expected output (e.g., an expected log file) based on the validation criteria and/or other associated validation test parameters. To illustrate, the expected output can describe expected or predicted actions taken in response to executing the compiled code sample, such as memory usage, connections, and/or generation of other requested outputs (e.g., data generated by the executable instructions). The data generation platform 102 can compare the expected output with the actual test output to determine a similarity metric value (e.g., by comparing vector representations of the respective outputs). Based on determining the similarity metric value, the data generation platform 102 can determine if the test output differs from the expected output by a threshold value and, as such, can flag or detect unexpected behavior. As such, the data generation platform 102 enables improved anomalous behavior detection for an associated system.

In some implementations, the data generation platform 102 can determine the threshold value based on a user risk level associated with the output generation request. For example, the data generation platform 102 determines a user identifier associated with the output generation request. The data generation platform 102 can determine, based on a user database, a risk level for a user associated with the user identifier. The risk level can indicate a low, medium, or high risk associated with user activity for the user. In response to determining that the risk level indicates the medium or high risk associated with the user activity, the data generation platform 102 can determine a first value for the threshold value. In response to determining that the risk level indicates the low risk associated with the user activity, the data generation platform 102 can determine a second value for the threshold value, wherein the second value is greater than the first value. As an illustrative example, the data generation platform 102 can determine a strictness associated with evaluating the differences between an expected output and the test output on the basis of user credentials and/or a risk level associated with the user associated with the output generation request. For example, a user with less coding experience (e.g., with a number of years of experience fewer than a threshold number) can be assigned a high or medium risk level. Additionally or alternatively, a user with more coding experience (e.g., with a number of years of experience greater than the threshold number) can be assigned a low risk level. By tuning the threshold value associated with the similarity metric according to user credentials and/or user risk, the data generation platform 102 can improve mitigation of security breaches, errors, or bugs in a user-specific, targeted manner, thereby improving the efficiency of output evaluation by focusing system resources on users most likely to commit errors in software development.

In some implementations, the data generation platform 102 can determine whether the test output includes sensitive information (e.g., from the sensitive token database). For example, the data generation platform 102 determines that the validation criteria includes a privacy criterion indicating that sensitive information is forbidden in the test output. Based on determining that the validation criteria includes the privacy criterion, the data generation platform 102 can determine whether the test output includes a sensitive token of a sensitive token database. The data generation platform 102 can generate the validation indicator including an indication of whether the test output includes the sensitive token of the sensitive token database. As an illustrative example, the data generation platform 102 can determine that the test output includes sensitive and/or private information, such as PII, secrets, or other such information, based on determining that a token (e.g., a word, phrase, or sentence) of the test output is included within a sensitive token database. By doing so, the data generation platform 102 can prevent disclosure and/or exposure of sensitive or private information, thereby improving the safety of the system to which the code is to be deployed.

At act 1518, process 1500 can transmit the output from the first model in order to provide access to the output (e.g., the generated code sample) for the user. For example, in response to determining that the test output satisfies the validation criteria, the data generation platform 102 transmits the output to a server system enabling access to the output by the user device. As an illustrative example, the data generation platform 102 can determine that the test output satisfies validation criteria generated by the parameter generation model. For example, the data generation platform 102 determines that the test output indicates that the virtual machine remained within memory usage requirements specified by the validation criteria and did not attempt to communicate with forbidden devices (e.g., through forbidden communication channels). By doing so, the data generation platform 102 can ensure the security of the system prior to providing the generated code sample to the user requesting the code sample, in response to the output generation request.

At act 1520, process 1500 can generate a modified output when the test output does not satisfy the validation criteria. For example, in response to determining that the test output does not satisfy the validation criteria, the data generation platform 102 generates a modified output including a second code sample different from the first code sample. As an illustrative example, the data generation platform 102 can determine that the virtual machine, when executing the executable instructions associated with the code sample, does not satisfy memory usage requirements and/or attempts to communicate via forbidden channels. By doing so, the data generation platform 102 can modify the code to resolve any detected deficiencies in the validation test (e.g., based on an indication of a validation error). By doing so, the data generation platform 102 can resolve any bugs, errors, and/or security issues associated with the code sample generated in response to the output generation request.

In some implementations, the data generation platform 102 can generate the modified output by providing an indication of a validation error (e.g., associated with the validation indicator) to an LLM. For example, the data generation platform 102 determines, based on the validation indicator, an indication of a validation error associated with the test output. The indication of the validation error can include an indication of a criterion of the validation criteria that is not satisfied by the test output. The data generation platform 102 can provide the indication of the validation error, the first code sample, and the input to the first LLM to generate the modified output including the second code sample. As an illustrative example, the data generation platform 102 can generate a summary of any deficiencies associated with the validation test failure (e.g., an indication of particular criteria that was not satisfied by the test output) and provide such information to the LLM, along with the first code sample, to modify the code sample to resolve issues causing the validation test failure. For example, the data generation platform 102 modifies the code sample to prevent communication via a forbidden communication channel and/or to a forbidden communication device. By doing so, the data generation platform 102 can fix generated code in a targeted manner, improving the efficiency of software development.

At act 1522, process 1500 can transmit the modified output in order to provide access to the modified output for the user. For example, the data generation platform 102 transmits the modified output to the server system to enable access to the modified output by the user device. As an illustrative example, the data generation platform 102 can provide the modified output (e.g., including a modified code sample) to the user in response to the output generation request. As such, the data generation platform 102 can provide generated code to a user following validation and resolution of any validation test discrepancies, thereby improving the quality and security of the generated code for use by the user.

In some implementations, the data generation platform 102 can transmit the modified output to the user device in response to validating the modified output. For example, the data generation platform 102 compiles, within the virtual machine environment and using the compilation instructions, the second code sample to generate a second set of executable instructions. The data generation platform 102 can execute, within the virtual machine environment, the second set of executable instructions to generate a second test output. The data generation platform 102 can determine whether the second test output satisfies the validation criteria. In response to determining that the second test output satisfies the validation criteria, the data generation platform 102 can transmit the modified output to the server system to enable access to the modified output by the user device. As an illustrative example, the data generation platform 102 can ensure that the modified output (and/or the associated code) is consistent with the validation criteria prior to transmission to the user, thereby preventing any additional errors or security breaches introduced as a result of the modification.

Validating AI Models Using the Data Generation Platform

Figure 16:
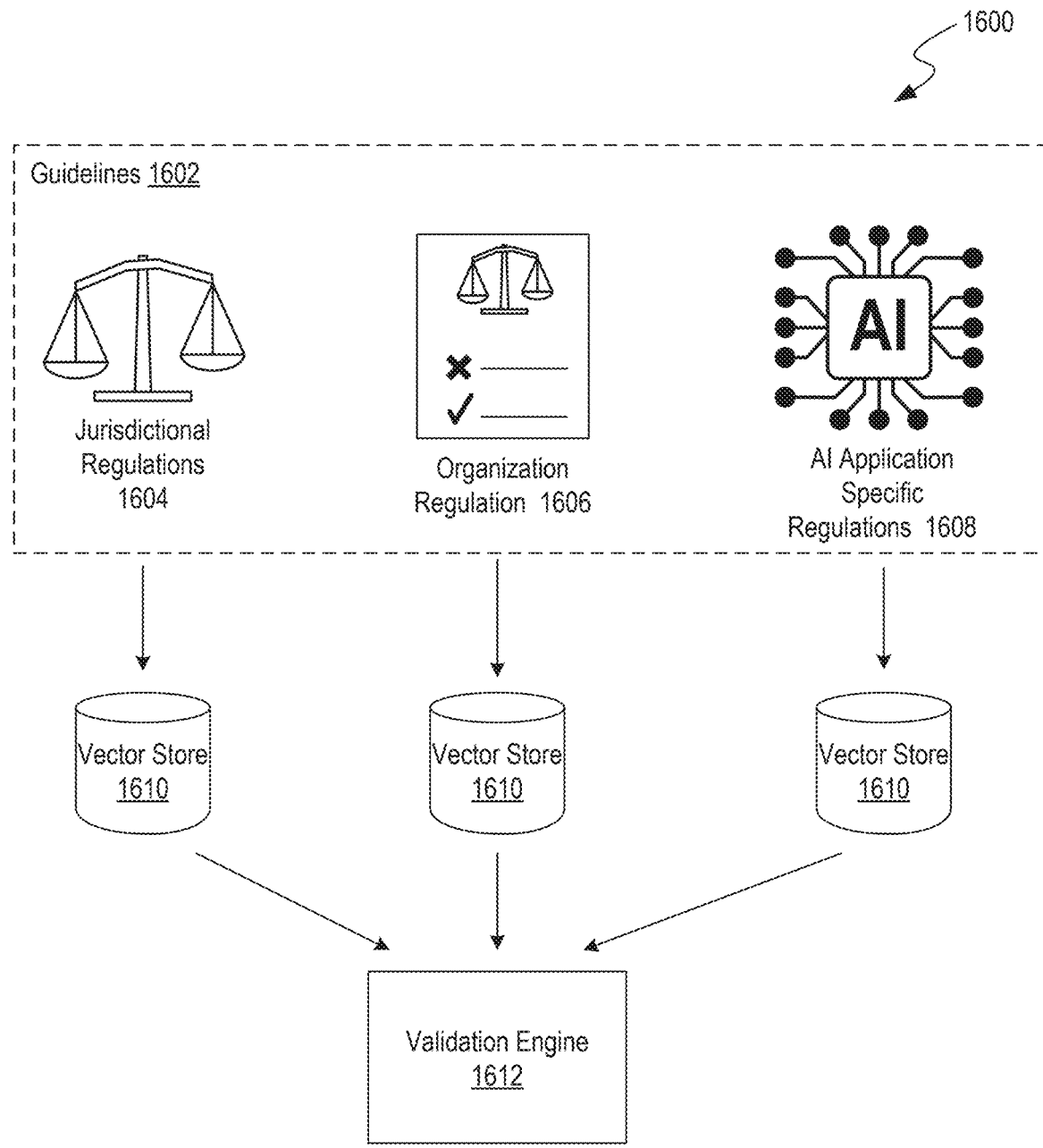
FIG. 16 is a block diagram illustrating an example environment for using the guidelines input into the validation engine for determining AI compliance.

FIG. 16 is a block diagram illustrating an example environment 1600 for using the guidelines input into a validation engine for determining AI compliance, in accordance with some implementations of the present technology. Example environment 1600 includes guidelines 1602 (e.g., jurisdictional regulations 1604, organizational regulations 1606, AI application-specific regulations 1608), vector store(s) 1610, and validation engine 1612. Validation engine 1612 can be the same as or similar to generative model engine 120 in data generation platform 102 discussed with reference to FIG. 1. Vector stores 1610 and validation engine 1612 are implemented using components of example devices 500 and client computing devices 602 illustrated and described in more detail with reference to FIG. 5 and FIG. 6, respectively. Likewise, implementations of example environment 1600 can include different and/or additional components or can be connected in different ways.

Guidelines 1602 can include various elements such as jurisdictional regulations 1604, organizational regulations 1606, and AI application-specific regulations 1608 (e.g., unsupervised learning, natural language processing (NLP), generative AI). Jurisdictional regulations 1604 (e.g., governmental regulations) can include regulations gathered from authoritative sources such as government websites, legislative bodies, and regulatory agencies. Jurisdictional regulations 1604 can be published in legal documents or official publications and cover aspects related to the development, deployment, and use of AI technologies within specific jurisdictions. Organizational regulations 1606 include internal policies, procedures, and guidelines established by organizations to govern AI-related activities within the organization's operations. Organizational regulations 1606 can be developed in alignment with industry standards, legal requirements, and organizational objectives. AI application-specific regulations 1608 include regulations that pertain to specific types of AI applications, such as unsupervised learning, NLP, and generative AI. Each type of AI application presents unique challenges and considerations in terms of compliance, ethical use, and/or regulatory adherence. For example, unsupervised learning algorithms, whereby the model learns from input data without labeled responses, may be subject to regulations that prevent bias and discrimination in unsupervised learning models. NLP technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 1602 are stored in vector stores 1610. The vector stores 1610 store the guidelines 1602 in a structured and accessible format (e.g., using distributed databases or NoSQL stores), which allows for efficient retrieval and utilization by the validation engine 1612. In some implementations, the guidelines 1602 are preprocessed to remove any irrelevant information, standardize the format, and/or organize the guidelines 1602 into a structured database schema. Once the guidelines 1602 are prepared, the guidelines 1602 can be stored in vector stores 1610 using distributed databases or NoSQL stores.

To store the guidelines 1602 in the vector stores 1610, the guidelines 1602 can be encoded into vector representations for subsequent retrieval by the validation engine 1612. The textual data of the guidelines 1602 are transformed into numerical vectors that capture the semantic meaning and relationships between words or phrases in the guidelines 1602. For example, the text is encoded into vectors using word embeddings and/or TF-IDF (Term Frequency-Inverse Document Frequency) encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF encoding calculates the importance of a word in a guideline relative to the word's frequency in the entire corpus of guidelines 1602. For example, the system can assign higher weights to words that are more unique to a specific document and less common across the entire corpus.

In some implementations, the guidelines 1602 are stored using graph databases such as Neo4j™ or Amazon Neptune™. Graph databases represent data as nodes and edges, allowing for the modeling of relationships between guidelines 1602 to demonstrate the interdependencies. In some implementations, the guidelines 1602 are stored in a distributed file system such as Apache Hadoop™ or Google Cloud Storage™. These systems offer scalable storage for large volumes of data and support parallel processing and distributed computing. Guidelines 1602 stored in a distributed file system can be accessed and processed by multiple nodes simultaneously, which allows for faster retrieval and analysis by the validation engine.

The vector stores 1610 can be stored in a cloud environment hosted by a cloud provider, or in a self-hosted environment. In a cloud environment, the vector stores 1610 have the scalability of cloud services provided by platforms (e.g., AWS™, Azure™). Storing the vector stores 1610 in a cloud environment entails selecting the cloud service, provisioning resources dynamically through the provider's interface or APIs, and configuring networking components for secure communication. Cloud environments allow the vector stores 1610 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector stores 1610 are stored on a private web server. Deploying the vector stores 1610 in a self-hosted environment entails setting up the server with the necessary hardware or virtual machines, installing an operating system, and storing the vector stores 1610. In a self-hosted environment, organizations have full control over the vector stores 1610, allowing organizations to implement customized security measures and compliance policies tailored to the organization's specific needs. For example, organizations in industries with strict data privacy and security regulations, such as financial institutions, can mitigate security risks by storing the vector stores 1610 in a self-hosted environment.

The validation engine 1612 accesses the guidelines 1602 from the vector stores 1610 to initiate the compliance assessment. The validation engine 1612 can establish a connection to each vector store 1610 using appropriate APIs or database drivers. The connection allows the validation engine 1612 to query the vector store 1610 and retrieve the relevant guidelines for the AI application under evaluation. Frequently accessed guidelines 1602 are stored in memory, which allows the validation engine 1612 to reduce latency and improve response times for compliance assessment tasks. In some implementations, only the relevant guidelines are retrieved based on the specific AI application under evaluation. For example, metadata tags, categories, or keywords associated with the AI application can be used to filter the guidelines 1602.

The validation engine 1612 evaluates the AI application's compliance with the retrieved guidelines 1602 (e.g., using semantic search, pattern recognition, and machine learning techniques). For example, the validation engine 1612 compares the vector representations of the different explanations and outcomes by calculating the cosine of the angle between the two vectors indicating the vectors' directional similarity. Similarly, for comparing explanations, the validation engine 1612 can measure the intersection over the union of the sets of words in the expected and case-specific explanations.

Figure 17:
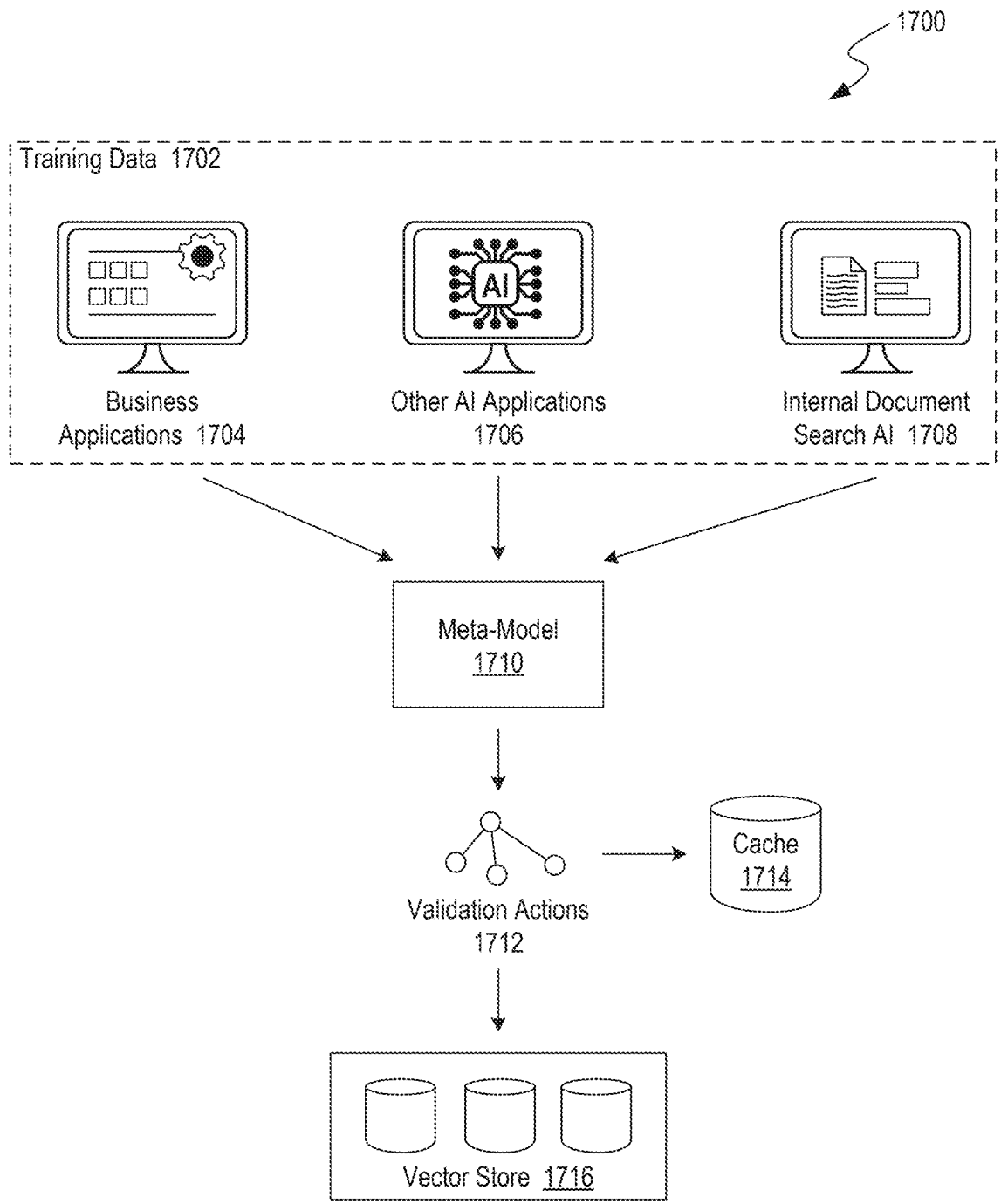
FIG. 17 is a block diagram illustrating an example environment for generating validation actions to determine AI model compliance.

FIG. 17 is a block diagram illustrating an example environment 1700 for generating validation actions to determine AI model compliance, in accordance with some implementations of the present technology. Example environment 1700 includes training data 1702, meta-model 1710, validation actions 1712, cache 1714, and vector store 1716. Meta-model 1710 is the same as or similar to machine learning model 702 illustrated and described in more detail with reference to FIG. 10. Meta-model 1710 is implemented using components of example devices 500 and client computing devices 602 illustrated and described in more detail with reference to FIG. 5 and FIG. 6, respectively. Likewise, implementations of example environment 1700 can include different and/or additional components or can be connected in different ways.

The training data 1702 includes data from sources such as business applications 1704, other AI applications 1706, and/or an internal document search AI 1708. Business applications 1704 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1706 can include, for example, credit scoring models, fraud detection algorithms, and risk assessment systems that can be used by lenders to evaluate loan applications. Data from other AI applications 1706 refer to various software systems that utilize AI techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1708 is an AI system tailored for searching and retrieving information from internal documents within an organization. For example, the internal document search AI 1708 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1702 is fed into the meta-model 1710 to train the meta-model 1710, enabling the meta-model 1710 to learn patterns and characteristics associated with compliant and non-compliant AI behavior. AI and training methods are discussed further in reference to FIG. 10. The meta-model 1710 leverages the learned patterns and characteristics to generate validation actions 1712, which serve as potential use cases designed to evaluate AI model compliance. The validation actions 1712 can encompass various scenarios and use cases relevant to the specific application domain of the AI model under assessment. Further methods of creating validation actions are discussed in reference to FIGS. 18-21.

In some implementations, the generated validation actions 1712 can be stored in a cache 1714 and/or a vector store 1716. The cache 1714 is a temporary storage mechanism for storing recently accessed or frequently used validation actions, and facilitates efficient retrieval when needed. On the other hand, the vector store 1716 provides a structured repository for storing vector representations of validation actions, enabling efficient storage and retrieval based on similarity or other criteria. The vector store 1716 stores the generated validation actions 1712 in a structured and accessible format (e.g., using distributed databases or NoSQL stores), which allows for efficient retrieval and utilization by the meta-model 1710. The generated validation actions 1712 can be preprocessed to remove any irrelevant information, standardize the format, and/or organize the generated validation actions 1712 into a structured database schema. Once the generated validation actions 1712 are prepared, the generated validation actions 1712 can be stored in a vector store 1716 using distributed databases or NoSQL stores.

In some implementations, the generated validation actions 1712 are stored using graph databases such as Neo4j™ or Amazon Neptune™. Graph databases represent data as nodes and edges, allowing for the modeling of relationships between generated validation actions 1712 to demonstrate the interdependencies. In some implementations, the generated validation actions 1712 are stored in a distributed file system such as Apache Hadoop™ or Google Cloud Storage™. The systems offer scalable storage for large volumes of data and support parallel processing and distributed computing. Generated validation actions 1712 stored in a distributed file system can be accessed and processed by multiple nodes simultaneously, which allows for faster retrieval and analysis by the meta-model 1710.

The vector store 1716 can be stored in a cloud environment hosted by a cloud provider, or in a self-hosted environment. In a cloud environment, the vector store 1716 has the scalability of cloud services provided by platforms (e.g., AWS™, Azure™). Storing the vector store 1716 in a cloud environment entails selecting the cloud service, provisioning resources dynamically through the provider's interface or APIs, and configuring networking components for secure communication. Cloud environments allow the vector store 1716 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1716 is stored on a private web server. Deploying the vector store 1716 in a self-hosted environment entails setting up the server with the necessary hardware or virtual machines, installing an operating system, and storing the vector store 1716. In a self-hosted environment, organizations have full control over the vector store 1716, allowing organizations to implement customized security measures and compliance policies tailored to the organization's specific needs. For example, organizations in industries with strict data privacy and security regulations, such as financial institutions, can mitigate security risks by storing the vector store 1716 in a self-hosted environment.

The meta-model 1710 accesses the generated validation actions 1712 from the vector store 1716 to initiate the compliance assessment. The system can establish a connection to the vector store 1716 using appropriate APIs or database drivers. The connection allows the meta-model 1710 to query the vector store 1716 and retrieve the relevant vector constraints for the AI application under evaluation. Frequently accessed validation actions 1712 are stored in memory, which allows the system to reduce latency and improve response times for compliance assessment tasks.

In some implementations, only the relevant validation actions 1712 are retrieved based on the specific AI application under evaluation. For example, metadata tags, categories, or keywords associated with the AI application can be used to filter the validation actions 1712. The relevant validation actions 1712 can be specifically selected based on the specific context and requirements of the AI application being evaluated. For example, the system analyzes metadata tags, keywords, or categories associated with the validation actions 1712 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation actions 1712 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1712, the system can determine the specific terms to use as filters by calculating the similarity between vectors representing domain-specific terms (e.g., "healthcare") and vectors representing other terms related to the domain (e.g., "patient privacy"). Domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions 1712. The tags serve as markers that categorize and organize the validation actions 1712 based on predefined criteria, such as regulatory topics (e.g., data privacy, fairness, transparency) or jurisdictional relevance (e.g., regional regulations, industry standards). The tags provide a structured representation of the validation actions 1712 and allow for easier retrieval, manipulation, and analysis of regulatory content. The tags and associated metadata can be stored in a structured format, such as a database, where each validation action 1712 is linked to the corresponding tags and/or regulatory provisions of that validation action 1712.

The meta-model 1710 evaluates the AI application's compliance with the vector constraints through the use of validation actions 1712 (e.g., using semantic search, pattern recognition, and machine learning techniques). Further evaluation methods in determining compliance of AI applications are discussed with reference to FIGS. 18-21.

Figure 18:
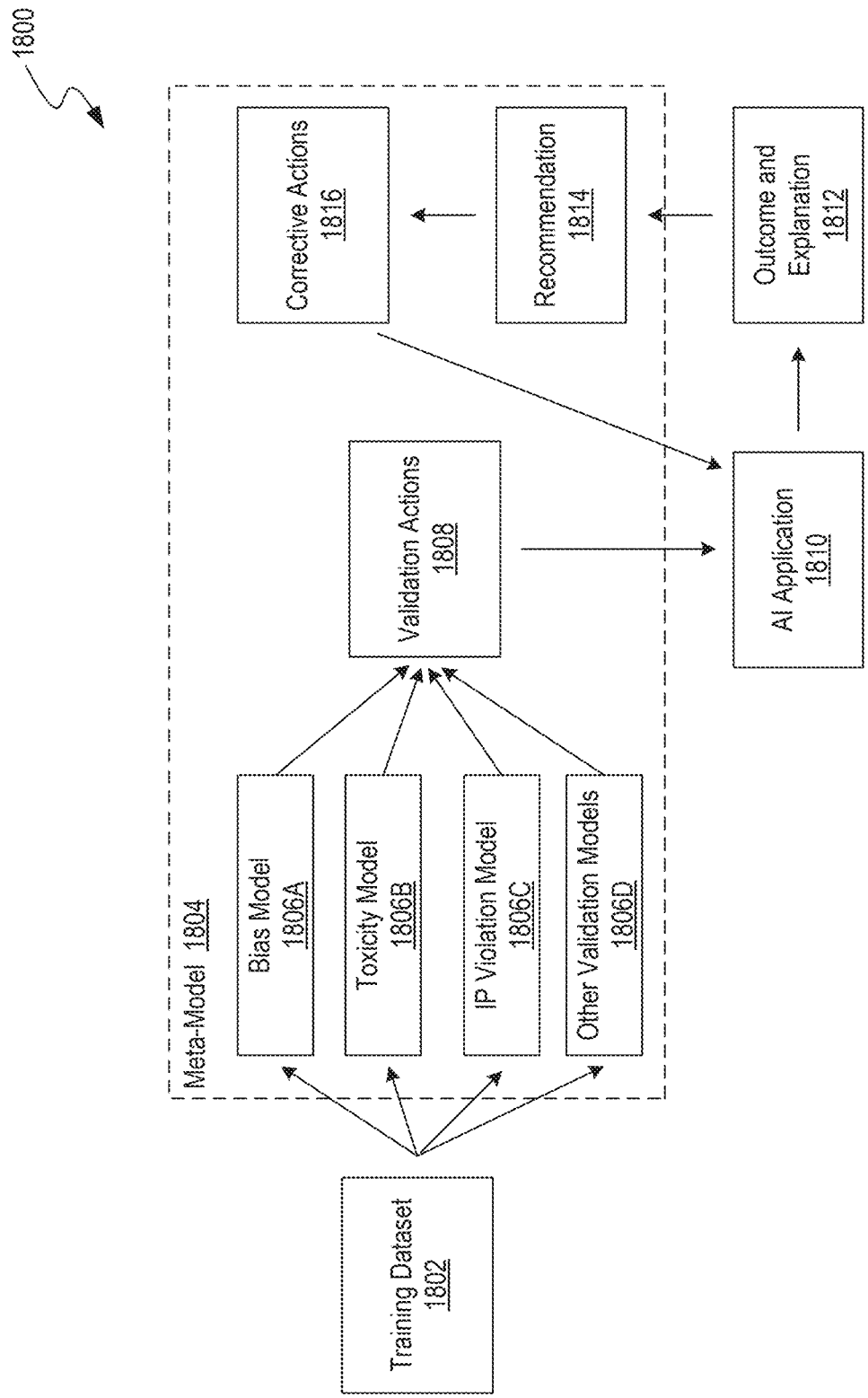
FIG. 18 is a block diagram illustrating an example environment for automatically implementing corrective actions on the AI model.

FIG. 18 is a block diagram illustrating an example environment 1800 for automatically implementing corrective actions on the AI model, in accordance with some implementations of the present technology. Example environment 1800 includes training dataset 1802, meta-model 1804 (which includes validation models 1806A-1906D, validation actions 1808, AI application 1810), outcome and explanation 1812, recommendation 1814, and corrective actions 1816. Meta-model 1804 is the same as or similar to meta-model 1710 illustrated and described in more detail with reference to FIG. 17. Meta-model 1804 and AI application 1810 are implemented using components of example devices 500 and client computing devices 602 illustrated and described in more detail with reference to FIG. 5 and FIG. 6, respectively. Likewise, implementations of example environment 1800 can include different and/or additional components or can be connected in different ways.

The training dataset 1802, which includes a collection of data used to train machine learning models, is input into the meta-model 1804. The meta-model 1804 is a comprehensive model that encompasses multiple sub-models tailored to address specific aspects of AI compliance. Within the meta-model 1804, various specialized models are included, such as a bias model, a toxicity model 1806B, an IP violation model 1806C, and other validation models 1806D. Each of the models is responsible for detecting and assessing specific types of non-compliant content within AI models. Upon processing the training dataset 1802, each model generates validation actions tailored to evaluate the presence or absence of specific types of non-compliant content. Further evaluation techniques in generating validation actions using the meta-model 1804 are discussed with reference to FIGS. 19A-21.

The set of generated validation actions 1808 is provided as input to an AI application 1810 in the form of a prompt. The AI application 1810 processes the validation actions 1808 and produces an outcome along with an explanation 1812 detailing how the outcome was determined. Subsequently, based on the outcome and explanation 1812 provided by the AI application 1810, the system can generate recommendations 1814 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, if certain attributes exhibit unexpected associations or distributions, the system can retrain the tested AI model with revised weighting schemes to better align with the desired vector constraints. In a toxicity model, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in reference to FIG. 10, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. AI and training methods are discussed further in reference to FIG. 10. The recommendations 1814 can be automatically implemented as corrective actions 1816 by the system. The automated approach streamlines the process of addressing identified issues and ensures swift remediation of non-compliant content within AI models, enhancing overall compliance and reliability.

Validating Autonomous Agents Using the Data Generation Platform

Figure 19A:
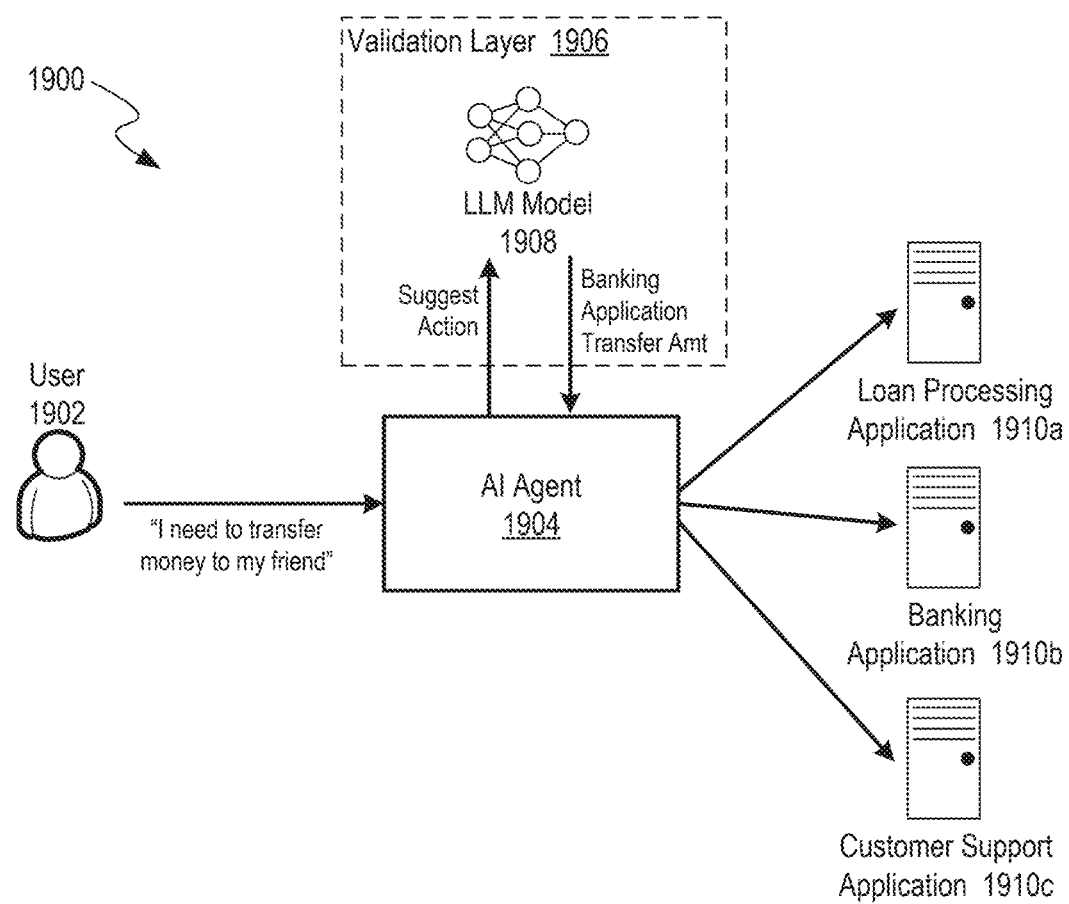
FIG. 19A is a block diagram illustrating an example environment for validating an autonomous agent.
Figure 19B:
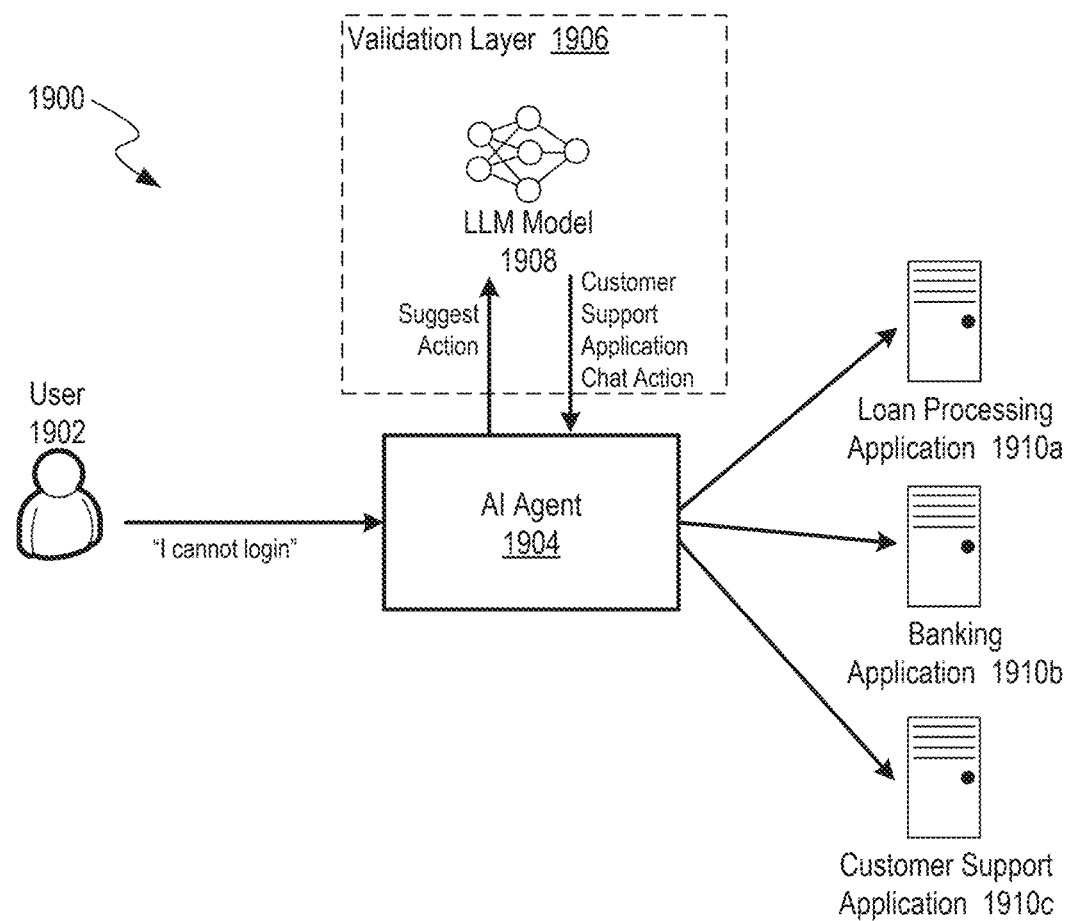
FIG. 19B is a block diagram illustrating another example environment for validating the autonomous agent.

FIGS. 19A and 19B are block diagrams illustrating an example environment 1900 for validating an autonomous agent 1904. The example environment 1900 includes a user 1902, the agent 1904, a validation layer 1906, a model 1908, and applications 1910 (e.g., loan processing application 1910a, banking application 1910b, customer support application 1910c, and so forth). The validation layer 1906 is the same as or similar to validation engine 1612, illustrated and described in more detail with reference to FIG. 16. The validation layer 1906 and the agent 1904 can be implemented using components of example devices 500 and client computing devices 602 illustrated and described in more detail with reference to FIG. 5 and FIG. 6, respectively. Implementations of example environment 1900 can include different and/or additional components or can be connected in different ways.

For example, in FIG. 19A, the user 1902 can input a prompt or query to the agent 1904 such as "I need to transfer money to my friend." The user 1902 refers to an individual or entity interacting with the system by providing input or queries to the agent 1904. The user 1902 can be a customer, an employee, or any stakeholder using the system to perform specific autonomous tasks or provide information. In some implementations, the user 1902 can be represented by a software application or another automated system that interacts with the agent 1904 through predefined protocols. The input (e.g., queries, prompts, commands) may be in natural language form and typically expresses a request or instruction for the agent to perform some action or provide some information.

The agent 1904 generates (e.g., proposes, suggests, creates, etc.) a set of actions. The agent 1904 is an autonomous (or semi-autonomous) software and/or hardware entity that processes the user's input and generates a set of proposed actions to fulfill the user's request. In some implementations, the agent 1904 is AI-based and uses outputs from AI models (e.g., LLMs) and predefined objectives to autonomously generate the proposed actions. The actions can be intended to fulfill specific tasks or requests made by the user, as well as other tasks or requests that are related to or associated with requests made by the user. In some implementations, proposed actions can include a variety of tasks such as data retrieval, transaction processing, system configuration changes, process optimization, image analysis, video analysis, scheduling and/or task management, content generation, sentiment analysis, automated testing, quality assurance, knowledge management, supply chain optimization, workflow automation, and so forth. Predefined objectives are the specific goals or targets that the agent 1904 aims to achieve when generating proposed actions. The objectives can be set when constructing the agent model or defined by the user through input parameters. In some implementations, predefined objectives are encoded within the architecture of the agent 1904. For example, when the agent adopts a neural network architecture, these objectives can weigh the activations of neurons within the network to influence the decision-making process. Certain neurons can be activated to prioritize actions that ensure compliance with specific guidelines or align with specific user preferences.

The agent 1904 can include a series of modules such as a natural language processing (NLP) module to interpret user inputs, a decision-making engine to determine the appropriate actions, and/or an execution module to carry out the actions on hardware or software assets. The agent 1904 can have access to various databases (e.g., knowledge bases) and APIs to retrieve particular information (e.g., domain-specific information, historical data, user preferences, and so forth). Additionally, the agent 1904 can operate in different modes, such as fully autonomous, semi-autonomous with human oversight, or in collaboration with other agents. In fully autonomous mode, the agent 1904 can make decisions and execute actions without human intervention, relying entirely on the agent's 1904 programming and/or learned behaviors. Semi-autonomous mode incorporates human oversight, allowing for manual review or approval of certain actions (e.g., in high-stakes or sensitive scenarios). The collaborative mode enables the agent 1904 to work in conjunction with other agents (i.e., different agents specializing in different tasks or domains to achieve more complex objectives). For example, the agent 1904 can be a specialized AI model designed for specific tasks, such as a virtual assistant, a chatbot, or an automation bot.

The validation layer 1906 can include one or more models 1908 (e.g., AI models, LLMs, and so forth) that validate the proposed actions and modify the proposed actions when the actions fail to satisfy one or more criteria from a set of guidelines. The validation layer 1906 can determine whether the actions fail to satisfy one or more criteria from a set of guidelines. The validation layer 1906 can ensure that these actions comply with predefined guidelines, regulations, and operational constraints using methods discussed with reference to FIG. 21. The validation layer 1906 can modify the proposed actions if the proposed actions fail to meet the required criteria using methods discussed with reference to FIG. 21. In some implementations, the validation layer 1906 can include multiple sub-layers, each responsible for different aspects of validation, such as security checks, compliance verification, and performance. In some implementations, the models 1908 can include machine learning models, rule-based systems, and/or heuristic algorithms.

For example, in response to the query "I need to transfer money to my friend," the agent 1904 can propose the action of communicating with an API of the banking application 1910*b* to prompt the user 1902 for a transaction amount, verifying the recipient's account details, checking the user's account balance to ensure sufficient funds, and so forth. However, if the agent 1904 proposes actions that fail to pass the validation layer 1906, such as a proposed action transferring an amount that exceeds the user's daily transfer limit, the validation layer 1906 can identify this action as non-compliant with the predefined guidelines and prevent its execution. The applications 1910 refer to the various software systems that the agent 1904 interacts with to perform the proposed actions. The applications 1910 can include cloud-based services, on-premises software, or a combination of both.

In FIG. 19B, the user 1902 can input a prompt or query to the agent 1904 such as "I cannot login." Similarly to FIG. 19A, the agent 1904 proposes a set of actions. The validation layer 1906 validates the proposed actions and modifies the proposed actions if the actions fail to satisfy one or more criteria from a set of guidelines. For example, in response to the query "I cannot login," the agent 1904 can propose the action of communicating with an API of the customer support application 1910*c* to prompt the user 1902 to enter a query-and-response session with, for example, a chatbot or other customer service representative. If the agent 1904 were to mistakenly propose an action involving the banking application 1910*b* instead of the customer support application 1910*c*, the validation layer 1906 can intervene. By identifying this mismatch between the user's need (login assistance) and the proposed action (accessing banking services), the validation layer 1906 can prevent the execution of an inappropriate or potentially risky action.

Figure 20:
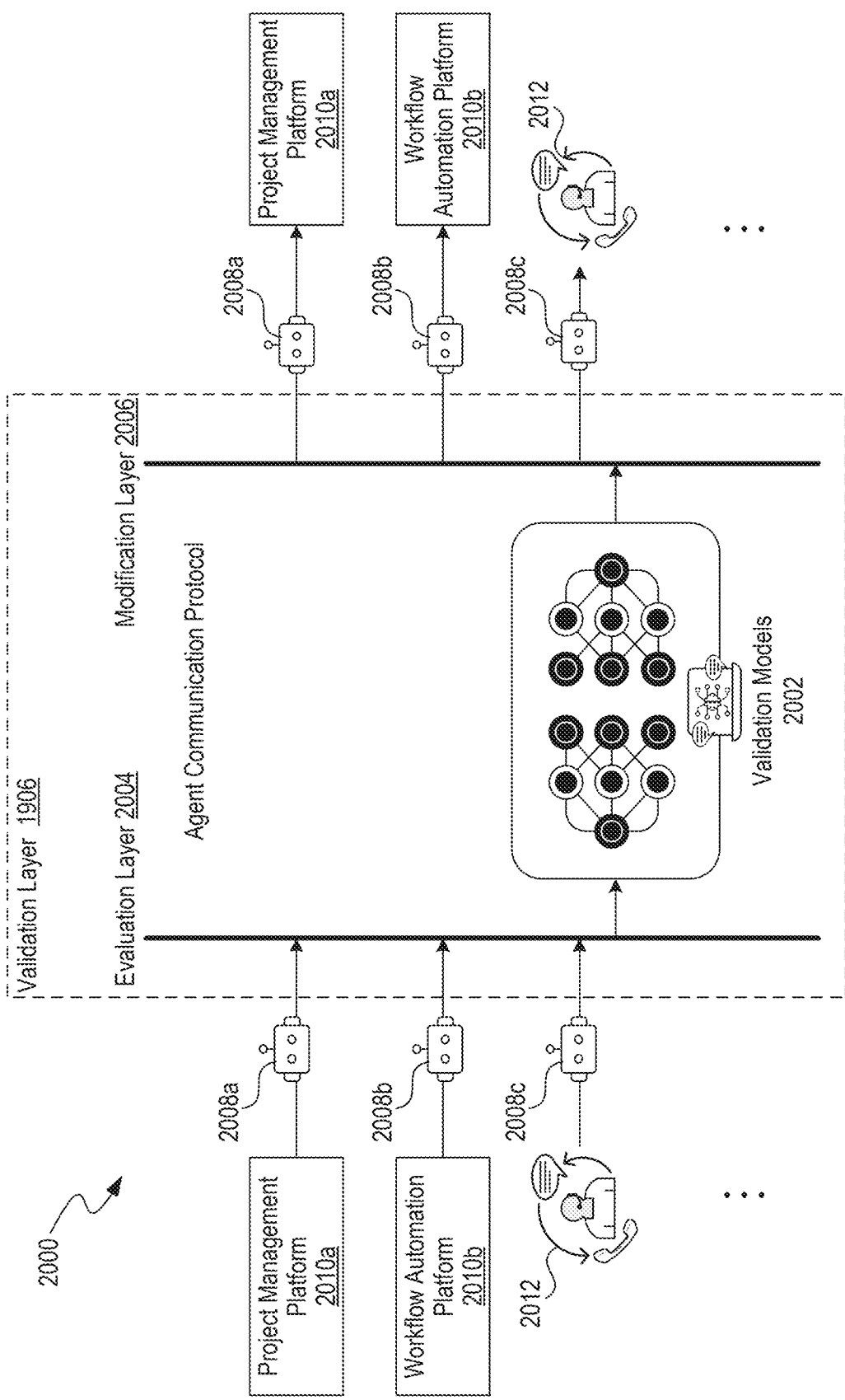
FIG. 20 is a block diagram illustrating an example environment for validating a series of autonomous agents.

FIG. 20 is a block diagram illustrating an example environment 2000 for validating a series of autonomous agents. The example environment 2000 includes the validation layer 1906 containing validation models 2002, evaluation layer 2004, and modification layer 2006. The example environment 2000 further includes agents 2008 (e.g., a first agent 2008*a*, a second agent 2008*b*, a third agent 2008*c*, and so forth), applications 2010 (e.g., project management platform 2010*a*, workflow automation platform 2010*b*), and user interaction 2012. The agents 2008 are the same as or similar to agent 1904, illustrated and described in more detail with reference to FIGS. 19A and 19B. The applications 2010 are the same as or similar to applications 2010, illustrated and described in more detail with reference to FIGS. 19A and 19B. The validation layer 1906, agents 2008, and applications 2010 can be implemented using components of example devices 500 and client computing devices 602 illustrated and described in more detail with reference to FIG. 5 and FIG. 6, respectively. Implementations of example environment 2000 can include different and/or additional components or can be connected in different ways.

The proposed actions of the agents 2008 are evaluated by the evaluation layer 2004 (e.g., an NLP layer). The validation models 2002 are used by the evaluation layer 2004 to determine a degree of satisfaction of the proposed actions with the guidelines and identify gaps (i.e., in the case that the proposed actions fail to satisfy the guidelines). The validation models 2002 are specialized or generic AI models that perform the validation tasks within the validation layer 1906. The validation models 2002 can include machine learning algorithms, rule-based systems, and/or heuristic algorithms. In some implementations, the validation models 2002 can be domain-specific and/or generic. In some implementations, the validation models 2002 can be deployed in a distributed architecture using cloud-based services and/or parallel processing to distribute the validation workload across multiple servers. Executing the evaluation layer 2004 on the agents 2008 can include comparing the proposed actions against predefined rules, historical data, and/or learned patterns of the validation models 2002 to assess compliance. Methods of executing the evaluation layer 2004 are discussed further with reference to FIG. 21.

The modification layer 2006 (e.g., another NLP layer) uses the validation models 2002 to modify the proposed actions of the agents 2008 using the identified gaps. For example, the modification layer 2005 can perform action substitution (i.e., action removal, action addition), parameter adjustment, and/or action sequence reordering. Action substitution includes replacing a proposed action with an alternative that better adheres to guidelines. For example, if an agent proposes accessing sensitive data without proper authorization, the system can substitute the action with an action to request appropriate permissions first. Parameter adjustment can include modifying values of a proposed action such as transaction limits, data access levels, or timing of operations to bring the action(s) into compliance. Action sequence reordering enables the system to restructure the order of proposed actions by, for example, prioritizing certain actions (e.g., security checks or data validation steps) before executing other proposed actions.

The modified sequence of actions can be automatically executed by the respective agents 2008 on the particular application 2010. In some implementations, the agents 2008 automatically perform one or more user interactions 2012, such as directing the user to speak to a customer service representative. User interaction 2012 refers to the various ways in which the agents 2008 (e.g., the third agent 2008*c*) interact with users to perform tasks or provide information. For example, the agents 2008 can communicatively connect a user to another user (e.g., an administrator), communicatively connect a user to an application (e.g., a chatbot), prompt the user for additional information, and so forth. Methods of executing the modification layer 2006 are discussed further with reference to FIG. 21.

Using the NLP layers (e.g., evaluation layer 2004, modification layer 2006), the agents 2008 can autonomously execute tasks, request services from other agents 2008, and perform decision-making based on predefined rules and real-time data, reducing the need for human intervention. For example, agents 2008 can interact using natural language instead of or in addition to predefined communication protocols (e.g., XML/SOAP), enabling agents 2008 (e.g., the first agent 2008a and/or the second agent 2008b) to perform tasks such as ticket assignment, modification, and status updates across platforms like JIRA, SERVICENOW, or other enterprise systems. Agents 2008 (e.g., the first agent 2008a and/or the second agent 2008b) can execute business actions (e.g., getAccountDetails( ), transferFunds( ), requestLoan( )), execute actions/tasks based on customer needs (e.g., updateAddress( ), requestChequeBook( )), automate workflows such as task escalation, report generation, data entry, and so forth.

The validation models 2002 can further evaluate communication between agents 2008. The communication between agents 2008 includes text-based requests (e.g., "Assign ticket to John"), collaboration between agents 2008 (e.g., one agent requests another to complete a task), multi-agent workflows where tasks are broken down into smaller components and distributed, and/or multi-agent decision-making where more than one agent can take a collective decision (both using different LLM models) and come to a conclusion. In some implementations, text-based requests such as "Assign the highest priority ticket to John and notify him immediately" can be broken down into actionable components, such as identifying the highest priority ticket, assigning it to John, and sending a notification.

Additionally or alternatively, collaboration between agents 2008 can be facilitated through a shared knowledge base or a centralized task management system. To implement this, a database or a distributed ledger can be used to store information about ongoing tasks, agent capabilities, and resource availability. Agents 2008 can query the database to find available resources or to update the status of their tasks. For example, if an agent is overloaded, the agent can check the database for other agents 2008 with available capacity and request assistance. In some implementations, multi-agent workflows can be implemented using a hierarchical architecture, where a primary agent can be programmed to break down an overall tasks into smaller subtasks and assigns the smaller subtasks to specialized agents. Each agent can execute its subtask independently and report back to the primary agent. For example, a task to generate a financial report can be broken down into data collection, data analysis, and report generation, with each subtask assigned to different agents.

Figure 21:
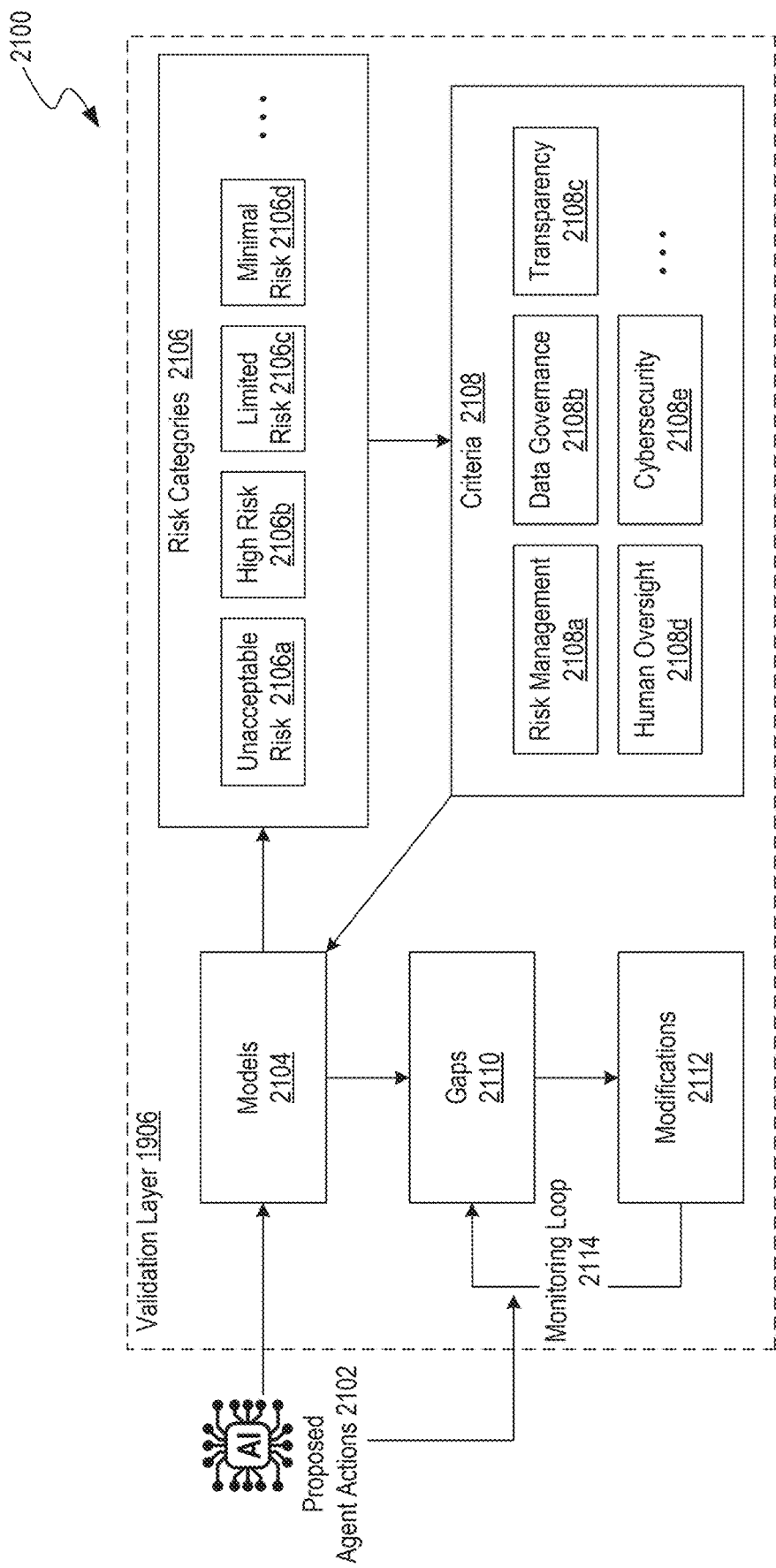
FIG. 21 is a block diagram illustrating an example environment for identifying gaps in proposed actions of the autonomous agent.

FIG. 21 is a block diagram illustrating an example environment 2100 for identifying gaps in proposed actions of the autonomous agent. The example environment 2100 includes proposed agent actions 2102 and validation layer 1906. The validation layer 1906 includes models 2104, risk categories 2106 (e.g., unacceptable risk 2106a, high risk 2106b, limited risk 2106c, minimal risk 2106d, and so forth), criteria 2108 (e.g., risk management 2108a, data governance 2108b, transparency 2108c, human oversight 2108d, cybersecurity 2108e, and so forth), gaps 2110 in the proposed agent actions 2102, modifications 2112 of the proposed agent actions 2102, and a monitoring loop 2114 between the gaps 2110 and the modifications 2112. Implementations of example environment 2100 can include different and/or additional components or can be connected in different ways.

When the agent generates proposed agent actions 2102, the proposed agent actions 2102 are evaluated by the validation layer 1906 using models 2104. Models 2104 are the same as or similar to validation models 2002 discussed with reference to FIG. 20 and are used to validate and potentially modify the proposed agent actions 2102. The models 2104 can assign the proposed agent actions 2102 into risk categories 2106 and assess the proposed agent actions 2102 against criteria 2108. Risk categories 2106 classify the proposed agent actions 2102 based on the level of risk the proposed agent actions 2102 pose. In some implementations, different classification schemas can be used to define risk categories. For example, risk categories can categorize risks by the potential impact, occurrence timeframe, associated software or hardware assets, operational disruption, and so forth of the proposed agent actions 2102. In some implementations, the classification schemas can be based on machine learning models trained on historical data to predict the risk level of proposed actions. The models can use parameters such as the frequency of similar actions, the context in which the actions are proposed, and the historical outcomes of such actions.

If gaps 2110 are identified, the modification layer 2006 adjusts the proposed actions 2102 to address the gaps 2110. Gaps 2110 in the proposed agent actions 2102 indicate areas where the proposed actions fail to meet criteria 2108. In some implementations, gaps 2110 can be categorized based on their severity and impact on one or more software or hardware assets. The modified actions can be re-evaluated using models 2104 to ensure that the modified actions meet the criteria 2108 using the monitoring loop 2114 prior to execution.

Figure 22:
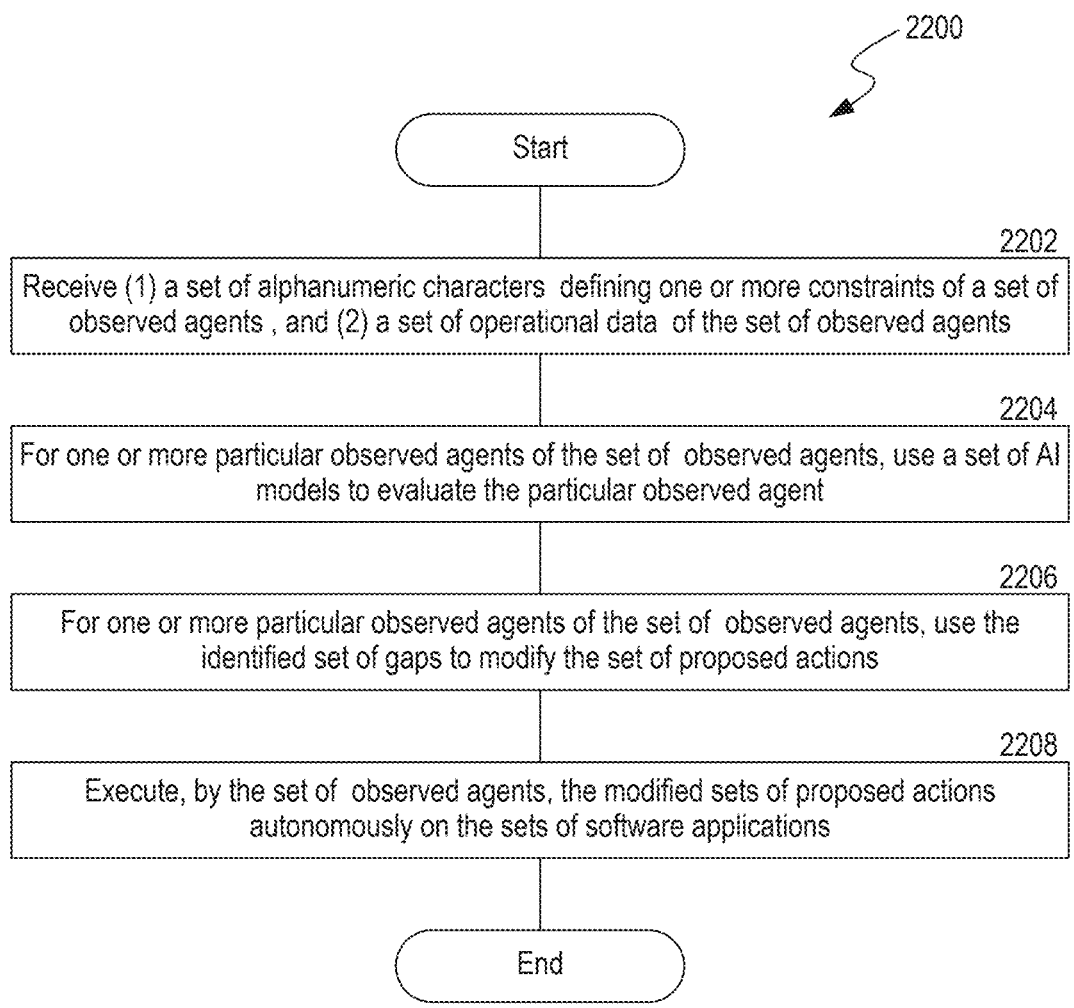
FIG. 22 is a flow diagram illustrating an example process of validating autonomous agents using an AI model.

FIG. 22 is a flow diagram illustrating an example process 2200 of validating autonomous agents using an AI model. In some implementations, the example process 2200 is performed by a system (e.g., validation layer 1906) including components of the example environment 2100 illustrated and described in more detail with reference to FIG. 21. The system can be implemented on a terminal device, on a server, or on a telecommunications network core. Likewise, implementations can include different and/or additional operations or can perform the operations in different orders.

In operation 2202, the system obtains (e.g., receives) (1) a set of alphanumeric characters (e.g., guidelines 1402, guidelines 1602, and so forth) defining one or more constraints of a set of agents (e.g., agent 1904, agents 2008, AI agents, non-AI agents, observed agents), and (2) a set of operational data of the set of agents. In some implementations, the alphanumeric characters defining constraints can include specific parameters such as operational limits, regulatory requirements, or performance thresholds. The system can alternatively or additionally receive the constraints and operational data in different forms (e.g., spoken utterances, links, digital documents, images, video, sensor data, real-time streaming data, or other forms of input).

The agents of the set of agents can be configured to, responsive to a prompt, use (1) an output of a first set of AI models of the agent, and (2) a set of predefined objectives of the agent to autonomously generate a set of proposed actions configured to be executed on a set of software applications. The set of operational data of the particular agent of the set of agents can include the prompt, the set of proposed actions generated by the particular agent, the output of the first set of AI models, the set of predefined objectives of the particular agent, and/or the set of software applications interacting with the particular agent. The agent can, for example, access file systems to read or write data, query databases to retrieve or update records, establish network connections to communicate with remote services or APIs, and so forth.

In some implementations, operational data includes specifics about the software applications, such as version numbers, configuration settings, API endpoints, and the nature of the interactions (e.g., read/write operations, data retrieval, or command execution). For instance, operational data can capture API request logs detailing the parameters sent, response times, and/or errors encountered during the interaction. Further, operational data can include hardware-related metrics from servers, network devices, and Internet of Things (IoT) sensors, such as CPU usage, memory consumption, disk input/output (I/O), network latency, and/or sensor readings. Additionally, operational data can include metadata such as the agent's risk category, performance metrics, historical success rates, and/or current compliance status. For example, an agent's risk category can be classified based on predefined criteria, such as high, medium, or low risk. Other metadata can include contextual factors of the user such as user role, previously proposed actions, previously executed actions, and so forth.

In operation 2204, for one or more particular agents of the set of agents, the system uses a second set of AI models to evaluate the particular agent. For example, the system uses the set of operational data of the particular agent to map (e.g., associate, link, relate) one or more particular agents to a risk category defined within a set of vector representations of the set of alphanumeric characters based on, for example, a level of risk associated with the set of proposed actions of the particular agent. The risk category can be mapped by a predefined mapping (e.g., within the agent's operational data), or dynamically determined by the second set of AI models. For example, the system can use a predefined mapping where specific actions or keywords directly correspond to risk categories. Alternatively, the second set of AI models can identify patterns and/or anomalies that indicate varying levels of risk. For instance, if an agent frequently accesses sensitive customer data, the AI models can classify the proposed actions as high risk. The models can use contextual factors such as the agent's historical behavior, the sensitivity of the data involved, the current security environment, and so forth.

To map the agent to the risk category, the system can map one or more proposed actions in the set of proposed actions to an action-specific risk category within a plurality of risk categories. The system can assign a confidence score to one or more proposed actions in accordance with the action-specific risk category, and aggregate the confidence scores to generate the risk category for the particular agent. The system can use, for example, historical actions executed by the agent, a monetary amount involved in a transaction associated with the agent, and/or a set of hardware system assets interacting with the set of software applications to map the agent to the risk category.

To determine confidence scores, the system can use machine learning models, such as decision trees or neural networks, to analyze historical data to predict the risk level of proposed actions. The confidence score is derived from the model's output probability, indicating the likelihood of the action belonging to a specific risk category. In a rule-based approach, predefined rules and thresholds can be applied to assess the risk of each action. For example, actions involving financial transactions exceeding a certain threshold or access to certain sensitive data can trigger high-risk categorizations. The confidence score can be calculated based on the number and severity of rules triggered. Additionally, clustering algorithms can group similar actions, with the confidence score reflecting the density and homogeneity of the clusters. More tightly grouped clusters can indicate higher confidence in the risk assessment.

The aggregation of confidence scores can be performed using various methods, such as weighted averaging, or by using a voting mechanism, where the most frequently occurring risk category among the proposed actions determines the agent's overall risk level. In some implementations, the system can use temporal factors, such as the timing and sequence of actions, to determine the risk category. For instance, a series of high-risk actions performed in quick succession can elevate the overall risk category for the agent compared to isolated high-risk actions spread over a longer period. In some implementations, the system can integrate various contexts into the evaluation, such as the user role (e.g., "bank manager"), the amount involved (e.g., "$10, 000"), and any specific conditions (e.g., "subject to credit score verification"). For example, a proposed action may be categorized as "High Risk" for a certain user role, but "Low Risk" for a different user role.

Additionally or alternatively, the system can map one or more proposed actions in the set of proposed actions to an action-specific risk category depending on task sensitivity, action explainability, user feedback, LLM voting, and/or peer assessment. For example, the system can evaluate the sensitivity of the task associated with each proposed action using the context and content of the task (e.g., tasks that involve handling sensitive data, such as financial transactions or personal data processing, can be assigned higher risk categories). The system can further evaluate the explainability of the proposed action by determining how easily the action can be explained and understood by users (e.g., by examining the number of steps involved, the actions' interdependencies, and so forth). Actions that are transparent (e.g., lower interdependencies) and/or can be easily justified are assigned lower risk categories, while actions that are complex or lack clear rationale are assigned higher risk categories. The system can, in some implementations, incorporate user feedback, where positive feedback can lower the risk category, while negative feedback can increase the risk category. Additionally, the system can use multiple LLMs to evaluate the actions and vote on their risk levels. The system can aggregate the evaluations from different LLMs and determine the final risk category based on majority or weighted voting. Peer assessment (e.g., from humans, from other models) can be used to ensure that the actions are evaluated from multiple perspectives.

The system can use the set of alphanumeric characters to generate a set of expected actions of the particular agent by extracting a set of keywords from the set of alphanumeric characters associated with the mapped risk category using, for example, tokenization to break down the alphanumeric characters into individual words or phrases, part-of-speech tagging to label each word with its grammatical role, and/or named entity recognition (NER) to detect and classify entities such as names, dates, and specific terms. Additionally, the system can use clustering techniques to determine risk categories by grouping similar sets of alphanumeric characters based on their features. Clustering algorithms such as K-means or hierarchical clustering can be used to identify patterns and group the data into clusters that represent different risk levels. For instance, clusters with frequent occurrences of terms related to financial transactions or sensitive data access can be classified as high risk.

Using the prompt, the system can identify one or more API requests to one or more of the sets of software applications in accordance with the set of keywords. The system then searches through a registry of available APIs, which could include endpoints for databases, file systems, network services, or other enterprise applications, to find those that align with the extracted keywords. The system can use the prompt to filter and prioritize the API requests. For example, if the prompt involves retrieving customer data, the system might identify APIs related to customer databases and data retrieval operations. Further, the keywords can operate as constraints that the system uses when generating the expected actions to ensure that the actions are not only responsive to the prompt but also compliant with predefined guidelines (e.g., rules and regulations). For instance, if the keywords include terms related to data privacy, the system can prioritize or filter on API requests that include encryption and access control measures.

The system can identify a set of gaps of the set of proposed actions of the particular agent by comparing (1) the set of expected actions of the particular agent with (2) the set of proposed actions of the particular agent. The gaps can include missing actions, actions that are inconsistent with the agent's typical behavior patterns, non-compliant actions, and so forth. For instance, if the expected actions include regular data backups and the proposed actions omit this step, a gap is identified. Gaps can arise from timing discrepancies, where actions are performed out of sequence or at inappropriate times.

In some implementations, for low-risk transactions, such as those involving small dollar amounts or routine operations, the system can execute the transaction automatically. However, for high-risk transactions, such as those involving large sums of money or sensitive data, the system may require human approval. In some applications, such as loan processing, any changes may need approval regardless of the query. Conversely, in other applications, no approval may be needed regardless of the query.

In operation 2206, for one or more particular agents of the set of agents, the system can use a third set of AI models and the identified set of gaps to modify the set of proposed actions by performing at least one of: adding, altering, or removing one or more actions from the set of proposed actions. In some implementations, the proposed actions are modified to be the same as the expected actions. The system can use decision trees or ensemble methods, such as random forests, to evaluate multiple potential modifications and select a single set of actions. The decision trees recursively split the data into subsets based on the most significant features, creating a tree-like model of decisions. Each node in the tree represents a decision point, where the system evaluates a specific criterion, such as risk level or a particular compliance requirement, to determine the best course of action. The leaves of the tree represent the final decisions or modifications to the proposed actions. In a random forest, numerous decision trees are trained on different subsets of the data and features, and their outputs are aggregated to produce a final decision. In some implementations, the system can incorporate a human-in-the-loop, where human users review and approve the modifications suggested by the AI models. For example, users can review the proposed modifications, suggest further adjustments, and/or approve the final set of actions.

In some implementations, the system can use the set of expected actions and the third set of AI models to generate a recommended action (i.e., proposed modifications to the proposed actions) in accordance with the set of predefined objectives of the particular agent. The system can display, on a graphical user interface (GUI) of the computing device, a graphical layout of (1) a first representation indicating the set of expected actions, (2) a second representation indicating the recommended action, and/or (3) a third representation indicating one or more predefined objectives of the set of predefined objectives satisfied by the recommended action. In some implementations, the GUI can also include interactive elements that allow users to explore the details of each representation. For instance, users can click on an expected action to view the action's specific criteria and requirements, or hover over the recommended action to see a detailed explanation of why the action was generated and how the action addresses the requirements from the guidelines.

In some implementations, the system can generate on a similar GUI, a graphical layout of (1) a first representation indicating the set of agents, and (2) a second representation indicating a degree of compliance of the set of proposed actions with the set of expected actions. In some implementations, the graphical layout can include (1) a first representation indicating the generated set of proposed actions, (2) a second representation indicating the modified set of proposed actions, (3) a third representation indicating the set of gaps of the set of proposed actions, and/or (4) a fourth representation indicating the set of alphanumeric characters. For example, the system can include a dashboard interface enabling real-time monitoring, communication, and/or coordination among agents. The dashboard can enable visibility into agent activity, status, and task progress. The dashboard can display various metrics and visual indicators, such as real-time status updates, performance metrics, alerts for deviations or issues (e.g., based on predefined thresholds or conditions), and so forth. Users can interact with the dashboard to view specific agent activities, review logs, and/or communicate directly with agents to provide instructions or feedback.

In operation 2208, the set of agents can execute the modified sets of proposed actions autonomously on the sets of software applications. For example, the system can transmit one or more API requests to one or more of the sets of software applications. Using the prompt, the system can generate a sequence of API calls by chaining multiple API endpoints, wherein an output of a previous API call operates as an input for a subsequent API call to be executed subsequent to the previous API call. In some implementations, the system can execute scripts written in a language such as PYTHON to automate tasks across different applications. The scripts can be scheduled to run at specific intervals using cron jobs or triggered by specific events using task schedulers. In some implementations, the system can use serverless computing platforms such as AWS LAMBDA, where the system triggers functions in response to events, such as data changes or user actions.

In some implementations, the system can automatically trigger downstream applications to satisfy conditions needed to perform the proposed action. For instance, if a person requests withdrawing $5,000 but the bank only has $4,000 available, the system can automatically increase the credit line and ask the user for approval. The decision to trigger such actions can be made using a large language model (LLM). In some implementations, the system can use a rules-based engine to determine the necessary downstream actions. The rules-based engine can be configured with predefined rules and conditions that specify how to handle various scenarios. For example, the rules-based engine can include conditions such as "if withdrawal amount exceeds available balance, then check credit limit and increase if possible." Additionally or alternatively, the system can leverage machine learning models to predict corrective action(s) based on historical data and patterns. The models can analyze past transactions and user behaviors to determine the most likely response to remediate the gap. For instance, if the system detects that a user frequently requests withdrawals that exceed their available balance, the system can proactively increase their credit line or suggest alternative actions, such as transferring funds from another account.

In some implementations, the system detects a set of updates to the set of alphanumeric characters. Responsive to detecting the set of updates, the system can dynamically modify the set of expected actions in accordance with the set of updates. Once an update is detected, the system can trigger a callback function or event handler to update the set of expected actions based on the detected changes (i.e., recalculating or adjusting the actions to align with the new set of alphanumeric characters).

The system can include a global control mechanism (e.g., a kill switch) that enables the termination or suspension of single-agent operations or multi-agent operations associated with the set of agents (e.g., targeted agents). When the global control mechanism is activated, a server of the system can transmit a termination or suspension command to the targeted agents. Upon receiving the command, the targeted agents can execute predefined shutdown or suspension procedures, which can include terminating ongoing tasks, releasing resources, and/or logging the event for audit purposes. In some implementations, the global control mechanism can be integrated into the system's dashboard interface, allowing users to trigger the global control mechanism with a set of gestures (e.g., a click, a swipe, and so forth).

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions stored thereon, wherein the instructions when executed by at least one data processor of a system, cause the system to:

receive, via a user interface, an output generation request including an instruction for generation of an output using a large language model (LLM);

partition, using the LLM, the output generation request into one or more segments by mapping the output generation request to a set of domains, wherein each domain in the set of domains indicates (1) a set of databases and (2) a set of guidelines associated with the set of databases, and wherein components of each segment of the output generation request share a common domain;

route each of the one or more segments to a set of domain-specific models by comparing, for each segment, (1) a corresponding domain of the segment with (2) a domain of each domain-specific model, wherein each domain-specific model is trained using training data associated with the domain of the domain-specific model, and wherein each domain-specific model shares the same domain as corresponding routed segments;

generate, using the set of domain-specific models, a query fragment for each domain-specific model by comparing:

(1) a set of performance metric values associated with using the query fragment to retrieve domain-specific data from the set of databases associated with the domain of the domain-specific model, wherein the query fragment operates as an input in the set of databases to retrieve the domain-specific data in accordance with the set of guidelines of the domain, and (2) a set of system resource metric values indicating an estimated usage of system resources to retrieve the domain-specific data using the query fragment, wherein the system resources include at least one of: hardware resources, software resources, or network resources;

aggregate, using the LLM, the query fragments into an overall query configured to satisfy the set of guidelines associated with each database of the set of domains; and input, into a computer program, the overall query to receive a set of requested data in accordance with the instruction of the output generation request.

2. The non-transitory computer-readable storage medium of claim 1, wherein the instructions further cause the system to:

measure performance metrics including a compound value using at least one of: compliance, computation speed, resource usage, number of tokens, or accuracy;

measure specific user features including at least one of: explicit user requests, inferred autonomy preferences, or skill level; and modify at least one domain-specific model using the performance metrics and specific user features.

3. The non-transitory computer-readable storage medium of claim 1, wherein the instructions further cause the system to:

obtain a user-requested query;

establish a first score quantifying an authority of the user-requested query;

establish a second score quantifying resource differences between the user-requested query and the overall query; and select either the overall query or the user-requested query using the first score and the second score.

4. The non-transitory computer-readable storage medium of claim 1, wherein the instructions further cause the system to:

detect a focus area of a user using historical queries; and generate context-specific recommendations using the focus area.

5. The non-transitory computer-readable storage medium of claim 1, wherein the instructions further cause the system to:

validate that each query fragment adheres to the set of guidelines of the domain before aggregating the query fragments.

6. The non-transitory computer-readable storage medium of claim 1, wherein the instructions further cause the system to:

transmit each segment to its respective domain-specific model through a synchronous communication channel.

7. The non-transitory computer-readable storage medium of claim 1, wherein the instructions further cause the system to:

integrate the query fragments into the overall query using interdependencies between the query fragments.

8. A method for dynamically selecting models for distributed data queries using resource usage, the method comprising:

receiving an output generation request including an instruction for generation of an output using an artificial intelligence (AI) model;

partitioning, using the AI model, the output generation request into one or more segments by associating the output generation request to a set of domains, wherein each domain in the set of domains indicates (1) a set of databases and (2) a set of guidelines associated with the set of databases, and wherein components of each segment of the output generation request share a common domain;

routing each of the one or more segments to a set of domain-specific models by comparing, for each segment, (1) a corresponding domain of the segment with (2) a domain of each domain-specific model, wherein each domain-specific model is trained using training data associated with the domain of the domain-specific model, and wherein each domain-specific model shares the same domain as corresponding routed segments;

generating, using the set of domain-specific models, a query fragment for each domain-specific model by comparing (1) a set of performance metric values associated with using the query fragment to retrieve domain-specific data from the set of databases associated with the domain of the domain-specific model and (2) a set of system resource metric values indicating an estimated usage of system resources to retrieve the domain-specific data using the query fragment; and aggregating, using the AI model, the query fragments into an overall query configured to satisfy the set of guidelines associated with each database of the set of domains.

9. The method of claim 8, wherein generating the query fragment comprises:

retrieving the domain-specific data from at least one of: departmental databases, data lakes, or storage systems via one or more of: a set of API calls or a set of direct database queries.

10. The method of claim 8, further comprising:

performing a set of compliance checks to validate that the overall query satisfies the set of guidelines; and presenting the overall query to a user via a user interface configured to receive a user input indicating an acceptance or a denial of the overall query.

11. The method of claim 8, further comprising:

notifying a validation agent in response to a conflict between a user-requested query and the overall query.

12. The method of claim 8, wherein generating the query fragment comprises:
associating each query fragment with compliance validation data indicating a degree of compliance of the query fragment with the set of guidelines; and
transmitting each query fragment to the AI model through a communication channel.

13. The method of claim 8, further comprising:
automatically executing a set of programmatic workflows using a degree of user experience.

14. The method of claim 8, further comprising:
measuring a set of performance metrics for each domain-specific model, wherein the set of performance metrics include at least one of:
computation speed associated with query execution, resource allocation associated with data retrieval, or compliance validation results.

15. A system comprising:
at least one hardware processor; and
at least one non-transitory memory storing instructions, which, when executed by the at least one hardware processor, cause the system to:
obtain an output generation request including an instruction for generation of an output using an artificial intelligence (AI) model;
partition, using the AI model, the output generation request into one or more segments by associating the output generation request to a set of domains indicating (1) a set of databases and (2) a set of guidelines associated with the set of databases;
route each of the one or more segments to a set of domain-specific models, wherein each domain-specific model shares the same domain as corresponding routed segments;
generate, using the set of domain-specific models, a query fragment for each domain-specific model by using one or more of: (1) a set of performance metric values associated with using the query fragment to retrieve domain-specific data from the set of databases or (2) a set of system resource metric values indicating an estimated usage of system resources to retrieve the domain-specific data using the query fragment; and
aggregate, using the AI model, the query fragments into an overall query configured to satisfy the set of guidelines associated with each database of the set of domains.

16. The system of claim 15, wherein the system is further caused to:
detect a set of interdependencies between the query fragments; and
validate the overall query against the set of interdependencies.

17. The system of claim 15, wherein the system is further caused to:
detect a set of conflicts between a user request and the overall query associated with a resource usage difference; and
automatically execute one or more actions using the resource usage difference exceeding a predefined threshold.

18. The system of claim 15, wherein the system is further caused to:
establish a compound performance value using at least one of: compliance with the set of guidelines, computation speed, or resource usage; and
adjust routing of segments using the compound performance value.

19. The system of claim 15, wherein the system is further caused to:
automatically execute one or more programmatic workflows using the overall query.

20. The system of claim 15, wherein the system is further caused to:
detect a set of data patterns across multiple data warehouses; and
generate a set of query recommendations using the detected set of data patterns.

* * * * *